(12) United States Patent
Sugimoto

(10) Patent No.: US 10,641,896 B2
(45) Date of Patent: *May 5, 2020

(54) DISTANCE MEASUREMENT DEVICE, DISTANCE MEASUREMENT METHOD, AND DISTANCE MEASUREMENT PROGRAM

(71) Applicant: FUJIFILM CORPORATION, Minato-ku, Tokyo (JP)

(72) Inventor: Masahiko Sugimoto, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 232 days.

This patent is subject to a terminal disclaimer.

(21) Appl. No.: 15/921,658

(22) Filed: Mar. 15, 2018

(65) Prior Publication Data

US 2018/0203116 A1 Jul. 19, 2018

Related U.S. Application Data

(63) Continuation of application No. PCT/JP2016/063583, filed on May 2, 2016.

(30) Foreign Application Priority Data

Sep. 28, 2015 (JP) .................... 2015-190354

(51) Int. Cl.
*G01C 3/08* (2006.01)
*G01S 17/10* (2020.01)
(Continued)

(52) U.S. Cl.
CPC ............ *G01S 17/10* (2013.01); *G01S 7/4865* (2013.01); *G01S 17/46* (2013.01); *G01S 17/86* (2020.01)

(58) Field of Classification Search
None
See application file for complete search history.

(56) References Cited

U.S. PATENT DOCUMENTS 5,231,447 A 7/1993 Takagi
2006/0018509 A1* 1/2006 Miyoshi ................. G06T 5/006
382/104
(Continued)

FOREIGN PATENT DOCUMENTS

JP H08-285574 A 11/1996
JP 3136658 B2 2/2001
(Continued)

OTHER PUBLICATIONS

International Search Report issued in International Application No. PCT/JP2016/063583 dated Jul. 19, 2016.
(Continued)

*Primary Examiner* — Isam A Alsomiri
*Assistant Examiner* — Amir J Askarian
(74) *Attorney, Agent, or Firm* — Solaris Intellectual Property Group, PLLC

(57) ABSTRACT

A distance measurement device includes a deriving unit that derives a dimension of a real-space region corresponding to an interval between a plurality of pixels associated with in-image irradiation positions derived as positions, which correspond to irradiation positions of laser beams onto a subject, within a captured image acquired by imaging the subject by an imaging unit, based on a distance measured by a measurement unit, an interval between a plurality of designated pixels, and a focal length of the imaging unit, and an output unit that derives derivation accuracy corresponding to an actually present factor based on a first correspondence relation between assumption factors assumed as factors influencing in-image irradiation positions and
(Continued)

US 10,641,896 B2

Page 2 derivation accuracy derived by the deriving unit, and outputs information based on the derived derivation accuracy.

13 Claims, 24 Drawing Sheets

(51) Int. Cl.
*G01S 7/4865* (2020.01)
*G01S 17/86* (2020.01)
*G01S 17/46* (2006.01)

(56) References Cited

U.S. PATENT DOCUMENTS

| | | | | |
|---|---|---|---|---|
| 2008/0297865 | A1* | 12/2008 | Hara | G11B 7/0065 |
| | | | | 359/12 |
| 2011/0249117 | A1 | 10/2011 | Yoshihama et al. | |
| 2013/0022222 | A1* | 1/2013 | Zschau | G03H 1/0808 |
| | | | | 381/306 |
| 2013/0307831 | A1* | 11/2013 | Robinson | G02B 6/0068 |
| | | | | 345/207 |
| 2018/0211440 | A1* | 7/2018 | Kunkel | G06T 19/006 |

FOREIGN PATENT DOCUMENTS

| | | |
|---|---|---|
| JP | 2001-148868 A | 5/2001 |
| JP | 2004-205222 A | 7/2004 |
| JP | 2009-288785 A | 12/2009 |
| JP | 2011-232330 A | 11/2011 |
| JP | 2014-138290 A | 7/2014 |
| JP | 2014-232095 A | 12/2014 |

OTHER PUBLICATIONS

Written Opinion of the ISA issued in International Application No. PCT/JP2016/063583 dated Jul. 19, 2016.
International Preliminary Report on Patentability issued in International Application No. PCT/JP2016/063583 dated Dec. 1, 2016.

* cited by examiner

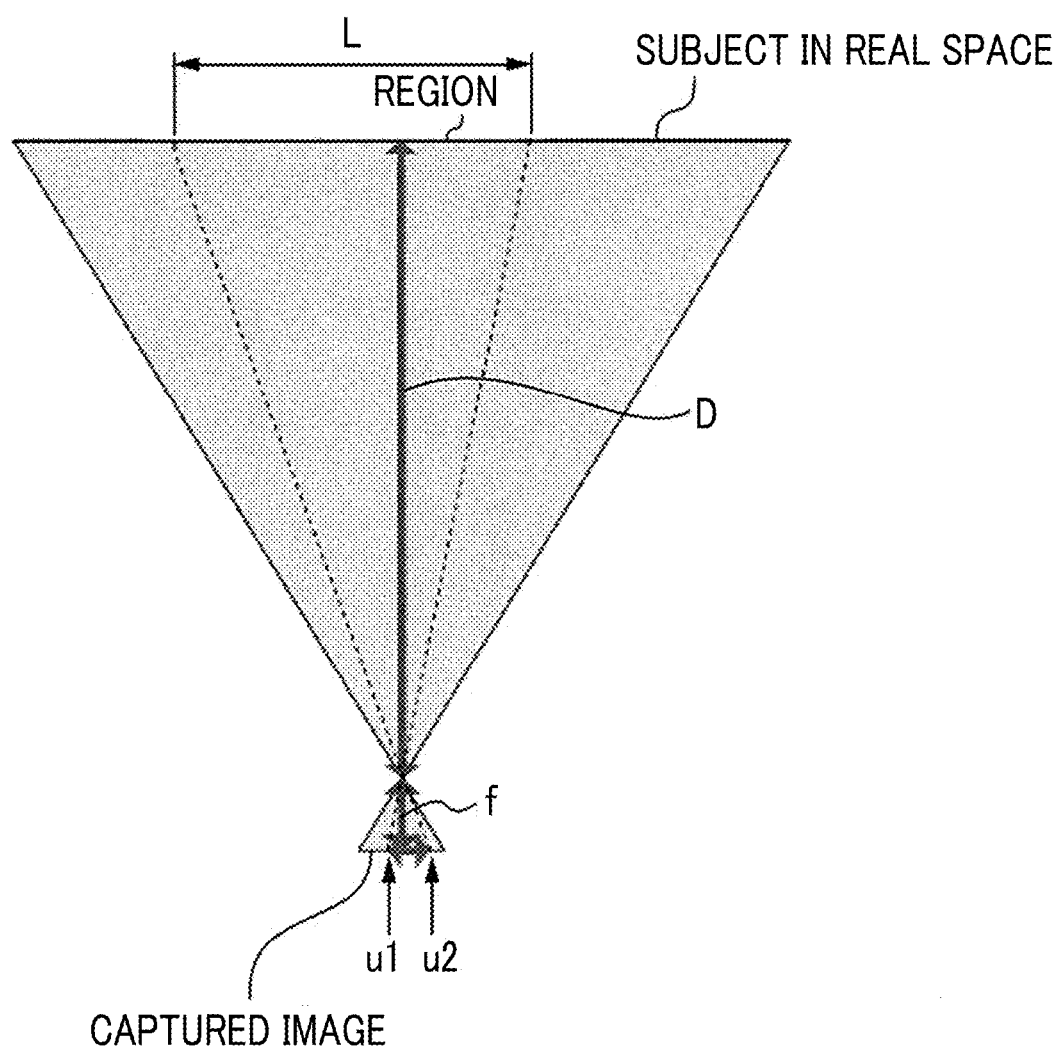

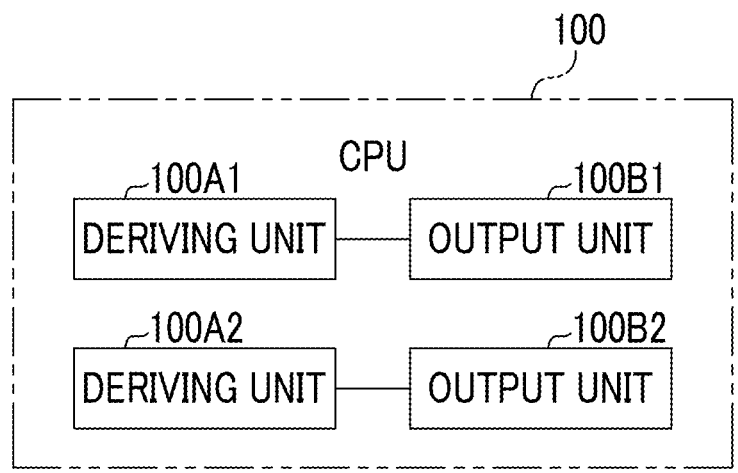

| FACTOR AND ACCURACY CORRESPONDENCE INFORMATION ||
|---|---|
| ASSUMPTION FACTOR | DERIVATION ACCURACY |
| CHANGE IN ANGLE OF VIEW (1) | $\delta_1$ |
| ⋮ | ⋮ |
| CHANGE IN ANGLE OF VIEW (n) | $\delta_n$ |
| REPLACEMENT OF LENS (1) | $\varepsilon_1$ |
| ⋮ | ⋮ |
| REPLACEMENT OF LENS (n) | $\varepsilon_n$ |
| REPLACEMENT OF DISTANCE MEASUREMENT UNIT (1) | $\zeta_1$ |
| ⋮ | ⋮ |
| REPLACEMENT OF DISTANCE MEASUREMENT UNIT (n) | $\zeta_n$ |
| CHANGE IN EMISSION DIRECTION (1) | $\eta_1$ |
| ⋮ | ⋮ |
| CHANGE IN EMISSION DIRECTION (n) | $\eta_n$ |
| MANUFACTURING VARIATION | $\lambda$ |

FIG. 17

IT IS RECOMMENDED THAT
IN-ACTUAL-IMAGE IRRADIATION
POSITION IS ADJUSTED.
DO YOU WANT TO ADJUST
IN-ACTUAL-IMAGE IRRADIATION
POSITION?

YES   NO

PLEASE, PERFORM PROVISIONAL
MEASUREMENT AND PROVISIONAL IMAGING
THREE TIMES WHILE CHANGING EMISSION
DIRECTION OF LASER BEAM

EFFECTIVE DISTANCES ARE NOT ABLE TO BE
MEASURED.
PLEASE, PERFORM PROVISIONAL
MEASUREMENT AND PROVISIONAL IMAGING
THREE TIMES WHILE CHANGING EMISSION
DIRECTION OF LASER BEAM

~114

DISTANCE MEASUREMENT DEVICE, DISTANCE MEASUREMENT METHOD, AND DISTANCE MEASUREMENT PROGRAM

CROSS-REFERENCE TO RELATED APPLICATION

This application is a continuation application of International Application No. PCT/JP2016/063583, filed May 2, 2016, the disclosure of which is incorporated herein by reference in its entirety. Further, this application claims priority from Japanese Patent Application No. 2015-190354 filed Sep. 28, 2015, the disclosure of which is incorporated herein by reference in its entirety.

BACKGROUND OF THE INVENTION

1. Field of the Invention

A technology of the present disclosure relates to a distance measurement device, a distance measurement method, and a distance measurement program.

2. Description of the Related Art

Initially, in the present specification, distance measurement means that a distance to a subject which is a measurement target from a distance measurement device is measured. In the present specification, a captured image means an image acquired by imaging the subject by an imaging unit that images the subject. In the present specification, irradiation-position pixel coordinates mean two-dimensional coordinates as two-dimensional coordinates for specifying a position of a pixel, among pixels included in the captured image, which corresponds to an irradiation position of directional light in a real space by the distance measurement device on the assumption that distance measurement is performed by using the distance measurement device that performs the distance measurement based on a time during which the directional light (for example, laser beam) emitted by an emission unit toward the subject supposed to be a distance measurement target travels in a reciprocating motion. In the present specification, an in-image irradiation position means a position acquired as a position within the captured image, which corresponds to the irradiation position of the directional light in the real space by the distance measurement device. In other words, the in-image irradiation position means a position of a pixel, among the pixels included in the captured image, which is specified by the irradiation-position pixel coordinates.

In recent years, a distance measurement device provided with an imaging unit has been developed. In such a type of distance measurement device, a subject is irradiated with a laser beam, and the subject is captured in a state in which the subject is irradiated with the laser beam. The captured image acquired by imaging the subject is presented to a user, and thus, an irradiation position of the laser beam is ascertained by the user through the captured image.

In recent years, a distance measurement device having a function of deriving a dimension of a target within an image in a real space as in a measurement device described in JP2014-232095A has been also developed.

The measurement device described in JP2014-232095A includes an unit to display an isosceles trapezoid shape of a structure having an isosceles trapezoid portion captured by the imaging unit and an unit to specify four vertices of the displayed isosceles trapezoid shape and acquiring coordinates of the four specified vertices. The measurement device described in JP2014-232095A specifies a distance between two points on a plane including the isosceles trapezoid shape or a distance to one point on a plane from the imaging unit, acquires a shape of the structure from the coordinates of the four vertices and a focal length, and acquires a size of the structure from the specified distance.

Incidentally, in a case where a dimension of a target within the captured image acquired by imaging the subject by the imaging unit is derived, a plurality of pixels corresponding to a region as a deriving target in the captured image in the real space is designated by the user. The dimension of the region in the real space which is designated by the user is derived based on the distance measured by the distance measurement device. Thus, in a case where the dimension of the region in the real space specified by the plurality of designated pixels is accurately derived, it is preferable that the in-image irradiation position is derived with high accuracy and the acquired in-image irradiation position together with the distance is ascertained by the user.

SUMMARY OF THE INVENTION

However, P2014-232095A does not describe an unit that derives the in-image irradiation position with high accuracy.

Incidentally, in order to derive the in-image irradiation position with high accuracy, a method of causing the distance measurement device to perform a data acquisition process for deriving an irradiation position (see FIG. 14) to be described is considered. In a case where the data acquisition process for deriving the irradiation position is performed by the distance measurement device, the deriving data (for example, the position and distance correspondence information shown in FIG. 9) used in the deriving of the in-image irradiation position is acquired by the distance measurement device based on the distance measured by the distance measurement device. This method is adopted, and thus, the in-image irradiation position is derived based on the distance measured by the distance measurement device and the deriving data acquired by performing the data acquisition process for deriving the irradiation position by the distance measurement device.

In a case where the user constantly wishes to ascertain the in-image irradiation position with high accuracy, it is preferable that the data acquisition process for deriving the irradiation position is performed whenever the factor (for example, the replacement of the lens of the imaging unit or the change in the angle of view) influencing the in-image irradiation position occurs.

However, it is troublesome to cause the distance measurement device to perform the data acquisition process for deriving the irradiation position whenever the factor influencing the in-image irradiation position occurs. Since the factor influencing the in-image irradiation position is actually present, even though it is difficult to perform strict distance measurement, an approximate distance may be ascertained in some cases.

As an aspect, one embodiment of the present invention provides a distance measurement device, a distance measurement method, and a distance measurement program capable of allowing a user to easily ascertain information based on derivation accuracy of a dimension of a real-space region compared to a case where the information based on the derivation accuracy of the dimension of the real-space region is not output even though a factor influencing an in-image irradiation position is actually present.

As another aspect, one embodiment of the present invention provides a distance measurement device, a distance measurement method, and a distance measurement program capable of allowing a user to easily ascertain information based on derivation accuracy of an in-image irradiation position compared to a case where the information based on the derivation accuracy of the in-image irradiation position is not output even though a factor influencing the in-image irradiation position is actually present.

A distance measurement device according to a first aspect of the present invention comprises an imaging unit that images a subject, a measurement unit that measures a distance to the subject by emitting directional light rays which are light rays each having directivity to the subject and receiving reflection light rays of the directional light rays, a deriving unit that derives a dimension of a real-space region corresponding to an interval between a plurality of pixels associated with in-image irradiation positions derived as positions, which correspond to irradiation positions of the directional light rays onto the subject, within a captured image acquired by imaging the subject by the imaging unit based on a distance measured by the measurement unit, the interval, and a focal length of the imaging unit, and an output unit that derives derivation accuracy corresponding to an actually present factor based on a first correspondence relation between assumption factors assumed as factors influencing the in-image irradiation positions and derivation accuracy derived by the deriving unit, and outputs information based on the derived derivation accuracy.

Therefore, according to the distance measurement device according to the first aspect of the present invention, the user can easily ascertain the information based on the derivation accuracy of the dimension of the real-space region compared to a case where the information based on the derivation accuracy of the dimension of the real-space region is not output even though a factor influencing the in-image irradiation position is actually present.

A distance measurement device according to a second aspect of the present invention comprises an imaging unit that images a subject, a measurement unit that measures a distance to the subject by emitting directional light rays which are light rays each having directivity to the subject and receiving reflection light rays of the directional light rays, a deriving unit that derives in-image irradiation positions, which correspond to irradiation positions of the directional light rays onto the subject, within a captured image acquired by imaging the subject by the imaging unit based on the distance measured by the measurement unit, and an output unit that derives derivation accuracy corresponding to an actually present factor based on a first correspondence relation between assumption factors assumed as factors influencing the in-image irradiation positions and derivation accuracy derived by the deriving unit, and outputs information based on the derivation accuracy.

Therefore, according to the distance measurement device according to the second aspect of the present invention, the user can easily ascertain the information based on the derivation accuracy of the in-image irradiation position compared to a case where the information based on the derivation accuracy of the in-image irradiation position is not output even though a factor influencing the in-image irradiation position is actually present.

According to a distance measurement device according to a third aspect of the present invention, in the distance measurement device according to the first or second aspect of the present invention, the deriving unit acquires a second correspondence relation between in-provisional-image irradiation positions corresponding to the irradiation positions within a provisional image acquired by provisionally imaging the subject by the imaging unit whenever each of a plurality of distances is provisionally measured by the measurement unit and distances which are provisionally measured by the measurement unit by using the directional light rays corresponding to the in-provisional-image irradiation positions, and derives the in-image irradiation positions based on the acquired second correspondence relation.

Therefore, according to the distance measurement device according to the third aspect of the present invention, it is possible to derive the in-image irradiation position with high accuracy compared to a case where the in-image irradiation position is not derived based on the second correspondence relation.

According to a distance measurement device according to a fourth aspect of the present invention, the distance measurement device according to the third aspect of the present invention further comprises a performing unit that performs a predetermined process as a process of suppressing a decrease in accuracy of the in-image irradiation position in a case where a distance which is actually measured by the measurement unit is out of a range of a distance specified by the second correspondence relation.

Therefore, according to the distance measurement device according to the fourth aspect of the present invention, it is possible to increase the accuracy of the in-image irradiation position compared to a case where the process of suppressing the decrease in accuracy of the in-image irradiation position is not performed.

According to a distance measurement device according to a fifth aspect of the present invention, in the distance measurement device according to any one of the first to fourth aspect of the present invention, different derivation accuracy are associated with different assumption factors in the first correspondence relation, and the output unit derives the derivation accuracy associated with the assumption factor corresponding to the actually present factor.

Therefore, according to the distance measurement device according to the fifth aspect of the present invention, it is possible to accurately derive the derivation accuracy compared to a case where the derivation accuracy is associated with only a single assumption factor.

According to a distance measurement device according to a sixth aspect of the present invention, in the distance measurement device according to the fifth aspect of the present invention, in a case where the actually present factor is in plural, the output unit derives the derivation accuracy by integrating the derivation accuracy associated with the assumption factors corresponding to the plurality of actually present factors.

Therefore, according to the distance measurement device according to the sixth aspect of the present invention, it is possible to achieve easy handling of the derivation accuracy compared to a case where the derivation accuracy associated with the assumption factors corresponding to the plurality of factors which is actually present in the distance measurement device as the factors influencing the in-image irradiation position are individually derived.

According to a distance measurement device according to a seventh aspect of the present invention, in the distance measurement device according to the sixth aspect of the present invention, the output unit derives information based on a dependent variable integrated by using a polynomial including the derivation accuracy associated with the assumption factors corresponding to the plurality of actually present factors as independent variables.

Therefore, according to the distance measurement device according to the seventh aspect of the present invention, it is possible to easily integrate the derivation accuracy compared to a case where a monomial is used.

According to a distance measurement device according to an eighth aspect of the present invention, in the distance measurement device according to any one of the first to seventh aspects of the present invention, the factor is at least one of replacement of a lens of the imaging unit, replacement of the measurement unit, a change in an angle of view (an angle of view on a subject image indicating the subject) on the subject captured by the imaging unit, a change in a direction in which the directional light is emitted, or a manufacturing variation.

Therefore, according to the distance measurement device according to the eighth aspect of the present invention, it is possible to derive the derivation accuracy with consideration for the influence of the applied factor in a case where any of the replacement of the lens of the imaging unit, the replacement of the measurement unit, the change in the angle of view on the subject imaged by the imaging unit, the change in the direction in which the directional light is emitted, and the manufacturing variation is not used as the factor influencing the in-image irradiation position.

According to a distance measurement device according to a ninth aspect of the present invention, in the distance measurement device according to any one of the first to eighth aspects of the present invention, the first correspondence relation is stored in a storage unit until the output unit is activated for the first time, and the output unit derives the derivation accuracy corresponding to the actually present factor based on the first correspondence relation stored in the storage unit.

Therefore, according to the distance measurement device according to the ninth aspect of the present invention, it is possible to rapidly derive the derivation accuracy compared to a case where the first correspondence relation is stored in the storage unit after the output unit is activated for the first time.

According to a distance measurement device according to a tenth aspect of the present invention, the distance measurement device according to any one of the first to ninth aspects of the present invention further comprises a warning unit that issues a warning in a case where the derivation accuracy output by the output unit is less than predetermined derivation accuracy.

Therefore, according to the distance measurement device according to the tenth aspect of the present invention, the user can easily recognize that the derivation accuracy is less than the predetermined derivation accuracy compared to a case where the warning is not issued even though the derivation accuracy is less than the predetermined derivation accuracy.

A distance measurement method according to an eleventh aspect of the present invention comprises deriving a dimension of a real-space region corresponding to an interval between a plurality of pixels associated with in-image irradiation positions derived as positions, which correspond to irradiation positions of directional light rays which are light rays each having directivity onto a subject, within a captured image acquired by imaging the subject by an imaging unit which images the subject based on a distance measured by a measurement unit, which measures the distance to the subject by emitting the directional light rays to the subject and receiving reflection light rays of the directional light rays, the interval, and a focal length of the imaging unit, the imaging unit and the measurement unit being included in a distance measurement device, and deriving derivation accuracy corresponding to an actually present factor based on a first correspondence relation between assumption factors assumed as factors influencing the in-image irradiation positions and derivation accuracy of the dimension of the real-space region, and outputting information based on the derived derivation accuracy.

Therefore, according to the distance measurement device according to the eleventh aspect of the present invention, the user can easily ascertain the information based on the derivation accuracy of the dimension of the real-space region compared to a case where the information based on the derivation accuracy of the dimension of the real-space region is not output even though a factor influencing the in-image irradiation position is actually present.

A distance measurement method according to a twelfth aspect of the present invention comprises deriving in-image irradiation positions, which correspond to irradiation positions of directional light rays which are light rays each having directivity onto a subject, within a captured image acquired by imaging the subject by an imaging unit which images the subject, based on a distance measured by a measurement unit which measures the distance to the subject by emitting the directional light rays to the subject and receiving reflection light rays of the directional light rays, the imaging unit and the measurement unit being included in a distance measurement device, and deriving derivation accuracy corresponding to an actually present factor based on a first correspondence relation between assumption factors assumed as factors influencing the in-image irradiation positions and derivation accuracy of the in-image irradiation positions, and outputting information based on the derived derivation accuracy.

Therefore, according to the distance measurement device according to the twelfth aspect of the present invention, the user can easily ascertain the information based on the derivation accuracy of the in-image irradiation position compared to a case where the information based on the derivation accuracy of the in-image irradiation position is not output even though a factor influencing the in-image irradiation position is actually present.

A distance measurement program according to a thirteenth aspect of the present invention causes a computer to perform a process of deriving a dimension of a real-space region corresponding to an interval between a plurality of pixels associated with in-image irradiation positions derived as positions, which correspond to irradiation positions of directional light rays which are light rays each having directivity onto a subject, within a captured image acquired by imaging the subject by an imaging unit which images the subject based on a distance measured by a measurement unit, which measures the distance to the subject by emitting the directional light rays to the subject and receiving reflection light rays of the directional light rays, the interval, and a focal length of the imaging unit, the imaging unit and the measurement unit being included in a distance measurement device, and deriving derivation accuracy corresponding to an actually present factor based on a first correspondence relation between assumption factors assumed as factors influencing the in-image irradiation positions and derivation accuracy of the dimension of the real-space region, and outputting information based on the derived derivation accuracy.

Therefore, according to the distance measurement program according to the thirteenth aspect of the present invention, the user can easily ascertain the information based on the derivation accuracy of the dimension of the real-space region compared to a case where the information based on the derivation accuracy of the dimension of the real-space region is not output even though a factor influencing the in-image irradiation position is actually present.

A distance measurement program according to a fourteenth aspect of the present invention causes a computer to perform a process of deriving in-image irradiation positions, which correspond to irradiation positions of directional light rays which are light rays each having directivity onto a subject, within a captured image acquired by imaging the subject by an imaging unit which images the subject, based on a distance measured by a measurement unit which measures the distance to the subject by emitting the directional light rays to the subject and receiving reflection light rays of the directional light rays, the imaging unit and the measurement unit being included in a distance measurement device, and deriving derivation accuracy corresponding to an actually present factor based on a first correspondence relation between assumption factors assumed as factors influencing the in-image irradiation positions and derivation accuracy of the in-image irradiation positions, and outputting information based on the derived derivation accuracy.

Therefore, according to the distance measurement program according to the fourteenth aspect of the present invention, the user can easily ascertain the information based on the derivation accuracy of the in-image irradiation position compared to a case where the information based on the derivation accuracy of the in-image irradiation position is not output even though a factor influencing the in-image irradiation position is actually present.

According to one embodiment of the present invention, an effect of allowing a user to easily ascertain information based on derivation accuracy of a dimension of a real-space region is acquired compared to a case where the information based on the derivation accuracy of the dimension of the real-space region is not output even though a factor influencing an in-image irradiation position is actually present.

According to another embodiment of the present invention, an effect of allowing a user to easily ascertain information based on derivation accuracy of an in-image irradiation position is acquired compared to a case where the information based on the derivation accuracy of the in-image irradiation position is not output even though a factor influencing the in-image irradiation position is actually present.

BRIEF DESCRIPTION OF THE DRAWINGS

FIG. 7 is an explanatory diagram for describing a method of measuring a dimension (length) of a designated region.

FIG. 8 is a functional block diagram showing a function of main parts of a CPU included in the distance measurement device according to the first to third embodiments.

FIG. 9 is a conceptual diagram showing an example of a position and distance table included in the distance measurement device according to the first to third embodiments.

FIG. 10 is a conceptual diagram showing an example of a factor and accuracy table included in the distance measurement device according to the first to third embodiments.

FIG. 17 is a screen diagram showing an example of an irradiation position adjustment recommendation screen according to the first to third embodiments.

FIG. 18 is a screen diagram showing an example of a provisional measurement and provisional imaging guide screen according to the first to third embodiments.

FIG. 19 is a screen diagram showing an example of a re-performing guide screen according to the first to third embodiments.

DESCRIPTION OF THE PREFERRED EMBODIMENTS

Hereinafter, an example of an embodiment related to a technology of the present disclosure will be described with reference to the accompanying drawings. In the present embodiment, a distance between a distance measurement device and a subject as a measurement target is simply referred to as a distance for the sake of convenience in description. In the present embodiment, an angle of view (an angle of view on a subject image indicating the subject) on the subject is simply referred to as an "angle of view".

First Embodiment

Figure 1:
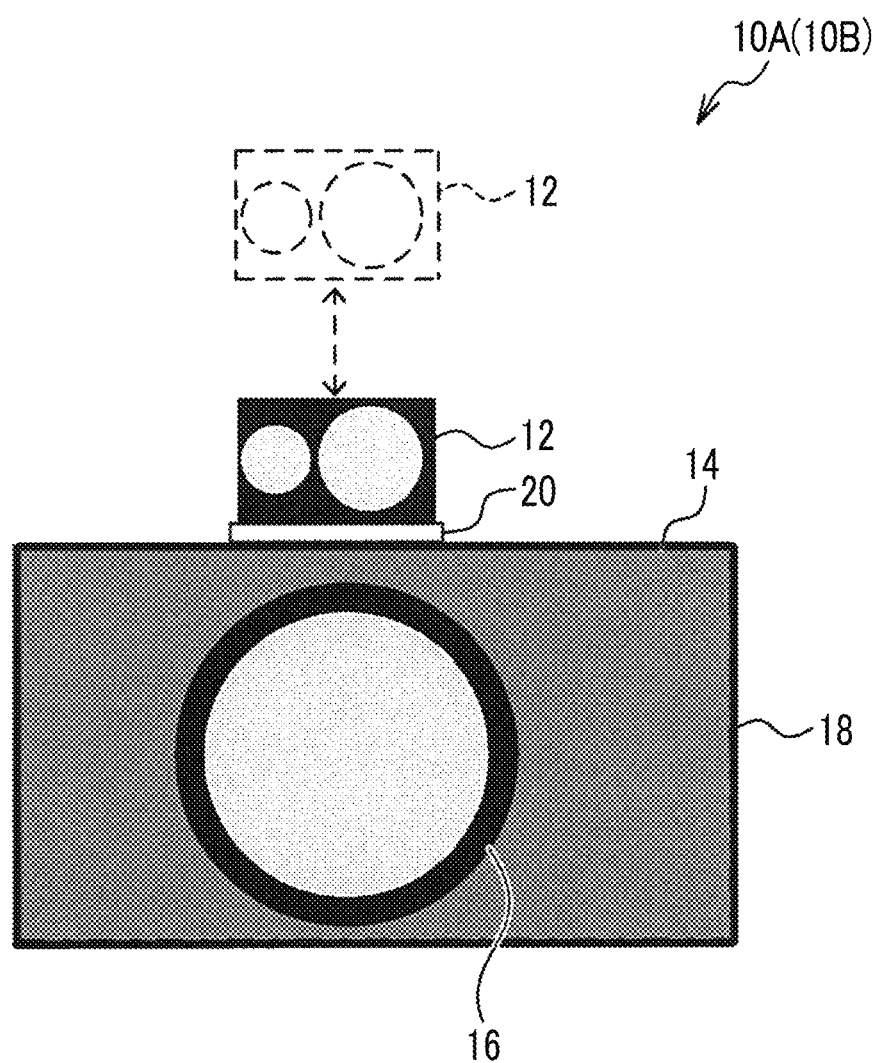
FIG. 1 is a front view showing an example of an external appearance of a distance measurement device according to first and second embodiments.

For example, a distance measurement device 10A according to the first embodiment includes a distance measurement unit 12 and an imaging device 14 as shown in FIG. 1. In the present embodiment, the distance measurement unit 12 and a distance measurement control unit 68 (see FIG. 2) to be described below are examples of a measurement unit according to the technology of the present disclosure, and the imaging device 14 is an example of an imaging unit according to the technology of the present disclosure.

The imaging device 14 includes a lens unit 16 and an imaging device main body 18, and the lens unit 16 is detachably attached to the imaging device main body 18.

A hot shoe 20 is provided on a top surface of the imaging device main body 18, and the distance measurement unit 12 is detachably attached to the hot shoe 20.

The distance measurement device 10A has a distance measurement system function of measuring a distance by emitting a laser beam for distance measurement to the distance measurement unit 12, and an imaging system function of causing the imaging device 14 to acquire a captured image by imaging the subject. Hereinafter, the captured image acquired by imaging the subject by using the imaging device 14 by utilizing the imaging system function is simply referred to as an "image" or a "captured image" for the sake of convenience in description.

The distance measurement device 10A performs one measurement sequence (see FIG. 3) according to one instruction by utilizing the distance measurement system function, and ultimately outputs one distance by performing the one measurement sequence. In the present embodiment, actual measurement and provisional measurement are selectively performed by utilizing the distance measurement system function according to an instruction of a user. The actual measurement means measurement in which a distance measured by utilizing the distance measurement system function is actually used, and the provisional measurement means measurement performed in a preparation stage of increasing the accuracy of the actual measurement.

The distance measurement device 10A has, as an operation mode of the imaging system function, a still image imaging mode and a video imaging mode. The still image imaging mode is an operation mode for imaging a still image, and the video imaging mode is an operation mode of imaging a motion picture. The still image imaging mode and the video imaging mode are selectively set according to an instruction of the user.

In the present embodiment, the actual imaging and the provisional imaging are selectively performed by utilizing the imaging system function according to an instruction of the user. The actual imaging is imaging performed in synchronization with the actual measurement, and the provisional imaging is imaging performed in synchronization with the provisional measurement. Hereinafter, for the sake of convenience in description, an image acquired through the actual imaging is referred to as an "actual captured image", and an image acquired through the provisional imaging is referred to as a "provisional captured image". In a case where it is not necessary to distinguish between the "actual captured image" and the "provisional captured image", the actual captured image and the provisional captured image are referred to as an "image" or a "captured image". Hereinafter, for the sake of convenience in description, the "actual captured image" is also referred to as an "actual image", and the "provisional captured image" is also referred to as a "provisional image".

The distance measurement device 10A has, as an operation mode of the distance measurement system function, a distance deriving mode and a dimension deriving mode. The distance deriving mode is an operation mode in which the distance measurement device 10A measures a distance. The dimension deriving mode is an operation mode in which a dimension of a real-space region designated by the user is derived based on the distance measured by the distance measurement device 10A by utilizing a dimension deriving function.

Hereinafter, an example in which a length between two points in a real space is derived as the dimension of the real-space region will be described for the sake of convenience in description. Hereinafter, a region "between two points in the real space" is also referred to as a "region in the real space" or is simply referred to as a "region" for the sake of convenience in description.

Figure 2:
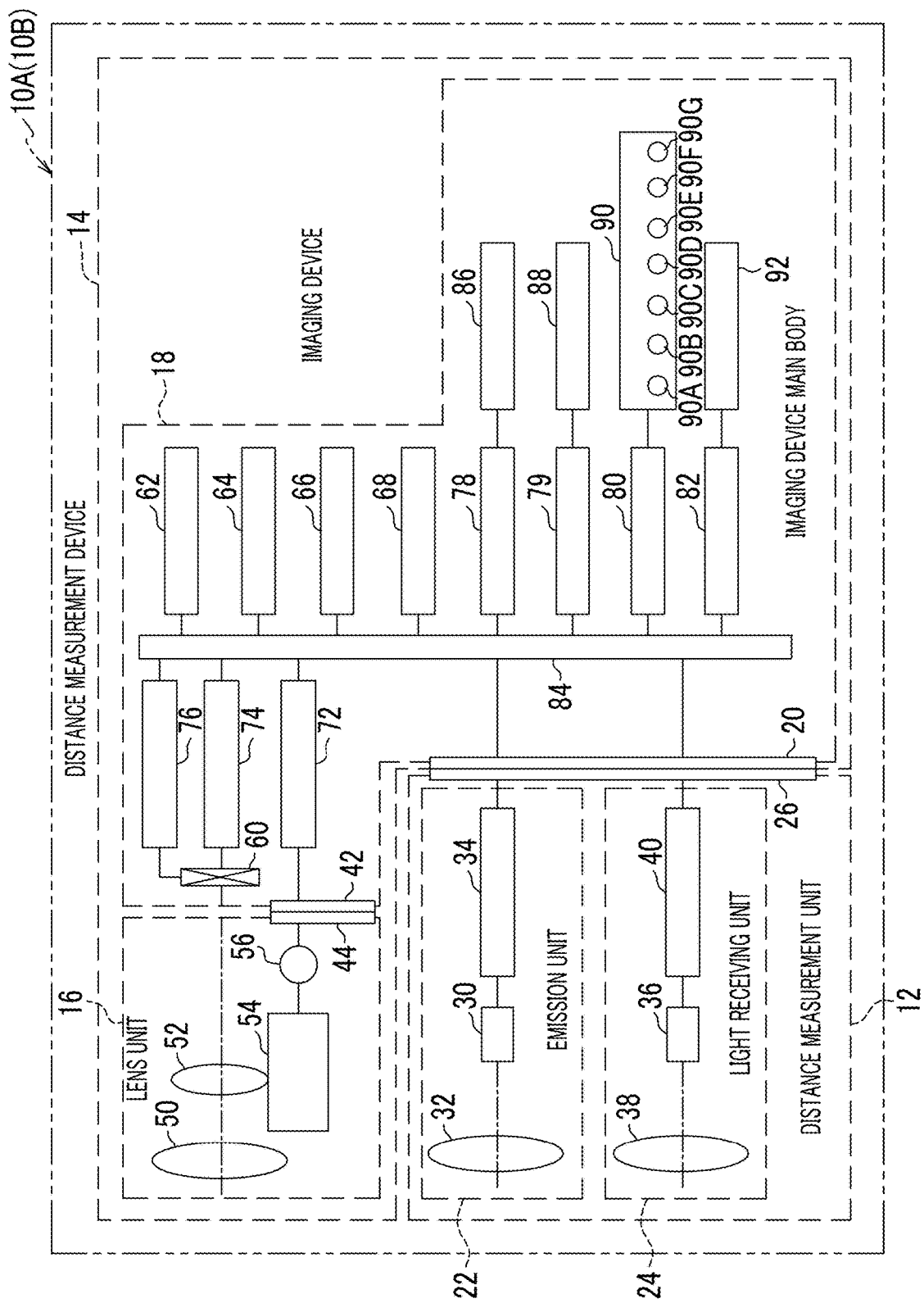
FIG. 2 is a block diagram showing an example of a hardware configuration of main parts of the distance measurement device according to the first and second embodiments.

For example, the distance measurement unit 12 includes an emission unit 22, a light receiving unit 24, and a connector 26, as shown in FIG. 2.

The connector 26 is able to be connected to the hot shoe 20, and the distance measurement unit 12 is operated under the control of the imaging device main body 18 in a state in which the connector 26 is connected to the hot shoe 20.

The emission unit 22 includes a laser diode (LD) 30, a condenser lens (not shown), an object lens 32, and an LD driver 34.

The condenser lens and the object lens 32 are provided along an optical axis of a laser beam emitted by the LD 30, and the condenser lens and the object lens 32 are arranged in order along the optical axis from the LD 30.

The LD 30 emits a laser beam for distance measurement which is an example of directional light according to the technology of the present disclosure. The laser beam emitted by the LD 30 is a colored laser beam. For example, as long as the subject is separated from the emission unit 22 in a range of about several meters, an irradiation position of the laser beam is visually recognized in a real space, and is visually recognized from the captured image acquired by the imaging device 14.

The condenser lens concentrates the laser beam emitted by the LD 30, and causes the concentrated laser beam to pass. The object lens 32 faces the subject, and emits the laser beam that passes through the condenser lens to the subject.

The LD driver 34 is connected to the connector 26 and the LD 30, and drives the LD 30 in order to emit the laser beam according to an instruction of the imaging device main body 18.

The light receiving unit 24 includes a photodiode (PD) 36, an object lens 38, and a light-receiving signal processing circuit 40. The object lens 38 is disposed on a light receiving surface of the PD 36. After the laser beam emitted by the emission unit 22 reaches the subject, a reflection laser beam which is a laser beam reflected from the subject is incident on the object lens 38. The object lens 38 factors the reflection laser beam to pass, and guides the reflection laser beam to the light receiving surface of the PD 36. The PD 36 receives the reflection laser beam that passes through the object lens 38, and outputs an analog signal corresponding to a light reception amount, as a light-receiving signal.

The light-receiving signal processing circuit 40 is connected to the connector 26 and the PD 36, amplifies the light-receiving signal input from the PD 36 by an amplifier (not shown), and performs analog-to-digital (A/D) conversion on the amplified light-receiving signal. The light-receiving signal processing circuit 40 outputs the light-receiving signal digitized through the A/D conversion to the imaging device main body 18.

The imaging device 14 includes mounts 42 and 44. The mount 42 is provided at the imaging device main body 18, and the mount 44 is provided at the lens unit 16. The lens unit 16 is attached to the imaging device main body 18 so as to be replaceable by coupling the mount 42 to the mount 44.

The lens unit 16 includes an imaging lens 50, a zoom lens 52, a zoom lens moving mechanism 54, and a motor 56.

Subject light which is reflected from the subject is incident on the imaging lens 50. The imaging lens 50 factors the subject light to pass, and guides the subject light to the zoom lens 52.

The zoom lens 52 is attached to the zoom lens moving mechanism 54 so as to slide along the optical axis. The motor 56 is connected to the zoom lens moving mechanism 54. The zoom lens moving mechanism 54 receives a power of the motor 56, and factors the zoom lens 52 to slide along an optical axis direction.

The motor 56 is connected to the imaging device main body 18 through the mounts 42 and 44, and the driving of the motor is controlled according to a command from the imaging device main body 18. In the present embodiment, a stepping motor is used as an example of the motor 56. Accordingly, the motor 56 is operated in synchronization with a pulsed power according to a command from the imaging device main body 18.

The imaging device main body 18 includes an imaging element 60, a main control unit 62, an image memory 64, an image processing unit 66, a distance measurement control unit 68, a motor driver 72, an imaging element driver 74, an image signal processing circuit 76, and a display control unit 78. The imaging device main body 18 includes a touch panel interface (I/F) 79, a reception I/F 80, and a media I/F 82.

The main control unit 62, the image memory 64, the image processing unit 66, the distance measurement control unit 68, the motor driver 72, the imaging element driver 74, the image signal processing circuit 76, and the display control unit 78 are connected to a busline 84. The touch panel I/F 79, the reception I/F 80, and the media I/F 82 are also connected to the busline 84.

The imaging element 60 is a complementary metal oxide semiconductor (CMOS) type image sensor, and includes a color filter (not shown). The color filter includes a G filter corresponding to green (G), an R filter corresponding to red (R), and a B filter corresponding to blue (B) which contribute to the acquisition of a brightness signal. The imaging element 60 includes a plurality of pixels (not shown) arranged in a matrix shape, and any filter of the R filter, the G filter, and the B filter included in the color filter is allocated to each pixel.

The subject light that passes through the zoom lens 52 is formed on an imaging surface which is the light receiving surface of the imaging element 60, and electric charges corresponding to the light reception amount of the subject light are accumulated in the pixels of the imaging element 60. The imaging element 60 outputs the charges accumulated in the pixels, as image signals indicating an image corresponding to a subject image acquired by forming the subject light on the imaging surface.

The main control unit 62 controls the entire distance measurement device 10A through the busline 84.

The motor driver 72 is connected to the motor 56 through the mounts 42 and 44, and controls the motor 56 according to an instruction of the main control unit 62.

The imaging device 14 has an angle-of-view changing function. The angle-of-view changing function is a function of changing an angle of view on the subject by moving the zoom lens 52. In the present embodiment, the angle-of-view changing function is realized by the zoom lens 52, the zoom lens moving mechanism 54, the motor 56, the motor driver 72, and the main control unit 62. Although it has been described in the present embodiment that the optical angle-of-view changing function using the zoom lens 52 is used, the technology of the present disclosure is not limited thereto, and an electronic angle of view changing function without using the zoom lens 52 may be used.

The imaging element driver 74 is connected to the imaging element 60, and supplies drive pulses to the imaging element 60 under the control of the main control unit 62. The pixels of the imaging element 60 are driven according to the drive pulses supplied by the imaging element driver 74.

The image signal processing circuit 76 is connected to the imaging element 60, and reads image signals corresponding to one frame for every pixel out of the imaging element 60 under the control of the main control unit 62. The image signal processing circuit 76 performs various processing tasks such as correlative double sampling processing, automatic gain adjustment, and A/D conversion on the readout image signals. The image signal processing circuit 76 outputs image signals digitized by performing various processing tasks on the image signals for every frame to the image memory 64 at a specific frame rate (for example, tens of frames/second) prescribed by an analog signal supplied from the main control unit 62. The image memory 64 provisionally retains the image signals input from the image signal processing circuit 76.

The imaging device main body 18 includes a display unit 86, a touch panel 88, a reception device 90, and a memory card 92.

The display unit 86 which is an example of a warning unit according to the technology of the present disclosure is connected to the display control unit 78, and displays various information items under the control of the display control unit 78. The display unit 86 is realized by a liquid crystal display (LCD), for example.

The touch panel 88 is layered on a display screen of the display unit 86, and senses touch using a pointer such as a finger of the user and/or a touch pen. The touch panel 88 is connected to the touch panel I/F 79, and outputs positional information indicating a position touched by the pointer to the touch panel I/F 79. The touch panel I/F 79 activates the touch panel 88 according to an instruction of the main control unit 62, and outputs the positional information input from the touch panel 88 to the main control unit 62.

The reception device 90 includes an actual measurement and actual imaging button 90A, a provisional measurement and provisional imaging button 90B, an imaging system operation mode switching button 90C, a wide angle instruction button 90D, and a telephoto instruction button 90E. The reception device 90 includes a measurement system operation mode switching button 90F and an irradiation position adjustment button 90G and receives various instructions from the user. The reception device 90 is connected to the reception I/F 80, and the reception I/F 80 outputs an instruction content signal indicating the content of the instruction received by the reception device 90 to the main control unit 62.

The actual measurement and actual imaging button 90A is a pressing type button that receives an instruction to start the actual measurement and the actual imaging. The provisional measurement and provisional imaging button 90B is a pressing type button that receives an instruction to start the provisional measurement and the provisional imaging. The imaging system operation mode switching button 90C is a pressing type button that receives an instruction to switch between the still image imaging mode and the video imaging mode.

The wide angle instruction button 90D is a pressing type button that receives an instruction to change the angle of view to a wide angle, and a degree of the angle of view changed to the wide angle is determined in an allowable range depending on a pressing time during which the wide angle instruction button 90D is continuously pressed.

The telephoto instruction button 90E is a pressing type button that receives an instruction to change the angle of view to an angle of a telephoto lens, and a degree of the angle of view changed to the angle of the telephoto lens is determined in an allowable range depending on a pressing time during which the telephoto instruction button 90E is continuously pressed.

The measurement system operation mode switching button 90F is a pressing type button that receives an instruction to switch between the distance deriving mode and the dimension deriving mode. The irradiation position adjustment button 90G is a pressing type button that receives an instruction to adjust an in-image irradiation position.

Hereinafter, the actual measurement and actual imaging button and the provisional measurement and provisional imaging button are referred to as a "release button" for the sake of convenience in description in a case where it is not necessary to distinguish between the actual measurement and actual imaging button 90A and the provisional measurement and provisional imaging button 90B. Hereinafter, the wide angle instruction button and the telephoto instruction button are referred to as an "angle-of-view instruction button" for the sake of convenience in description in a case where it is not necessary to distinguish between the wide angle instruction button 90D and the telephoto instruction button 90E.

In the distance measurement device 10A according to the present embodiment, a manual focus mode and an auto focus mode are selectively set according to an instruction of the user through the reception device 90. The release button receives two-step pressing operations including an imaging preparation instruction state and an imaging instruction state. For example, the imaging preparation instruction state refers to a state in which the release button is pressed down from a waiting position to an intermediate position (half pressed position), and the imaging instruction state refers to a state in which the release button is pressed down to a finally pressed-down position (fully pressed position) beyond the intermediate position. Hereinafter, for the sake of convenience in description, a "state in which the release button is pressed down from the waiting position to the half pressed position" is referred to as a "half pressed state", and a "state in which the release button is pressed down from the waiting position to the fully pressed position" is referred to as a "fully pressed state".

In the auto focus mode, after an imaging condition is adjusted by setting the release button to be in the half pressed state, actual exposing is subsequently performed by setting the release button to be in the fully pressed state. That is, in a case where the release button is set to be in the half pressed state before the actual exposing is performed, an automatic exposure (AE) function, and thus, exposure is adjusted. Thereafter, a focus is adjusted by performing auto-focus (AF) function, and the actual exposing is performed in a case where the release button is set to be in the fully pressed state.

In this example, the actual exposing refers to exposing performed in order to acquire a still image file to be described below. In the present embodiment, the exposing means exposing performed in order to acquire a live view image to be described below and exposition performed in order to acquire a motion picture image file to be described below in addition to the actual exposing. Hereinafter, for the sake of convenience in description, the exposing is simply referred to as "exposing" in a case where it is not necessary to distinguish between these exposing tasks.

In the present embodiment, the main control unit 62 performs the exposure adjustment using the AE function and the focus adjustment using the AF function. Although it has been described in the present embodiment that the exposure adjustment and the focus adjustment are performed, the technology of the present disclosure is not limited to thereto, and the exposure adjustment or the focus adjustment may be performed.

The image processing unit 66 acquires image signals for every frame from the image memory 64 at a specific frame rate, and performs various processing tasks such as gamma correction, luminance and color difference conversion, and compression processing on the acquired image signals.

The image processing unit 66 outputs the image signals acquired by performing various processing tasks to the display control unit 78 for every frame at a specific frame rate. The image processing unit 66 outputs the image signals acquired by performing various processing tasks to the main control unit 62 according to a request of the main control unit 62.

The display control unit 78 outputs the image signals input from the image processing unit 66 to the display unit 86 for every frame at a specific frame rate under the control of the main control unit 62.

The display unit 86 displays image and character information. The display unit 86 displays the image indicated by the image signals input from the display control unit 78 at a specific frame rate, as a live view image. The live view image is continuous frame images captured in continuous frames, and is also referred to as live preview image. The display unit 86 also displays the still image which is a single frame image captured in a single frame. The display unit 86 also displays a playback image and/or a menu screen in addition to the live view image.

Although the image processing unit 66 and the display control unit 78 are realized by an application specific integrated circuit (ASIC) in the present embodiment, the technology of the present disclosure is not limited thereto. For example, the image processing unit 66 and the display control unit 78 may be realized by a field-programmable gate array (FPGA). The image processing unit 66 may be realized by a computer including a central processing unit (CPU), a read only memory (ROM), and a random access memory (RAM). The display control unit 78 may also be realized by a computer including a CPU, a ROM, and a RAM. The image processing unit 66 and the display control unit 78 may be realized by combining of a hardware configuration and a software configuration.

In a case where an instruction to image the still image is received by the release button in the still image imaging mode, the main control unit 62 factors the imaging element 60 to expose one frame by controlling the imaging element driver 74. The main control unit 62 acquires the image signals acquired by exposing one frame from the image processing unit 66, and generates the still image file having a specific still image format by performing a compression process on the acquired image signals. For example, the specific still image format refers to the Joint Photographic Experts Group (JPEG).

In a case where an instruction to image the motion picture is received by the release button in the video imaging mode, the main control unit 62 acquire the image signals output to the display control unit 78 in order to be used as the live view image, by the image processing unit 66 for every frame at a specific frame rate. The main control unit 62 generates a motion picture file having a specific motion picture format by performing the compression process on the image signals acquired from the image processing unit 66. For example, the specific motion picture format refers to the Moving Picture Experts Group (MPEG). Hereinafter, the still image file and the motion picture file are referred to as the image file for the sake of convenience in description in a case where it is not necessary to distinguish between the still image file and the motion picture file.

The media I/F 82 is connected to the memory card 92, and records and reads the image file in and out of the memory card 92 under the control of the main control unit 62. The main control unit 62 performs a decompression process on the image file read out of the memory card 92 by the media I/F 82, and displays the decompressed image file as a playback image on the display unit 86.

The main control unit 62 stores distance measurement information including at least one of distance information input from the distance measurement control unit 68 or dimension information indicating a dimension derived by utilizing a dimension deriving function to be described below in association with the image file in the memory card 92 through the media I/F 82. The distance measurement information together with the image file is read out of the memory card 92 by the main control unit 62 through the media I/F 82. In a case where the distance information is included in the distance measurement information read out by the main control unit 62, the distance indicated by the distance information together with the playback image which is the associated image file is displayed on the display unit 86. In a case where the dimension information is included in the distance measurement information read out by the main control unit 62, the dimension indicated by the dimension information together with the playback image which is the associated image file is displayed on the display unit 86.

The distance measurement control unit 68 controls the distance measurement unit 12 under the control of the main control unit 62. In the present embodiment, the distance measurement control unit 68 is realized by ASIC, but the technology of the present disclosure is not limited thereto. For example, the distance measurement control unit 68 may be realized by FPGA. The distance measurement control unit 68 may be realized by a computer including a CPU, a ROM, and a RAM. The distance measurement control unit 68 may be realized by the combination of the hardware configuration and the software configuration.

The hot shoe 20 is connected to the busline 84. Under the control of the main control unit 62, the distance measurement control unit 68 controls the emission of the laser beam from the LD 30 by controlling the LD driver 34, and acquires light-receiving signal from the light-receiving signal processing circuit 40. The distance measurement control unit 68 derives a distance to the subject based on a timing when the laser beam is emitted and a timing when the light-receiving signal is acquired, and outputs distance information indicating the derived distance to the main control unit 62.

The measurement of the distance to the subject using the distance measurement control unit 68 will be described in more detail.

Figure 3:
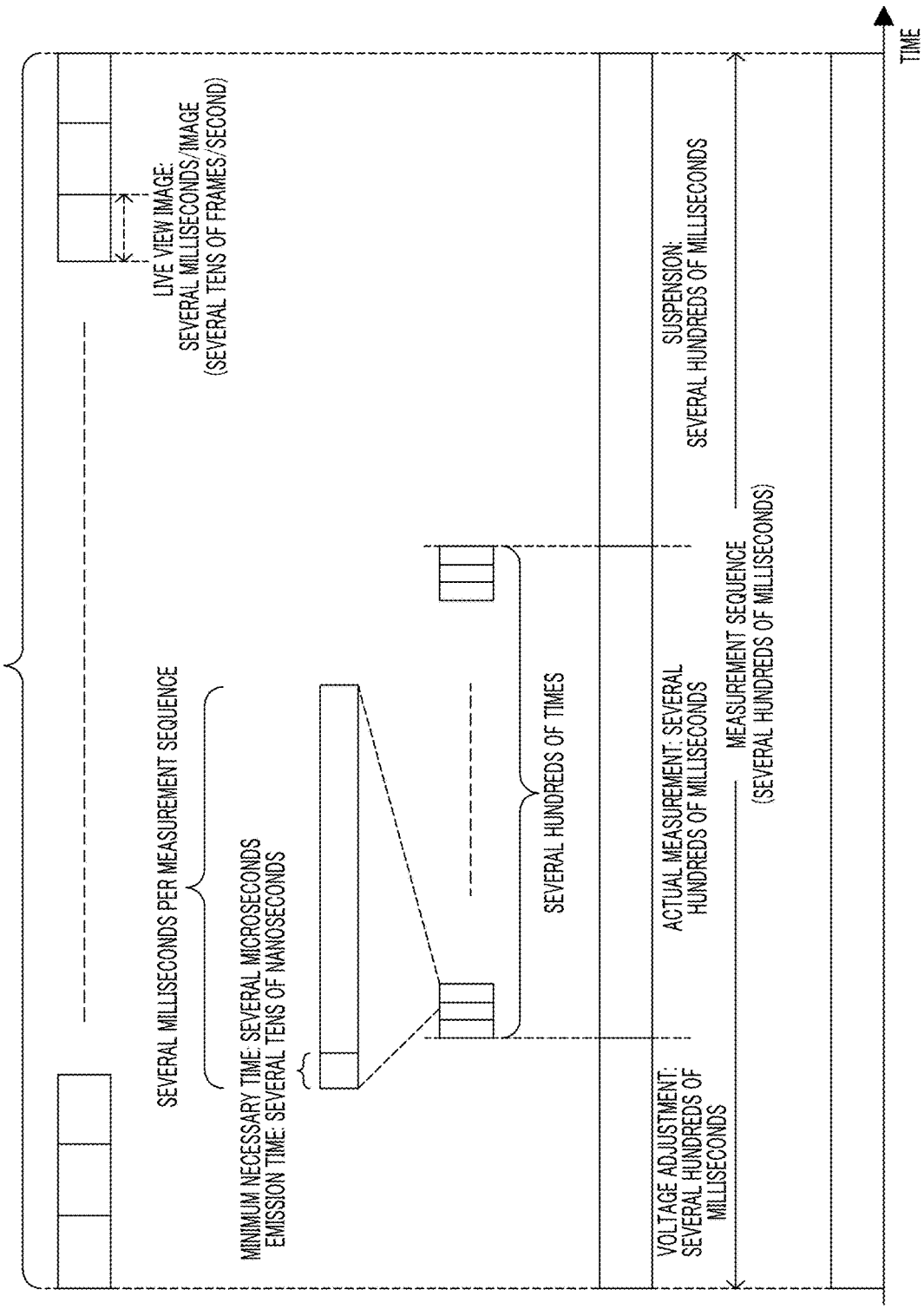
FIG. 3 is a time chart showing an example of a measurement sequence using the distance measurement device according to the first to third embodiments.

For example, one measurement sequence using the distance measurement device 10A is prescribed by a voltage adjustment period, an actual measurement period, and a suspension period, as shown in FIG. 3.

The voltage adjustment period is a period during which driving voltages of the LD 30 and the PD 36 are adjusted. The actual measurement period is a period during which the distance to the subject is actually measured. For the actual measurement period, an operation for causing the LD 30 to emit the laser beam and causing the PD 36 to receive the reflection laser beam hundreds of times is repeated several hundreds of times, and the distance to the subject is derived based on the timing when the laser beam is emitted and the timing when the light-receiving signal is acquired. The suspension period is a period during which the driving of the LD 30 and the PD 36 is suspended. Thus, in one measurement sequence, the measurement of the distance to the subject is performed hundreds of times.

In the present embodiment, each of the voltage adjustment period, the actual measurement period, and the suspension period is hundreds of milliseconds.

Figure 4:
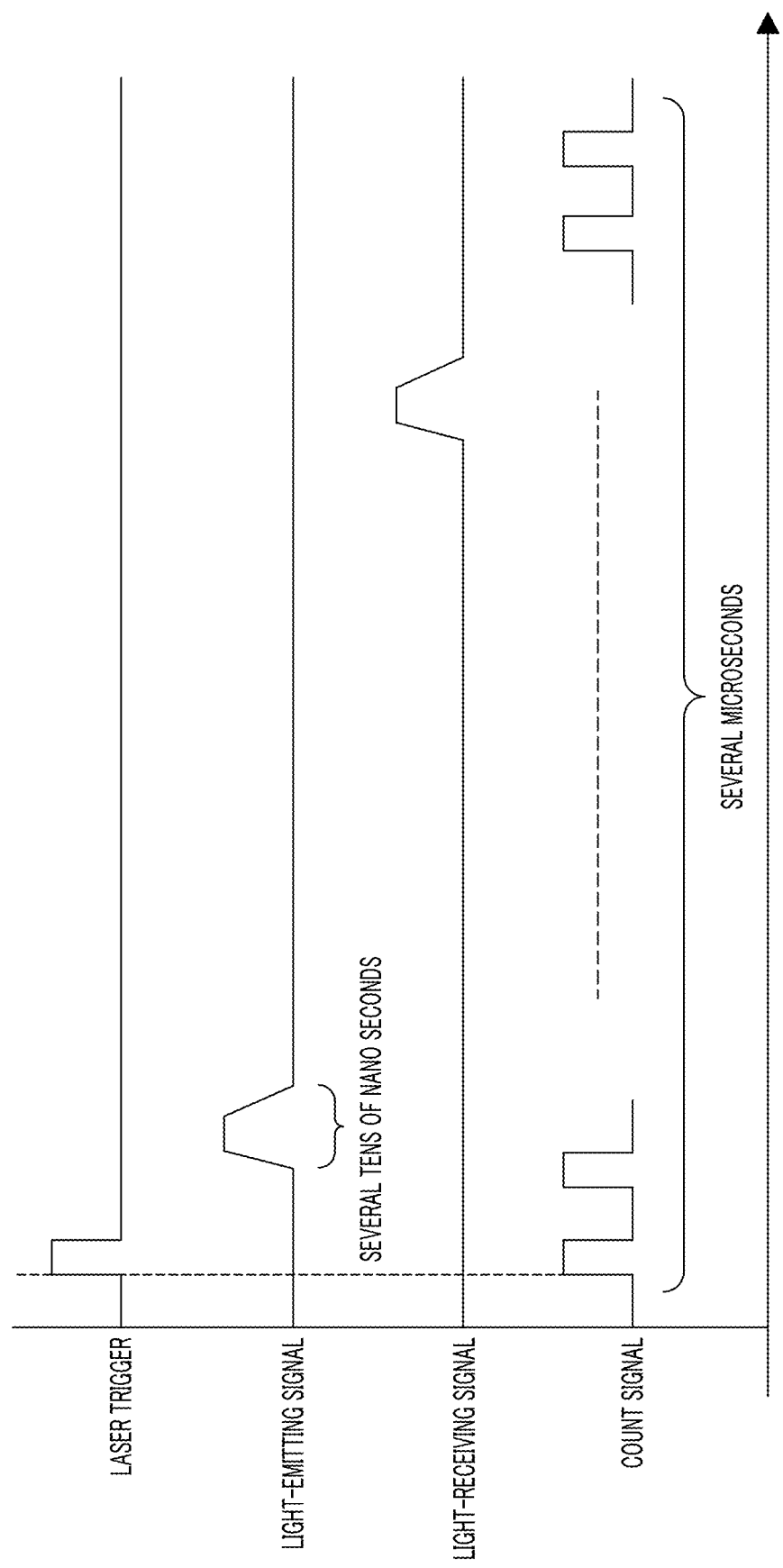
FIG. 4 is a time chart showing an example of a laser trigger, a light-emitting signal, a light-receiving signal, and a count signal required in a case where measurement using the distance measurement device according to the first to third embodiments is performed once.

For example, as shown in FIG. 4, count signals that prescribe a timing when the distance measurement control unit 68 outputs an instruction to emit the laser beam and a timing when the distance measurement control unit 68 acquires the light-receiving signal are supplied to the distance measurement control unit 68. In the present embodiment, the count signals are generated by the main control unit 62 and are supplied to the distance measurement control unit 68, but the present embodiment is not limited thereto. The count signals may be generated by a dedicated circuit such as a time counter connected to the busline 84, and may be supplied to the distance measurement control unit 68.

The distance measurement control unit 68 outputs a laser trigger for emitting the laser beam to the LD driver 34 in response to the count signal. The LD driver 34 drives the LD 30 to emit the laser beam in response to the laser trigger.

In the example shown in FIG. 4, a time during which the laser beam is emitted is tens of nanoseconds. A time during which the laser beam emitted to the subject far away from the emission unit 22 by several kilometers is received as the reflection laser beam by the PD 36 is "several kilometers× 2/light speed"=several microseconds. Accordingly, for example, it takes a time of several microseconds as a minimum necessary time to measure the distance to the subject far away by several kilometers, as shown in FIG. 3.

In the present embodiment, for example, although a time during which the measurement is performed once is several milliseconds with consideration for a time during which the laser beam travels in a reciprocating motion as shown in FIG. 3, since the time during which the laser beam travels in the reciprocating motion varies depending on the distance to the subject, the measurement time per one time may vary depending on an assumed distance.

For example, in a case where the distance to the subject is derived based on the measurement values acquired through the measurement performed several hundreds of times in one measurement sequence, the distance measurement control unit 68 derives the distance to the subject by analyzing a histogram of the measurement values acquired through the measurement performed several hundreds of times.

Figure 5:
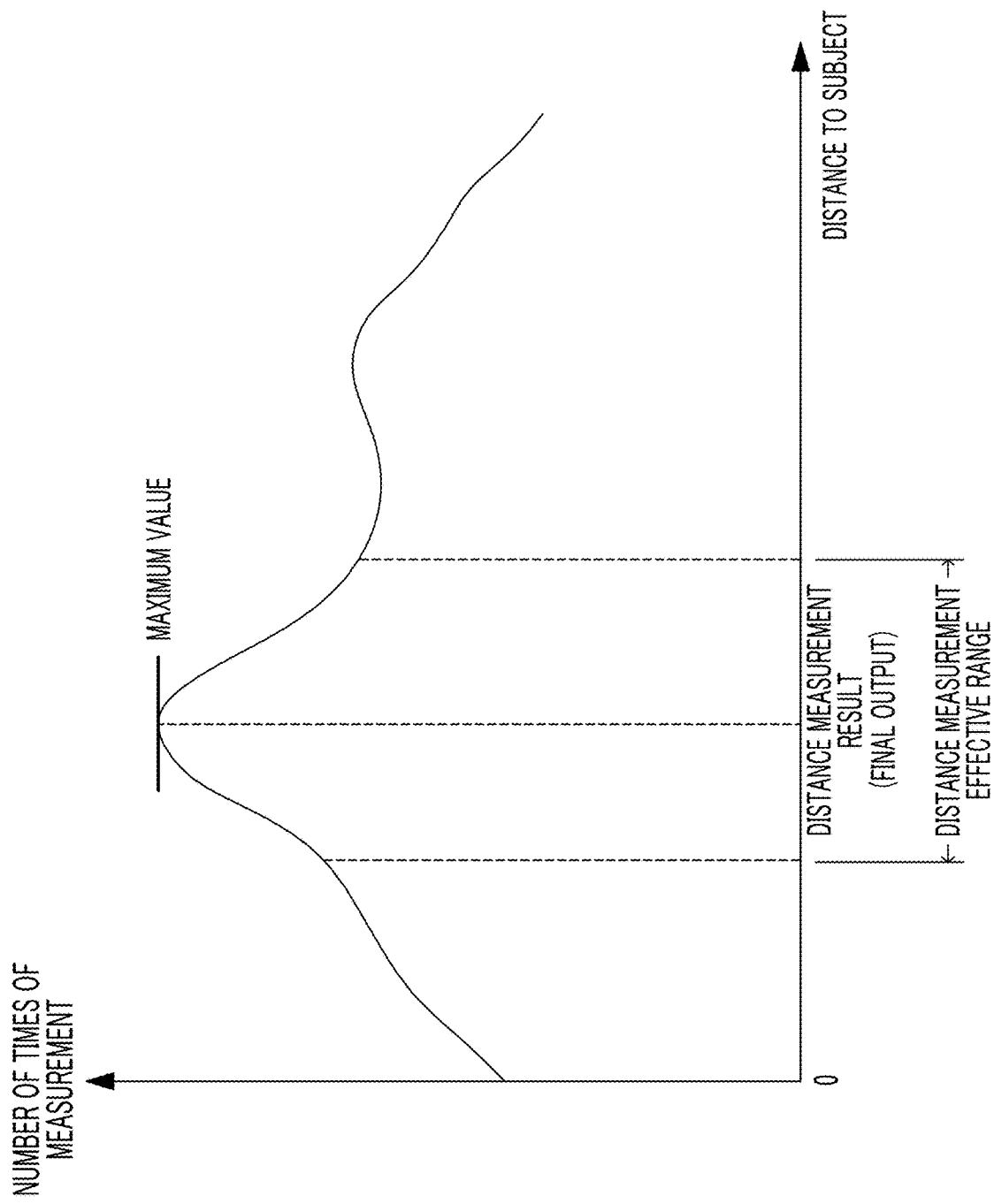
FIG. 5 is a graph showing an example of a histogram (a histogram in a case where a lateral axis represents a distance (measurement value) to the subject and a longitudinal axis represents the number of times the measurement is performed) of measurement values acquired in the measurement sequence using the distance measurement device according to the first to third embodiments.

For example, in the histogram of the measurement values acquired through the measurement performed several hundreds of times in one measurement sequence as shown in FIG. 5, a lateral axis represents the distance to the subject, and a longitudinal axis is the number of times the measurement is performed. The distance corresponding to the maximum value of the number of times the measurement is performed is derived as the distance measurement result by the distance measurement control unit 68. The histogram shown in FIG. 5 is merely an example, and the histogram may be generated based on the time during which the laser beam travels in the reciprocating motion (an elapsed time from when the laser beam is emitted to when the laser beam is received) and/or ½ of the time during which the laser beam travels in the reciprocating motion instead of the distance to the subject.

Figure 6:
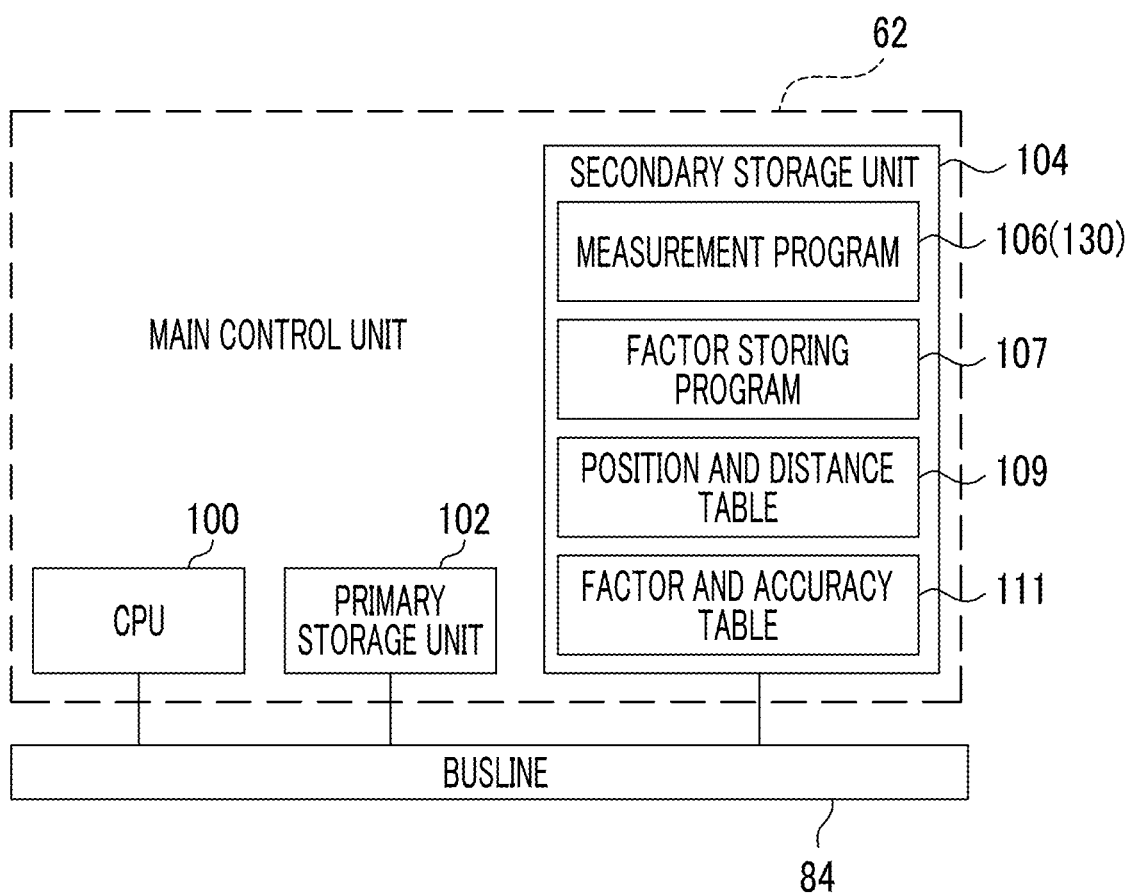
FIG. 6 is a block diagram showing an example of a hardware configuration of a main control unit included in the distance measurement device according to the first to third embodiments.

For example, the main control unit 62 includes the CPU 100 which is an example of a deriving unit and an output unit according to the technology of the present disclosure, as shown in FIG. 6. The main control unit 62 includes a primary storage unit 102 and a secondary storage unit 104. The CPU 100 controls the entire distance measurement device 10A. The primary storage unit 102 is a volatile memory used as a work area when various programs are executed. A RAM is used as an example of the primary storage unit 102. The secondary storage unit 104 is a non-volatile memory that previously stores various parameters and/or control programs for controlling the activation of the distance measurement device 10A. Electrically erasable programmable read only memory (EEPROM) and/or a flash memory are used as an example of the secondary storage unit 104. The CPU 100, the primary storage unit 102, and the secondary storage unit 104 are connected to each other through the busline 84.

Incidentally, the distance measurement device 10A has the dimension deriving function. For example, as shown in FIG. 7, the dimension deriving function refers to a function of deriving a length L of a region in a real space included in the subject based on addresses u1 and u2 of the designated pixels and a distance D measured by the distance measurement device 10A or deriving an area based on the length L. For example, the "designated pixels" refer to pixels of the imaging element 60 corresponding to two points designated by the user on the live view image. For example, the length L is derived from the following Expression (1). In Expression (1), p is a pitch between pixels included in the imaging element 60, u1 and u2 are addresses of the pixels designated by the user, and f is a focal length of the imaging lens 50.

[Expression 1]

$$L = D \times \left\{ \frac{p(u1 - u2)}{f} \right\} \quad (1)$$

Expression (1) is an expression used on the assumption that a target as a dimension deriving target is captured in a state in which the target faces the imaging lens 50 in front view. Accordingly, in the distance measurement device 10A, for example, in a case where the subject including the target as the dimension deriving target is captured in a state in which the target does not face the imaging lens 50 in front view, a projection conversion process is performed. For example, the projection conversion process refers to a process of converting the captured image acquired through the imaging and/or an image of a square portion of the captured image into a facing view image based on the square image included in the captured image by using the known technology such as affine transformation. The facing view image refers to an image in a state in the subject faces the imaging lens 50 in front view. The addresses u1 and u2 of the pixels of the imaging element 60 are designated through the facing view image, and the length L is derived from Expression (1).

As stated above, it is preferable that an in-image irradiation position is derived with high accuracy and is ascertained together with the distance by the user in order to accurately derive the length L of the region in the real space based on the addresses u1 and u2. The reason is that the derived length L is completely different from the actual length in a case where it is assumed that the in-image irradiation position and the irradiation position of the laser beam in the real space are positions on planes of which orientations and positions are different.

In order to derive the in-image irradiation position with high accuracy, a method of causing the distance measurement device 10A to perform a data acquisition process for deriving the irradiation position (see FIG. 14) to be described is considered. For example, in a case where the data acquisition process for deriving the irradiation position is performed by the distance measurement device 10A, position and distance correspondence information is acquired as deriving data for deriving a parameter (see Table 1) used in the deriving of the in-image irradiation position based on the distance measured by utilizing the distance measurement system function.

Figure 15:
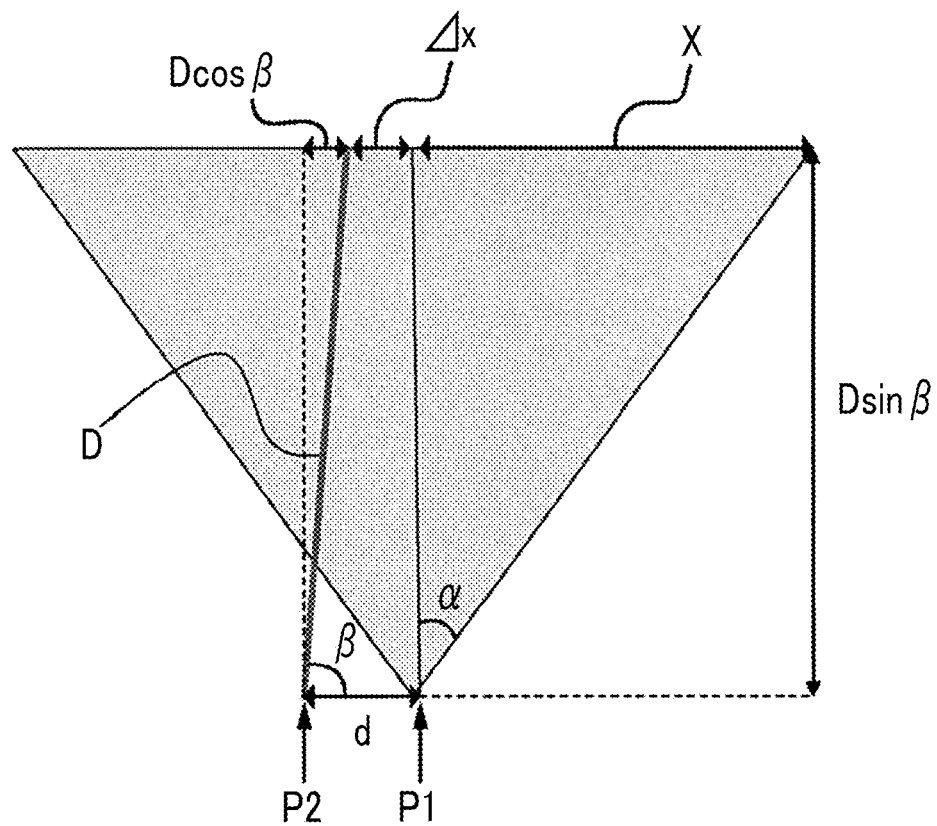
FIG. 15 is an explanatory diagram for describing a parameter that influences an in-image irradiation position.

In the present embodiment, the parameters refer to a half angle of view α, an emission angle β, and an inter-reference-point distance d, as shown in FIG. 15. The half angle of view α a refers to half of the angle of view on the subject captured by the imaging device 14. The emission angle β refers to an angle at which the laser beam is emitted from the emission unit 22. The inter-reference-point distance d refers to a distance between a first reference point P1 prescribed for the imaging device 14 and a second base reference point P2 prescribed for the distance measurement unit 12. A main point of the imaging lens 50 is used as an example of the first reference point P1. A point previously set as an origin of coordinates capable of specifying a position of the distance measurement unit 12 in a three dimensional space is used as an example of the second reference point P2. Specifically, an end of front-view left and right ends of the object lens 38 or one vertex of a housing (not shown) of the distance measurement unit 12 in a case where the housing has a cuboid shape.

As shown in a measurement process (see FIG. 12) to be described below, the in-image irradiation position is derived based on the distance measured by utilizing the distance measurement system function and position and distance correspondence information (to be described below) acquired as the deriving data by performing the data acquisition process for deriving the irradiation position by the distance measurement device 10A.

In a case where the user wishes to constantly ascertain the in-image irradiation position with high accuracy, it is preferable that the data acquisition process for deriving the irradiation position is performed whenever an irradiation position influence factor (for example, the replacement of the lens of the imaging unit or the change in the angle of view) which is a factor influencing the in-image irradiation position occurs.

However, it is troublesome to cause the distance measurement device 10A to perform the data acquisition process for deriving the irradiation position whenever the irradiation position influence factor occurs. Since the irradiation position influence factor is present, even though it is difficult to perform strict distance measurement, an approximate distance may be ascertained in some cases.

For example, in the distance measurement device 10A, the secondary storage unit 104 stores a measurement program 106 and a factor storing program 107, as shown in FIG. 6. The measurement program 106 and the factor storing program 107 are examples of a distance measurement program according to the technology of the present disclosure. Hereinafter, the measurement program 106 and the factor storing program 107 are referred to as the "program" without being assigned the references for the sake of convenience in description in a case where it is not necessary to distinguish between these programs.

For example, as shown in FIG. 8, the CPU 100 is operated as deriving units 100A1 and 100A2 and output units 100B1 and 100B2 by reading the program out of the secondary storage unit 104, loading the readout program into the primary storage unit 102, and executing the program. Hereinafter, the deriving units 100A1 and 100A2 are referred to as a "deriving unit 100A" in a case where it is not necessary to distinguish between these deriving units, and the output units 100B1 and 100B2 are referred to as an "output unit 100B" in a case where it is not necessary to distinguish between these output units.

The deriving unit 100A derives a dimension of a region corresponding to an interval between a plurality of pixels associated with the in-actual-image irradiation positions, which correspond to the irradiation positions of the laser beams used in the actual measurement using the distance measurement unit 12 and the distance measurement control unit 68, within an actual image acquired by performing the actual image using the imaging device 14, based on the distance measured by utilizing the distance measurement system function, the interval of the plurality of designated pixels, and a focal length of the imaging device 14.

The output unit 100B1 derives derivation accuracy corresponding to an irradiation position influence factor which is actually present in the distance measurement device 10A based on a factor and accuracy table 111 (see FIG. 10) to be described below, and outputs information based on the derived derivation accuracy.

The derivation accuracy derived by the output unit 100B1 is accuracy of the dimension derived by the deriving unit 100A1. In the present embodiment, the information based on the derivation accuracy output by the output unit 100B1 is an error of the dimension derived by the deriving unit 100A1.

The deriving unit 100A2 derives the in-actual-image irradiation position within the actual image acquired by performing the actual imaging using the imaging device 14 based on the distance measured by utilizing the distance measurement system function. The output unit 100B2 derives derivation accuracy corresponding to an irradiation position influence factor which is actually present in the distance measurement device 10A based on a factor and accuracy table 111 (see FIG. 10) to be described below, and outputs information based on the derived derivation accuracy.

The derivation accuracy output by the output unit 100B2 is accuracy of the in-actual-image irradiation position derived by the deriving unit 100A2. In the present embodiment, the information based on the derivation accuracy output by the output unit 100B2 is an error of the in-actual-image irradiation position derived by the deriving unit 100A2.

In the present embodiment, the derivation accuracy output by the output unit 100B1 and the derivation accuracy output by the output unit 100B2 are the same. Hereinafter, the derivation accuracy output by the output unit 100B1 and the derivation accuracy output by the output unit 100B2 are referred to as "derivation accuracy" for the sake of convenience in description in a case where it is not necessary to distinguish between these derivation accuracy.

For example, the secondary storage unit 104 stores a position and distance table 109 and the factor and accuracy table 111 as shown in FIG. 6.

For example, the position and distance table 109 stores position and distance correspondence information, as shown in FIG. 9. The position and distance correspondence information is information acquired by associating the distance acquired by performing processes of step 306 and 308 to be described with the in-provisional-image irradiation position for every in-provisional-image irradiation position specified by performing a process of step 316 to be described below. In the example shown in FIG. 9, the in-provisional-image irradiation positions $X_1$, $X_2$, and $X_3$ and the distances $D_1$, $D_2$, and $D_3$ are represented, and the in-provisional-image irradiation positions $X_1$, $X_2$, and $X_3$ and the distances $D_1$, $D_2$, and $D_3$ are updated whenever the data acquisition process for deriving the irradiation position is performed.

The in-provisional-image irradiation position described above refers to a position, which corresponds to the irradiation position of the laser beam onto the subject, within a provisional image acquired by performing the provisional imaging on the subject by the imaging device 14 whenever each of a plurality of distances is provisionally measured by the distance measurement unit 12 and the distance measurement control unit 68.

Hereinafter, the in-actual-image irradiation position and the in-provisional-image irradiation position are simply referred to as the "in-image irradiation position" in a case where it is not necessary to distinguish between the in-actual-image irradiation position and the in-provisional-image irradiation position for the sake of convenience in description. In the present embodiment, irradiation-position pixel coordinates are derived by the CPU 100, and the in-image irradiation position is specified from the derived irradiation-position pixel coordinates. That is, a case where the irradiation-position pixel coordinates are derived means that the in-image irradiation position is derived.

The position and distance correspondence information is an example of information indicating a second correspondence relation according to the technology of the present disclosure. The second correspondence relation according to the technology of the present disclosure is a correspondence relation between the in-provisional-image irradiation positions within the provisional image acquired by performing the provisional imaging on the subject whenever each of the plurality of distances is provisionally measured with the distances which are provisionally measured by the distance measurement unit 12 and the distance measurement control unit 68 by using the laser beams corresponding to the in-provisional-image irradiation positions.

That is, the in-provisional-image irradiation position specified by the position and distance correspondence information is an example of the "in-provisional-image irradiation position within the provisional image acquired by performing the provisional imaging on the subject by the imaging unit whenever each of the plurality of distances is provisionally measured" in the second correspondence relation according to the technology of the present disclosure. The distance specified by the position and distance correspondence information is an example of the "distance which is provisionally measured by the measurement unit by using the directional light corresponding to the in-provisional-image irradiation position" in the second correspondence relation according to the technology of the present disclosure.

For example, the factor and accuracy table 111 stores the factor and accuracy correspondence information which is an example of information indicating a first correspondence relation according to the technology of the present disclosure as shown in FIG. 10. The factor and accuracy correspondence information is information acquired by associating an assumption factor assumed as the irradiation position influence factor with the derivation accuracy derived by the deriving unit 100A.

In the present embodiment, the factor and accuracy correspondence information is fixed before the shipment of the distance measurement device 10A is performed. That is, the factor and accuracy table 111 stores the factor and accuracy correspondence information derived from a result of computer simulation based on a design specification of the distance measurement device 10A and/or examination using a real machine of the distance measurement device 10A before the shipment of the distance measurement device 10A is performed.

In the example shown in FIG. 10, derivation accuracy $\delta$, $\varepsilon$, $\zeta$, $\eta$, and $\lambda$ in a case where the assumption factor actually occurs are prescribed for the assumption factors. In the example shown in FIG. 10, the change in the angle of view, the replacement of the lens, the replacement of the distance measurement unit, the change in the emission direction, and a manufacturing variation are used as an example of the assumption factor.

The replacement of the lens refers to the replacement of only the imaging lens 50 of the lens unit 16 and the replacement of the lens unit 16 itself. The replacement of the distance measurement unit refers to the replacement of only the object lens 32 of the distance measurement unit 12, the replacement of only the object lens 38 of the distance measurement unit 12, and the replacement of the distance measurement unit 12 itself. The change in the angle of view refers to a change in the angle of view by the movement of the zoom lens 52 by pressing the angle-of-view instruction button. The change in the emission direction refers to a change in the direction in which the laser beam is emitted by the emission unit 22. The manufacturing variation is a variation on various characteristics in the manufacturing between a plurality of distance measurement devices 10A of which the types are the same.

(1) ... (n) shown in FIG. 10 are identification codes for identifying that the types of the assumption factors are the same but the contents thereof are different.

For example, the changes in the angle of view (1) ... (n) represent features that the changes in the angle of view are different. Thus, derivation accuracy $\delta_1 \ldots \delta_n$ which are different derivation accuracy are associated with the changes in the angle of view (1) ... (n). A change direction in the angle of view and a difference in the changing amount are used as examples of the features that the changes in the angle of view are different.

For example, the replacements of the lens (1) ... (n) represent features that the replacements of the lens are different. Thus, derivation accuracy $\varepsilon_1 \ldots \varepsilon_n$ which are different derivation accuracy are associated with the replacements of the lens (1) ... (n). A difference in the focal length of the lens unit 16 is used as examples of the features that the replacements of the lens are different.

For example, the replacements of the distance measurement unit (1) ... (n) represent features that the replacements of the distance measurement unit 12 are different. Thus, derivation accuracy $\zeta_1 \ldots \zeta_n$ which are different derivation accuracy are associated with the replacements of the distance measurement unit (1) ... (n). A difference in the type of the distance measurement unit is used as examples of the features that the replacements of the distance measurement unit 12 are different.

For example, the changes in the emission direction (1) ... (n) represent features that the changes in the emission direction of the laser beam are different. Thus, derivation accuracy $\eta_1 \ldots \eta_n$ which are different derivation accuracy are associated with the changes in the emission direction (1) ... (n). For example, a transformation in external shape of the emission unit 22 according to the change of the distance measurement unit 12 with time and/or a difference in the type of the distance measurement unit 12 of which the emission directions of the laser beams are different are used as the features that the changes in the emission direction are different.

The derivation accuracy $\lambda$ uniquely determined for the distance measurement device 10A is associated with a manufacturing variation specific to the distance measurement device 10A.

Next, the actions of the distance measurement device 10A will be described.

Initially, a factor storing process realized by executing the factor storing program 107 in the CPU 100 in a case where a power switch of the distance measurement device 10A is turned on will be described with reference to FIG. 11. Hereinafter, a case where the live view image is displayed on the display unit 86 will be described for the sake of convenience in description. Hereinafter, the irradiation position of the laser beam onto the subject in the real space is referred to as a "real-space irradiation position" for the sake of convenience in description.

Figure 11:
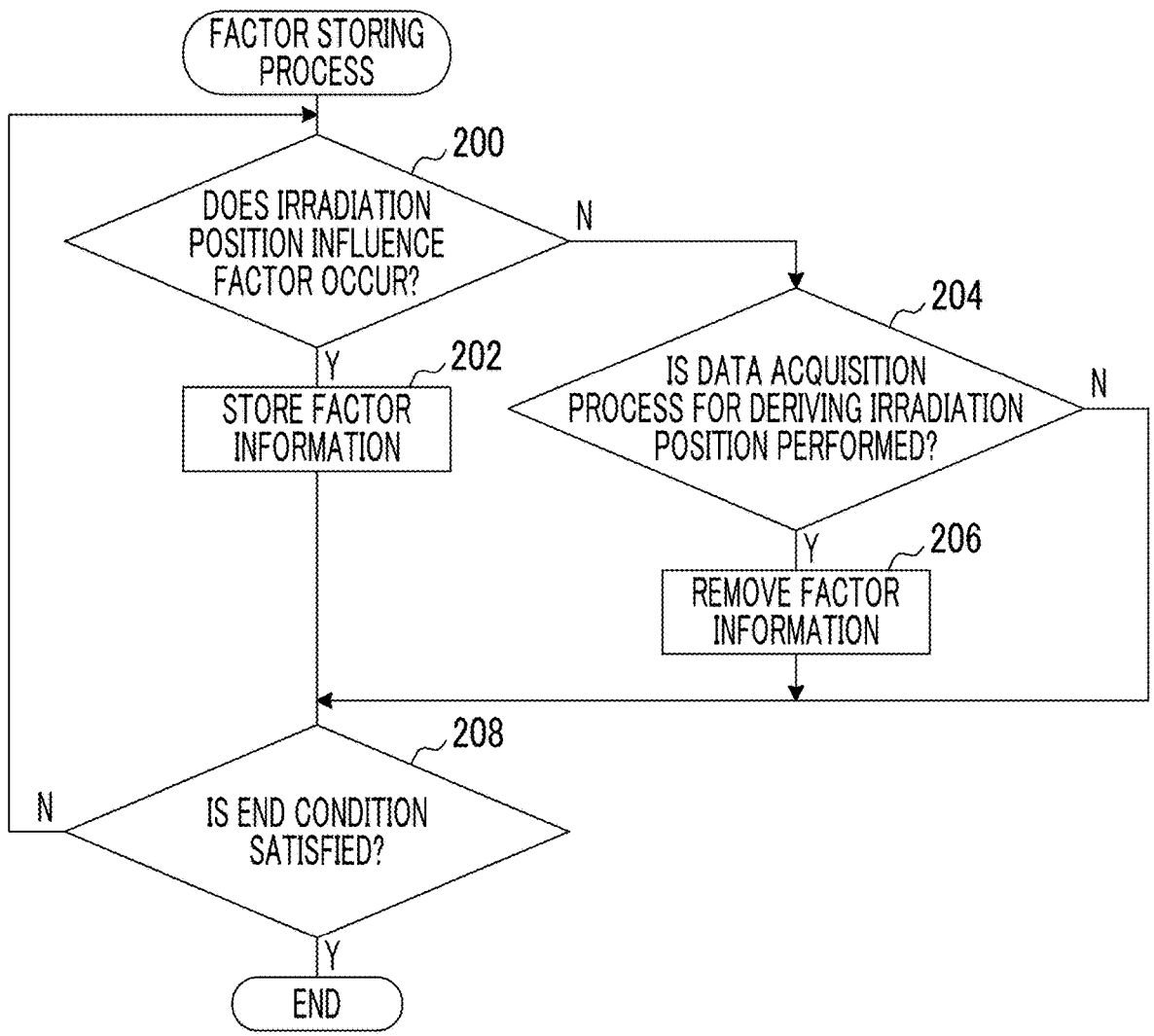
FIG. 11 is a flowchart showing an example of a flow of a factor storing process according to the first to third embodiments.

In the factor storing process shown in FIG. 11, the output unit 100B initially determines whether or not a new irradiation position influence factor occurs in step 200. In a case where the new irradiation position influence factor occurs in step 200, the determination result is positive, and the process proceeds to step 202. In a case where the new irradiation position influence factor does not occur in step 200, the determination result is negative, and the process proceeds to step 204.

In step 202, the output unit 100B stores the factor information indicating the occurred new irradiation position influence factor and the feature of the occurred new irradiation position influence factor in the secondary storage unit 104 in a sequence of time. Thereafter, the process proceeds to step 208.

For example, the feature of the irradiation position influence factor may be a feature of the change in the angle of view, a feature of the replacement of the lens, a feature of the replacement of the distance measurement unit, and a feature of the change in the emission direction, and may be the same feature as the feature of the corresponding assumption factor. The "same" mentioned herein means that the features are completely the same and are the same in a predetermined error range.

In step 204, the output unit 100B determines whether or not the data acquisition process for deriving the irradiation position (see FIG. 14) is performed. In a case where the data acquisition process for deriving the irradiation position is performed in step 204, the determination result is positive, and the process proceeds to step 206. In a case where the data acquisition process for deriving the irradiation position is not performed in step 204, the determination is negative, and the process proceeds to step 208. Even in a case where the factor information is not stored in the secondary storage unit 104 in step 204, the determination result is negative, and the process proceeds to step 208.

In step 206, the output unit 100B removes the factor information stored in the secondary storage unit 104. Thereafter, the process proceeds to step 208.

In step 208, the output unit 100B determines whether or not an end condition which is a condition in which the actual factor storing process is ended is satisfied. For example, in the actual factor storing process, the end condition is a condition in which an instruction to end the actual factor storing process is received through the touch panel 88.

In a case where the end condition is not satisfied in step 208, the determination result is negative, and the process proceeds to step 200. In a case where the end condition is satisfied in step 208, the determination result is positive, and the actual factor storing process is ended.

Hereinafter, a measurement process realized by executing the measurement program 106 in the CPU 100 in a case where a power switch of the distance measurement device 10A is turned on will be described with reference to FIGS. 12 to 14.

Hereinafter, a case where the live view image is displayed on the display unit 86 will be described for the sake of convenience in description. Hereinafter, for the sake of convenience in description, it will be described on the assumption that the subject is an external wall portion of an office building and the external wall portion of the office building is a planar wall portion (a planar region) having a square window and/or a square pattern. The "planar" mentioned herein is not limited to the plane, and includes a planar shape in a range in which slightness roughness due to a window or an air vent is allowed. For example, a plane or a planar shape recognized as the "planar" may be used through visual observation or by an existing image analysis technology.

Hereinafter, for the sake of convenience in description, it will be described on the assumption that the external wall portion of the office building which is the subject is captured by the distance measurement device 10A in a state in which the external wall portion does not face the imaging lens 50 in front view. Hereinafter, for the sake of convenience in description, it will be described on the assumption that the distance deriving mode or the dimension deriving mode is set as the operation mode of the distance measurement system function.

Although it will be described below that an in-image irradiation position in an X direction which is a front-view left-right direction for the imaging surface of the imaging element 60 included in the imaging device 14 is derived for the sake of convenience in description, an in-image irradiation position in a Y direction which is a front-view upper-lower direction for the imaging surface of the imaging element 60 included in the imaging device 14 is similarly derived. As mentioned above, the in-image irradiation positions ultimately output by deriving the in-image irradiation positions in the X direction and the Y direction are expressed by two-dimensional coordinates.

Hereinafter, for the sake of convenience in description, the front-view left-right direction for the imaging surface of the imaging element 60 included in the imaging device 14 is referred to as the "X direction" or a "row direction", and the front-view upper-lower direction for the imaging surface of the imaging element 60 included in the imaging device 14 is referred to as the "Y direction" or a "column direction".

Figure 12:
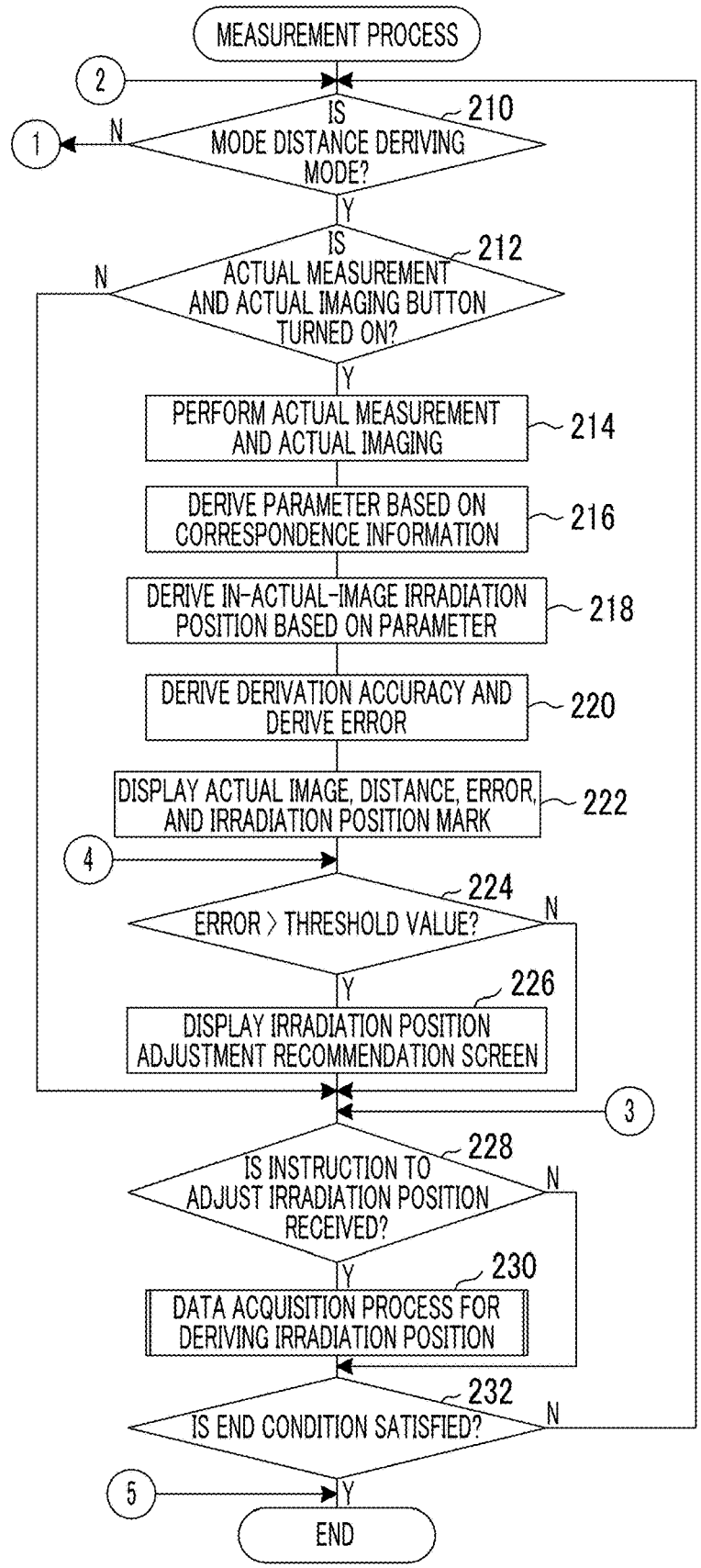
FIG. 12 is a flowchart showing an example of a flow of a measurement process according to the first embodiment.

In the measurement process shown in FIG. 12, in step 210, the deriving unit 100A initially determines whether or not the distance deriving mode is set. In a case where the distance deriving mode is not set in step 210, the determination result is negative, and the process proceeds to step 234. In a case where the distance deriving mode is set in step 210, the determination result is positive, and the process proceeds to step 212.

In step 212, the deriving unit 100A2 determines whether or not the actual measurement and actual imaging button 90A is turned on. In a case where the actual measurement and actual imaging button 90A is not turned on in step 212, the determination result is negative, and the process proceeds to step 228. In a case where the actual measurement and actual imaging button 90A is turned on in step 212, the determination result is positive, and the process proceeds to step 214.

In step 214, the deriving unit 100A2 performs the actual measurement by controlling the distance measurement control unit 68. The deriving unit 100A2 performs the actual imaging by controlling the imaging element driver 74 and the image signal processing circuit 76. Thereafter, the process proceeds to step 216.

In step 216, the deriving unit 100A2 derives the parameter based on the position and distance correspondence information stored in the position and distance table 109. Thereafter, the process proceeds to step 218.

The parameter derived by performing the process of step 216 is an uncertain parameter at a current point of time, and varies for every irradiation position influence factor as represented in the following Table 1.

TABLE 1

| Irradiation position influence factor | Parameter |
| --- | --- |
| Replacement of lens | Half angle of view α, emission angle β |
| Replacement of distance measurement unit | Emission angle β, inter-reference-point distance d |
| Change in angle of view | Half angle of view α |
| Change in emission direction | Emission angle β |

The number of uncertain parameters may be one to three. For example, in the example shown in Table 1, in a case where both the replacement of the distance measurement unit and the change in the angle of view are performed, the number of uncertain parameters is three such as the half angle of view α, the emission angle β, and the inter-reference-point distance d. In a case where only the replacement of the lens is performed, the number of uncertain parameters is two such as the half angle of view α and the emission angle β. In a case where only the replacement of the distance measurement unit is performed, the number of uncertain parameters is two such as the emission angle β, and the inter-reference-point distance d. In a case where only the change in the angle of view is performed, the number of uncertain parameters is one such as the half angle of view α. In a case where only the change in the emission direction is performed, the number of uncertain parameters is one such as the emission angle β.

For example, the parameters are derived from the following Expressions (2) to (4) in step 216. In Expressions (2) and (3), the distances D are distances specified from the position and distance correspondence information, and the distances specified from the position and distance correspondence information are the distances $D_1$, $D_2$, and $D_3$ in the example shown in FIG. 9. In Expression (4), "row-direction pixels of the irradiation positions" are in-image irradiation positions in a row direction, and "half of the number of row-direction pixels" is half of the number of pixels in the row direction in the imaging element 60. For example, in the present embodiment, the half angle of view α is derived from the following Expression (5). In Expression (5), "f" is a focal length. For example, it is preferable that the focal length f substituted into Expression (5) is a focal length used in the actual imaging of step 230.

[Expression 2]

$$\Delta x = d - D \cos \beta \quad (2)$$

[Expression 3]

$$X = D \sin \beta \tan \alpha \quad (3)$$

[Expression 4]

(row-direction pixel of irradiation position):(half of number of row-direction pixels)=Δx:X  (4)

[Expression 5]

$$\alpha = \operatorname{atan}\left\{\frac{(\text{dimension of imaging pixel})}{2 \times f}\right\} \quad (5)$$

In step 216, the in-provisional-image irradiation positions specified from the position and distance correspondence information stored in the position and distance table 109 are the "row-direction pixels of the irradiation positions". In the example shown in FIG. 9, the in-provisional-image irradiation positions specified from the position and distance correspondence information are $X_1$, $X_2$, and $X_3$. The distances specified from the position and distance correspondence information stored in the position and distance correspondence table 109 are used as the distances D in Expressions (2) and (3) for every corresponding in-provisional-image irradiation position (corresponding "row-direction pixel of the irradiation position"). The parameter closest to each of the "row-direction pixels of the irradiation positions" is derived by the deriving unit 100A2.

The deriving method of the parameter will be described using the position and distance correspondence information stored in the position and distance table 109 shown in FIG. 9.

For example, the in-provisional-image irradiation position $X_1$ is used as the "row-direction pixel of the irradiation position" in Expression (4), the distance $D_1$ is used as the distance D in Expressions (2) and (3). The in-provisional-image irradiation position $X_2$ is used as the "row-direction pixel of the irradiation position" in Expression (4), the distance $D_2$ is used as the distance D in Expressions (2) and (3). The in-provisional-image irradiation position $X_3$ is used as the "row-direction pixel of the irradiation position" in Expression (4), the distance $D_3$ is used as the distance D in Expressions (2) and (3). The half angle of view α, the emission angle β, and the inter-reference-point distance d closest to the in-provisional-image irradiation positions $X_1$, $X_2$, and $X_3$ are derived from Expressions (2) to (4).

In step 218, the deriving unit 100A2 derives the in-actual-image irradiation position based on the parameter derived in step 216. Thereafter, the process proceeds to step 220.

For example, the in-actual-image irradiation position is derived from Expressions (2) to (4) in step 218. That is, the parameter derived in step 216 is substituted into Expressions (2) to (4), and the distance acquired by performing the actual measurement in step 214 is substituted as the distance D into Expressions (2) to (4). Accordingly, the "row-direction pixel of the irradiation position" is derived as the in-actual-image irradiation position.

In step 220, the output unit 100B2 derives the derivation accuracy associated with the specific assumption factor from the factor and accuracy correspondence information, and derives the error of the in-actual-image irradiation position derived by the deriving unit 100A2 based on the derived derivation accuracy. Thereafter, the process proceeds to step 222.

In step 220, the specific assumption factor is an assumption factor corresponding to the irradiation position influence factor which is actually present in the distance measurement device 10A. Specifically, the specific assumption factor is an assumption factor of the assumption factors included in the factor and accuracy correspondence information, which corresponds to the factor information stored in the secondary storage unit 104 at a current point of time and the manufacturing variation of the assumption factor included in the factor and accuracy correspondence information. In a case where the factor information is not stored in the secondary storage unit 104 at the current point of time, the specific assumption factor is the manufacturing variation of the assumption factors included in the factor and accuracy correspondence information.

For example, in a case where the assumption factor corresponding to the factor information stored in the secondary storage unit 104 at the current point of time is the change in the angle of view (1), the derivation accuracy corresponding to the specific assumption factor are the derivation accuracy $\delta_1$, and $\lambda$. For example, in a case where the factor information is not stored in the secondary storage unit 104 at the current point of time, the derivation accuracy corresponding to the specific assumption factor is the derivation accuracy $\lambda$.

For example, in a case where the specific assumption factors are the change in the angle of view (1) and the manufacturing variation as stated above in step 220, the derivation accuracy $\delta_1$ and $\lambda$ are integrated, and the errors of the in-actual-image irradiation positions are derived based on the integrated derivation accuracy. For example, in a case where the specific assumption factor is the manufacturing variation, the error of the in-actual-image irradiation position is derived based on the derivation accuracy $\lambda$. That is, in a case where the actual measurement process is performed by activating the distance measurement device 10A for the first time after the shipment of the distance measurement device 10A is performed, the error of the in-actual-image irradiation position is derived based on the derivation accuracy $\lambda$.

For example, the derivation accuracy acquired by integrating the multiple derivation accuracy is derivation accuracy acquired by a dependent variable integrated by a polynomial including the derivation accuracy associated with the specific assumption factor as an independent variable. The following Expression (6) is used as an example of the polynomial. In Expression (6), Q is a dependent variable, and $F(\delta)$, $G(\varepsilon)$, $H(\zeta)$, $J(\eta)$, and $K(\lambda)$ are functions. In Expression (6), $F(\delta)$ is a function prescribed by the derivation accuracy $\delta$ which is an independent variable. In Expression (6), $G(\varepsilon)$ is a function prescribed by the derivation accuracy $\varepsilon$ which is an independent variable. In Expression (6), $H(\zeta)$ is a function prescribed by the derivation accuracy $\zeta$ which is an independent variable. In Expression (6), $J(\eta)$ is a function prescribed by the derivation accuracy $\eta$ which is an independent variable. In Expression (6), $K(\lambda)$ is a function prescribed by the derivation accuracy $\lambda$ which is an independent variable.

[Expression 6]

$$Q=F(\delta)+G(\varepsilon)+H(\zeta)+J(\eta)+K(\lambda) \qquad (6)$$

The error derived based on the derivation accuracy acquired by integrating the multiple derivation accuracy is an example of information based on the dependent variable according to the technology of the present disclosure. The derivation accuracy acquired by integrating the multiple derivation accuracy may be the dependent variable Q of Expression (6), or may be a value acquired by adjusting the dependent variable Q. For example, the value acquired by adjusting the dependent variable Q is a value acquired by multiplying the dependent variable Q by a coefficient (for example, a coefficient instructed by the user through the touch panel 88).

For example, in step 220, the error is derived based on a position error table (not shown) acquired by previously associating the derivation accuracy and the coordinates of the in-actual-image irradiation positions and the errors corresponding to the derivation accuracy and the coordinates of the in-image irradiation positions, but the technology of the present disclosure is not limited thereto. For example, the error may be derived based on a calculation expression in which the derivation accuracy and the coordinates of the in-actual-image irradiation positions are used as the independent variables and the errors are used as the dependent variables.

Figure 16:
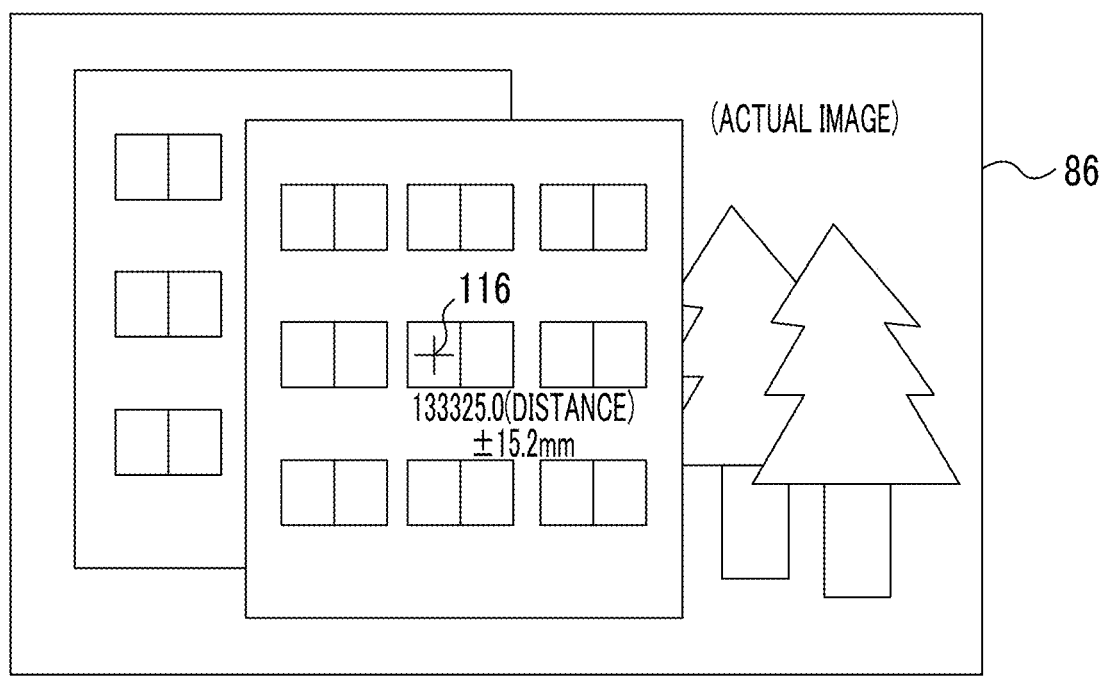
FIG. 16 is a screen diagram showing an example of a screen in which an actual image, a distance, an error, and an irradiation position mark are displayed on a display unit according to the first to third embodiments.

For example, in step 222, the output unit 100B2 displays the actual image, the distance, the error, and an irradiation position mark 116 on the display unit 86 as shown in FIG. 16. Thereafter, the process proceeds to step 224.

The actual image displayed on the display unit 86 by performing the process of step 222 is an image acquired by performing the actual imaging in step 214.

The distance displayed on the display unit 86 by performing the process of step 222 is a distance acquired by performing the actual measurement in step 214. In the example shown in FIG. 16, a value of "133325.0" corresponds to the distance, and a unit is millimeters.

The error displayed on the display unit 86 by performing the process of step 222 is the error derived by performing the process of step 220. In the example shown in FIG. 16, a value of "±15.2" corresponds to the error, and a unit is millimeters.

The irradiation position mark 116 displayed on the display unit 86 by performing the process of step 222 is a mark indicating the in-actual-image irradiation position derived by performing the process of step 218.

In step 224, the output unit 100B determines whether or not at least one of the errors derived by performing the process of step 220 or step 260 to be described below exceeds a threshold value. The threshold value is a preferable value on which the data acquisition process for deriving the irradiation position (see FIG. 14) is to be performed, and is a value previously acquired based on a result of computer simulation based on a design specification of the distance measurement device 10A and/or examination using a real machine of the distance measurement device 10A. In step 224, a case where the error derived by performing the process of step 220 or step 260 exceeds the threshold value means that the derivation accuracy of the in-actual-image irradiation position using the deriving unit 100A2 is less than predetermined derivation accuracy.

In a case where all the errors derived by performing the process of step 220 or step 260 are equal to or less than the threshold values in step 224, the determination result is negative, and the process proceeds to step 228. In a case where the errors derived by performing the process of step 220 or step 260 exceed the threshold value in step 224, the determination result is positive, and the process proceeds to step 226.

For example, in step 226, the output unit 100B displays an irradiation position adjustment recommendation screen 110 on the display unit 86 as shown in FIG. 17. Thereafter, the process proceeds to step 228.

The irradiation position adjustment recommendation screen 110 is a screen for recommending the adjustment of the in-actual-image irradiation position. In the example shown in FIG. 17, a message of "it is recommended to adjust the in-actual-image irradiation position" is displayed on the irradiation position adjustment recommendation screen 110. In the example shown in FIG. 17, a soft key of "yes" designated for announcing an intention to adjust the adjustment of the in-actual-image irradiation position is displayed on the irradiation position adjustment recommendation screen 110. In the example shown in FIG. 17, a soft key of "no" designated for announcing an intention not to adjust the in-actual-image irradiation position is displayed on the irradiation position adjustment recommendation screen 110.

As stated above, in step 226, the irradiation position adjustment recommendation screen 110 is displayed as a warning indicating that the derivation accuracy derived by the output unit 100B is less than predetermined derivation accuracy on the display unit 86.

In step 228, the output unit 100B determines whether or not an instruction to adjust the in-actual-image irradiation position is received. In a case where the instruction to adjust the in-actual-image irradiation position is received in step 250, the determination result is positive, and the process proceeds to step 230. The case where the instruction to adjust the in-actual-image irradiation position is received means a case where the soft key of "yes" of the irradiation position adjustment recommendation screen 110 is turned on and a case where the irradiation position adjustment button 90G is turned on.

In a case where the instruction to adjust the in-actual-image irradiation position is not received in step 228, the determination result is negative, and the process proceeds to step 232. For example, the case where the instruction to adjust the in-actual-image irradiation position is not received means a case where the soft key of "no" of the irradiation position adjustment recommendation screen 110 is pressed and a case where a default time (for example, 30 seconds) elapses after the irradiation position adjustment recommendation screen 110 is displayed.

Figure 14:
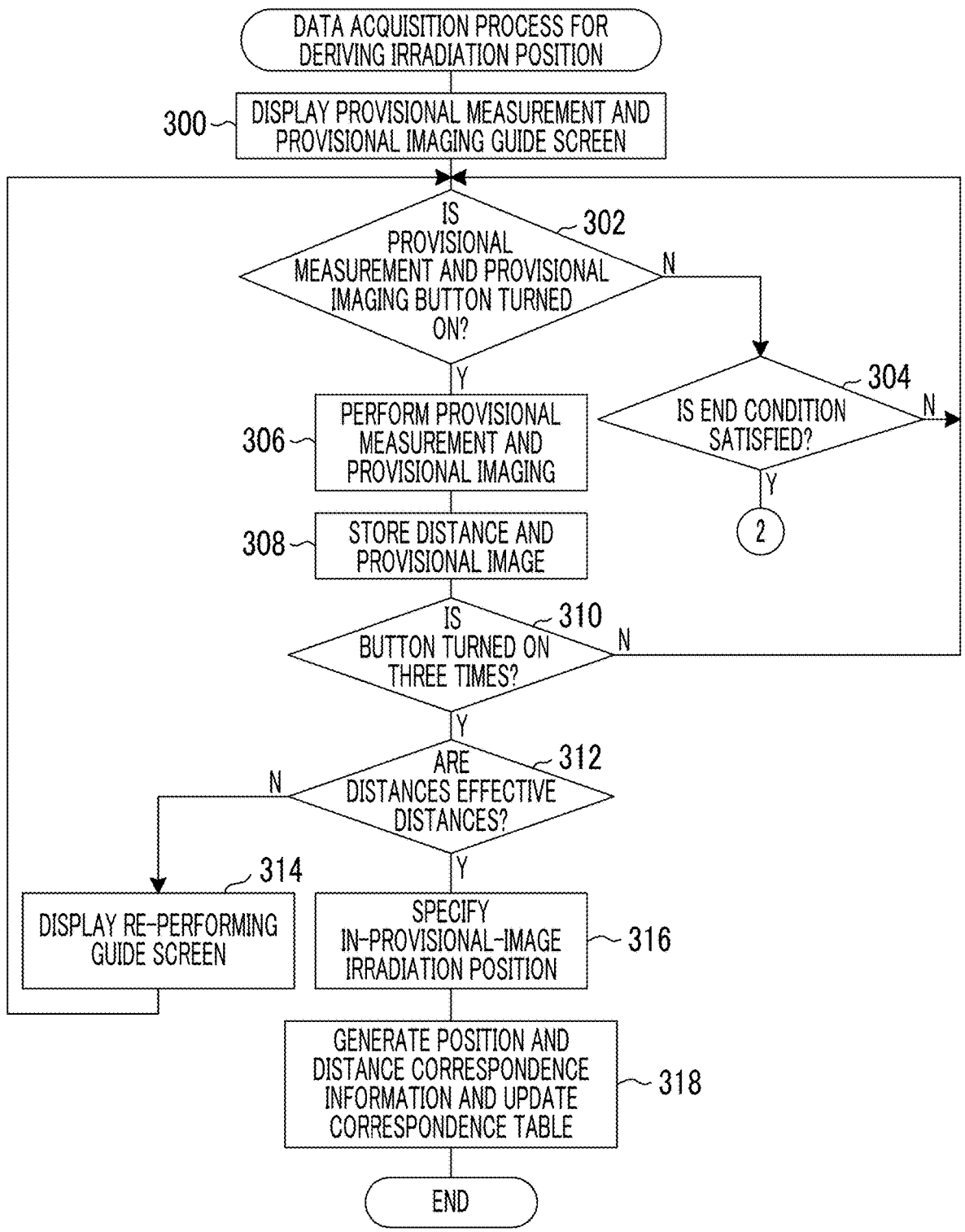
FIG. 14 is a flowchart showing an example of a flow of a data acquisition process for deriving an irradiation position according to the first to third embodiments.

For example, in step 230, the deriving unit 100A performs the data acquisition process for deriving the irradiation position shown in FIG. 14. Thereafter, the process proceeds to step 232.

For example, the deriving unit 100A displays a provisional measurement and provisional imaging guide screen 112 on the display unit 86 as shown in FIG. 18 in step 300 in the data acquisition process for deriving the irradiation position shown in FIG. 14. Thereafter, the process proceeds to step 302.

The provisional measurement and provisional imaging guide screen 112 is a screen for guiding the user information indicating that the provisional measurement and the provisional imaging are performed multiple times (for example, three times in the present embodiment) while changing the emission direction of the laser beam. In the example shown in FIG. 18, a message of "please, perform the provisional measurement and provisional imaging three times while changing the emission direction of the laser beam" is displayed on the provisional measurement and provisional imaging guide screen 112.

In step 302, the deriving unit 100A determines whether or not the provisional measurement and provisional imaging button 90B is turned on. In a case where the provisional measurement and provisional imaging button 90B is not turned on in step 302, the determination result is negative, and the process proceeds to step 304. In a case where the provisional measurement and provisional imaging button 90B is turned on in step 302, the determination result is positive, and the process proceeds to step 306.

In step 304, the deriving unit 100A determines whether or not an end condition which is a condition in which the data acquisition process for deriving an actual irradiation position is ended is satisfied. For example, in the data acquisition process for deriving the actual irradiation position, the end condition is a condition in which an instruction to end the data acquisition process for deriving the actual irradiation position is received through the touch panel 88.

In a case where the end condition is not satisfied in step 304, the determination result is negative, and the process proceeds to step 302. In a case where the end condition is satisfied in step 304, the determination result is positive, and the process proceeds to step 210.

In step 306, the deriving unit 100A performs the provisional measurement by controlling the distance measurement control unit 68. The deriving unit 100A performs the provisional imaging by controlling the imaging element driver 74 and the image signal processing circuit 76. Thereafter, the process proceeds to step 308.

In step 308, the deriving unit 100A stores the provisional image which is the image acquired by performing the provisional imaging and the distance acquired by performing the provisional measurement in the primary storage unit 102. Thereafter, the process proceeds to step 310.

In step 310, the deriving unit 100A determines whether or not the provisional measurement and the provisional imaging are performed three times by determining whether or not the provisional measurement and provisional imaging button 90B is turned on three times. In a case where the provisional measurement and the provisional imaging are not performed three times in step 310, the determination result is negative, and the process proceeds to step 302. In a case where the provisional measurement and the provisional imaging are performed three times in step 310, the determination result is positive, and the process proceeds to step 312.

Subsequently, the deriving unit 100A determines whether or not the relation between a plurality of provisionally measured distances (for example, three distances) is not a predetermined relation satisfying that these distances do not effectively contribute to the construction of the position and distance correspondence information used in the deriving of the in-actual-image irradiation position. That is, in step 312, the deriving unit 100A determines whether or not the three distances stored in the primary storage unit 102 in step 308 are effective distances. The effective distances refer to distances having the relation satisfying that the three distances stored in the primary storage unit 102 effectively contribute to the construction (generation) of position and distance correspondence information used in the deriving of the in-actual-image irradiation position. For example, the relation satisfying that distances effectively contribute to the construction of the position and distance correspondence information used in the deriving of the in-actual-image irradiation position means a relation satisfying that the three distances are separated from each other by a predetermined distance or more (for example, 0.3 meters or more).

In a case where three distances stored in the primary storage unit 102 in step 308 are not effective distances in step 312, the determination result is negative, and the process proceeds to step 314. In a case where the three distances stored in the primary storage unit 102 in step 308 are effective distances in step 312, the determination result is positive, and the process proceeds to step 316.

For example, in step 314, the deriving unit 100A displays a re-performing guide screen 114 on the display unit 86 as shown in FIG. 19. Thereafter, the process proceeds to step 302.

The re-performing guide screen 114 is a screen for guiding the user the re-performing of the provisional measurement and the provisional imaging. In the example shown in FIG. 19, a message of "effective distances are not able to be measured. please, perform the provisional measurement and provisional imaging three times while changing the emission direction of the laser beam" is displayed on the re-performing guide screen 114.

In step 316, the deriving unit 100A specifies the in-provisional-image irradiation position for every provisional image stored in the primary storage unit 102 in step 308. Thereafter, the process proceeds to step 318. For example, the in-provisional-image irradiation position is specified from a difference between the image acquired before the provisional measurement and the provisional imaging are performed (for example, previous frame) in the live view image and the provisional image acquired by performing the provisional imaging. The user can visually recognize the irradiation position of the laser beam from the provisional image in a case where the distance at which the provisional measurement is about several meters. In this case, the irradiation position visually recognized from the provisional image may be designated by the user through the touch panel 88, and the designated position may be specified as the in-provisional-image irradiation position.

In step 318, the deriving unit 100A updates the position and distance table 109 by generating the position and distance correspondence information and overwriting the generated position and distance correspondence information in the position and distance table 109. Thereafter, the data acquisition process for deriving the actual irradiation position is ended.

Meanwhile, in the measurement process shown in FIG. 12, in step 232, the deriving unit 100A determines whether or not an end condition which is a condition in which the actual measurement process is ended is satisfied. For example, in the actual measurement process, the end condition is a condition in which an instruction to end the actual measurement process is received through the touch panel 88.

In a case where the end condition is not satisfied in step 232, the determination result is negative, and the process proceeds to step 210. In a case where the end condition is satisfied in step 232, the determination result is positive, and the actual measurement process is ended.

Figure 13:
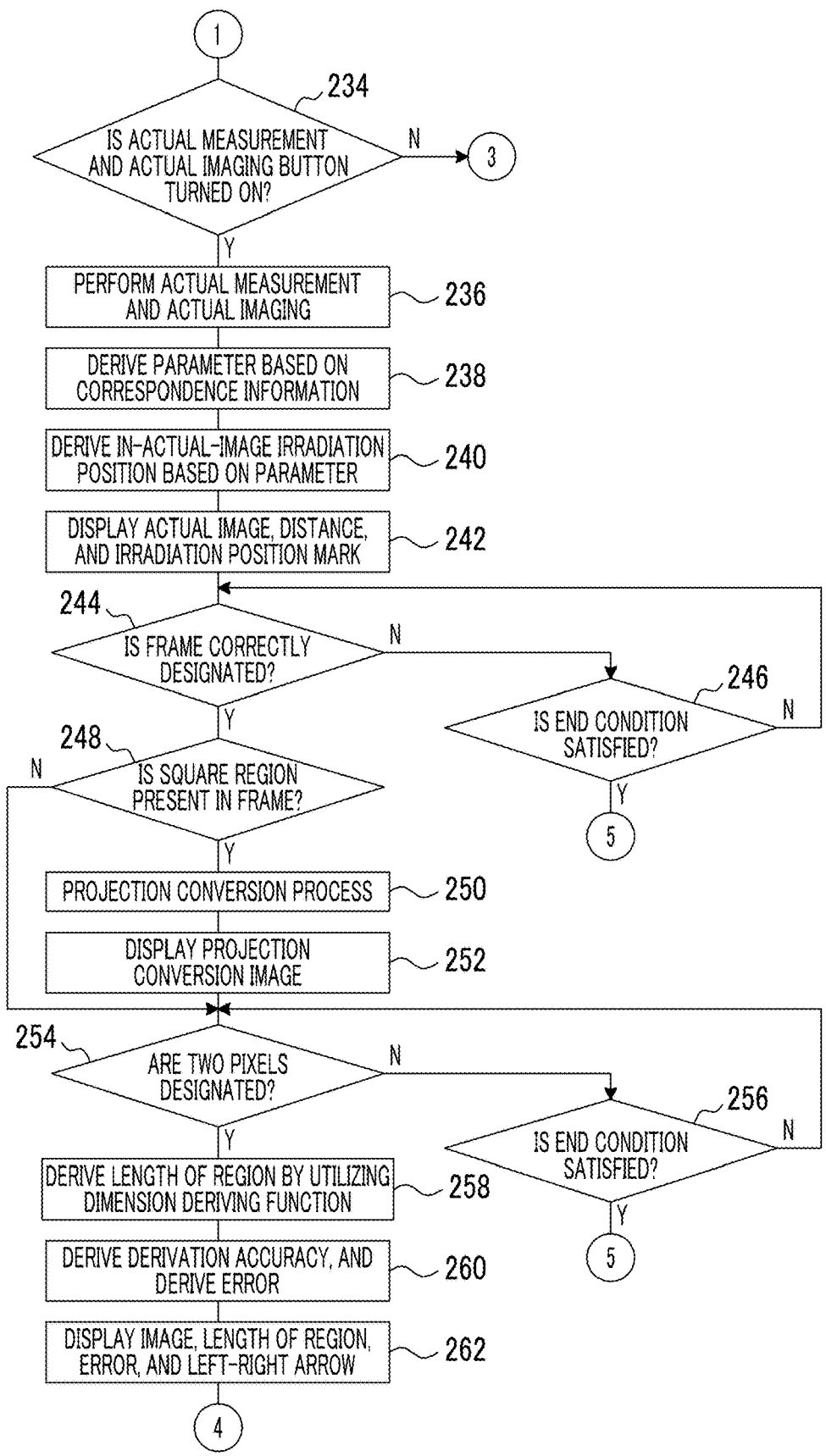
FIG. 13 is a flowchart subsequent to the flowchart shown in FIG. 12.

Meanwhile, in step 234 shown in FIG. 13, the deriving unit 100A1 determines whether or not the actual measurement and actual imaging button 90A is turned on. In a case where the actual measurement and actual imaging button 90A is not turned on in step 234, the determination result is negative, and the process proceeds to step 228. In a case where the actual measurement and actual imaging button 90A is turned on in step 234, the determination result is positive, and the process proceeds to step 236.

In step 236, the deriving unit 100A1 performs the actual measurement by controlling the distance measurement control unit 68. The deriving unit 100A1 performs the actual imaging by controlling the imaging element driver 74 and the image signal processing circuit 76. Thereafter, the process proceeds to step 240.

In step 238, the deriving unit 100A1 derives the parameter based on the position and distance correspondence information stored in the position and distance table 109. Thereafter, the process proceeds to step 240. The deriving method of the parameter is the same as that of step 216.

In step 240, the deriving unit 100A1 derives the in-actual-image irradiation position based on the parameter derived in step 238. Thereafter, the process proceeds to step 242.

For example, the in-actual-image irradiation position is derived from Expressions (2) to (4) in step 240. That is, the parameter derived in step 238 is substituted into Expressions (2) to (4), and the distance acquired by performing the actual measurement in step 236 is substituted as the distance D into Expressions (2) to (4). Accordingly, the "row-direction pixel of the irradiation position" is derived as the in-actual-image irradiation position.

Figure 20:
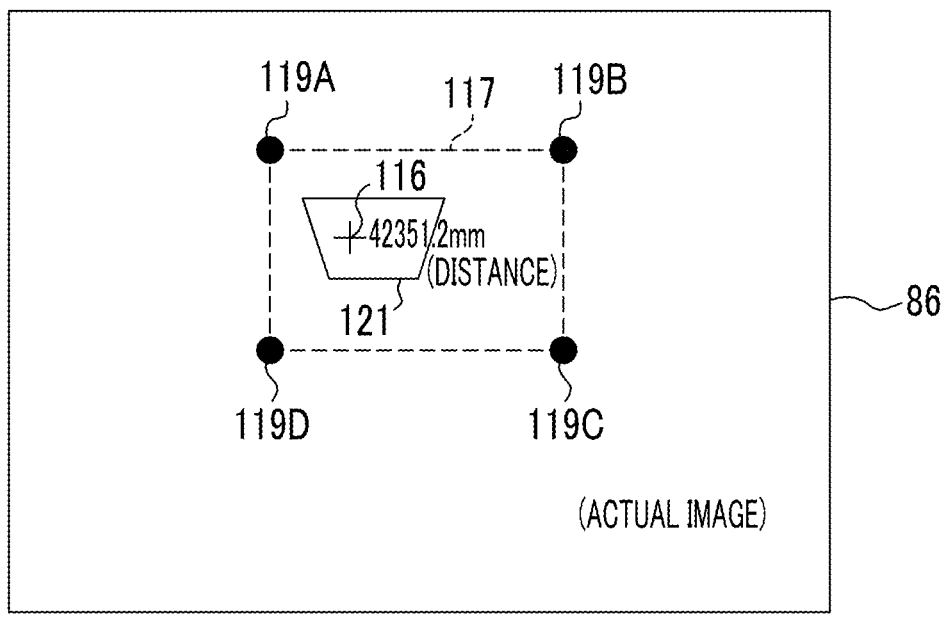
FIG. 20 is a screen diagram showing an example of a screen in which a square frame is designated in a display region within an actual image.

For example, in step 242, the deriving unit 100A1 displays the actual image, the distance, and the irradiation position mark 116 on the display unit 86 as shown in FIG. 20.

The actual image displayed on the display unit 86 by performing the process of step 242 is an image acquired by performing the actual imaging in step 236.

The distance displayed on the display unit 86 by performing the process of step 242 is a distance acquired by performing the actual measurement in step 236. In the example shown in FIG. 20, a value of "42351.2" corresponds to the distance, and a unit is millimeters.

The irradiation position mark 116 displayed on the display unit 86 by performing the process of step 242 is a mark indicating the in-actual-image irradiation position derived by performing the process of step 240.

In a case where a screen including the actual image, the distance, and the irradiation position mark 116 is displayed on the display unit 86, the user designates a frame in a display region of the actual image through the touch panel 88.

In the next step 244, the deriving unit 100A1 determines whether or not the frame is correctly designated in the display region of the actual image through the touch panel 88. For example, the correctly designated frame is a square frame 117 including the irradiation position mark 116 in the display region of the actual image, as shown in FIG. 20. For example, the frame 117 is defined by four points of points 119A, 119B, 119C, and 119D, as shown in FIG. 20. A region surrounded by the frame 117 is a region designated in association with the in-actual-image irradiation position specified from the irradiation position mark 116.

In a case where the frame is not correctly designated in the display region of the actual image through the touch panel 88 in step 244, the determination result is negative, and the process proceeds to step 246. In a case where the frame is correctly designated in the display region of the actual image through the touch panel 88 in step 244, the determination result is positive, and the process proceeds to step 248.

In step 246, the deriving unit 100A1 determines whether or not the end condition which is the condition in which the actual measurement process is ended is satisfied. In a case where the end condition is not satisfied in step 246, the determination result is negative, and the process proceeds to step 244. In a case where the end condition is satisfied in step 246, the determination result is positive, and the actual measurement process is ended.

In step 248, the deriving unit 100A1 determines whether or not a square region is present inside the frame 117. For example, the square region refers to a trapezoid region 121 as shown in FIG. 20. In a case where a portion corresponding to the trapezoid region 121 of the external wall portion of the office building is captured in a state in which the portions corresponding to the trapezoid regions face the imaging lens 50 in front view, the portion corresponding to the trapezoid region is represented as a rectangular region in the actual image.

In a case where the square region is not presented inside the frame 117 in step 248, the determination result is negative, and the process proceeds to step 254. In a case where the square region is present inside the frame 117 in step 248, the determination result is positive, and the process proceeds to step 250.

In step 250, the deriving unit 100A1 derives a projection conversion coefficient which is a coefficient for projection conversion based on the square region (in the example shown in FIG. 20, the trapezoid region 121) included in the frame 117. The deriving unit 100A1 performs the projection conversion process on the latest actual image (the actual image acquired in the process of step 236) by using the derived projection conversion coefficient. Thereafter, the process proceeds to step 252. The process of step 250 is performed, and the latest actual image is converted into an image corresponding to the facing view image.

Hereinafter, the image corresponding to the facing view image acquired by performing the projection conversion process on the latest actual image is referred to as a "projection conversion image" without being assigned a reference for the sake of convenience in description.

In step 252, the deriving unit 100A1 displays the projection conversion image acquired by performing the projection conversion process in step 250 on the display unit 86.

In a case where a screen including the projection conversion image is displayed on the display unit 86, a region is designated by designating two points, that is, two pixels in a display region of the projection conversion image through the touch panel 88. The designated region is a region in the real space corresponding to an interval between two pixels.

In the next step 254, the deriving unit 100A1 determines whether or not two pixels of a region-length deriving target image which is the image used in the deriving of the length of the designated region are designated.

For example, the region-length deriving target image is the projection conversion image in a case where the processes of steps 250 and 252 are performed, and the region-length deriving target image is the latest actual image in a case where the processes of steps 250 and 252 are not performed.

Although it has been described in the present embodiment that the projection conversion image which is the image corresponding to the facing view image acquired by performing the projection conversion process on the entire latest actual image is used as the region-length deriving target image, the present invention is not limited to thereto. For example, the projection conversion process may be performed on an image region (for example, a square image region of which an outer edge is defined by the frame 117) surrounded by the frame 117, as shown in FIG. 20.

Figure 21:
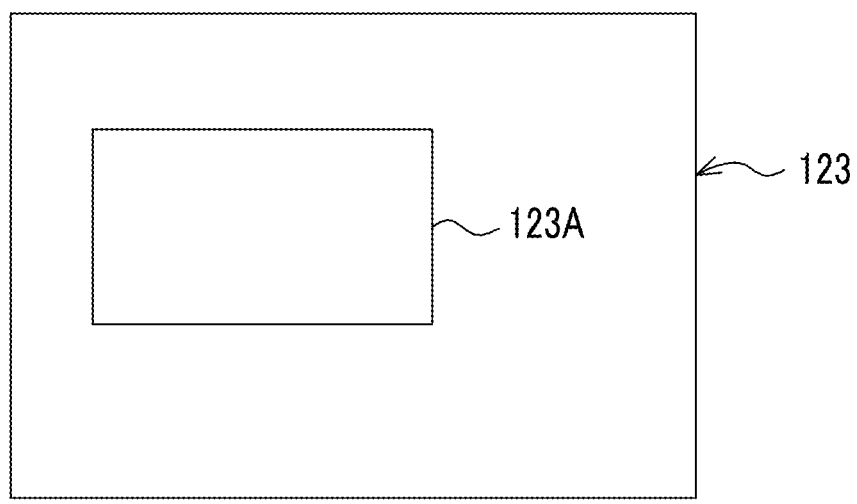
FIG. 21 is an image diagram showing an example of a projection conversion image acquired by performing projection conversion on an image region designated in the square frame.

In this case, in step 252, the deriving unit 100A1 displays a projection conversion image 123 acquired by performing the projection conversion process in step 250 on the display unit 86, as shown in FIG. 21. For example, the projection conversion image 123 is an image corresponding to the image acquired through the imaging in a state in which the portion corresponding to the image region surrounded by the frame 117 faces the imaging lens 50 in front view. Accordingly, the projection conversion image 123 is an image including a rectangular region 123A acquired by performing the projection conversion process on the trapezoid region 121.

Figure 22:
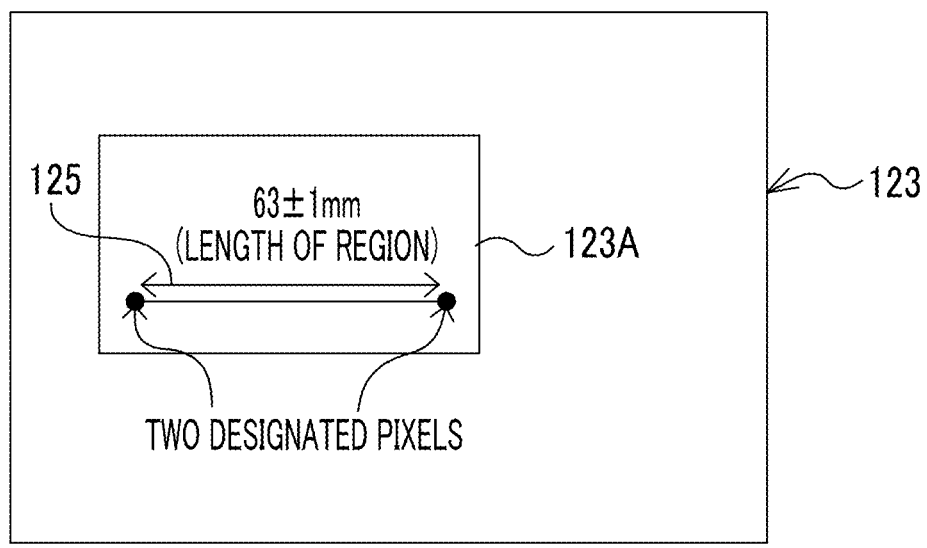
FIG. 22 is a screen diagram showing an example of a screen in which a length of a region, an error, and a left-right arrow are displayed so as to be superimposed on the projection conversion image.

For example, as shown in FIG. 22, in a case where a screen including the projection conversion image 123 is displayed on the display unit 86, the user designates a region by designating two points, that is, two pixels in a display region of the projection conversion image through the touch panel 88. The designated region is a region in the real space corresponding to an interval between two pixels.

In the example shown in FIG. 22, the region-length deriving target image is the projection conversion image 123 in a case where the processes of steps 250 and 252 are performed. The region-length deriving target image is a region (for example, an image region defined by an outer edge by the frame 117) of the actual image surrounded by the frame 117 in a case where the processes of steps 250 and 252 are not performed.

In a case where the two pixels of the region-length deriving target image are not designated through the touch panel 88 in step 254, the determination result is negative, and the process proceeds to step 256. In a case where the two pixels of the region-length deriving target image are designated through the touch panel 88 in step 254, the determination result is positive, and the process proceeds to step 258.

In step 256, the deriving unit 100A1 determines whether or not the end condition which is the condition in which the actual measurement process is ended is satisfied. In a case where the end condition is not satisfied in step 256, the determination result is negative, and the process proceeds to step 254. In a case where the end condition is satisfied in step 256, the determination result is positive, and the actual measurement process is ended.

In step 258, the deriving unit 100A1 derives the length of the region corresponding to the interval between the two pixels designated by the user through the touch panel 88 by utilizing the dimension deriving function. Thereafter, the process proceeds to step 260.

In step 258, the length of the region corresponding to the interval between the two pixels designated by the user through the touch panel 88 is derived from Expression (1). In this case, u1 and u2 of Expression (1) are addresses of the two pixels designated by the user through the touch panel 88.

In step 260, the output unit 100B1 derives the derivation accuracy associated with the specific assumption factor from the factor and accuracy correspondence information, and derives the error of the length of the region derived by the deriving unit 100A1 based on the derived derivation accuracy. Thereafter, the process proceeds to step 262.

In step 260, the specific assumption factor is an assumption factor corresponding to the irradiation position influence factor which is actually present in the distance measurement device 10A. Specifically, the specific assumption factor is an assumption factor of the assumption factors included in the factor and accuracy correspondence information, which corresponds to the factor information stored in the secondary storage unit 104 at a current point of time and the manufacturing variation of the assumption factor included in the factor and accuracy correspondence information.

In a case where the factor information is not stored in the secondary storage unit 104 at the current point of time, the specific assumption factor is the manufacturing variation of the assumption factors included in the factor and accuracy correspondence information. Accordingly, in a case where the distance measurement device 10A is activated in a default state, since the factor information is not stored in the secondary storage unit 104, the error based on the assumption factor related to the manufacturing variation is derived by performing the process of step 220 or step 260. The error based on the assumption factor related to the manufacturing variation is displayed on the display unit 86 by performing the process of step 222 or step 262 to be described below.

Similarly to step 220, in step 260, in a case where the multiple derivation accuracy are derived from the factor and accuracy correspondence information, the multiple derivation accuracy are integrated, and the error of the length of the region is derived based on the integrated derivation accuracy. For example, in a case where the specific assumption factor is the manufacturing variation, the error of the length of the region is derived based on the derivation accuracy λ. That is, in a case where the actual measurement process is performed by activating the distance measurement device 10A for the first time after the shipment of the distance measurement device 10A is performed, the error of the length of the region is derived based on the derivation accuracy λ.

Similarly to step 220, the multiple derivation accuracy are integrated based on Expression (6) in step 260. For example, it has been described in step 260 that the error is derived based on a length error table (not shown) previously associated with the derivation accuracy, the length of the region, and the error, the technology of the present disclosure is not limited thereto. For example, the error may be derived based on a calculation expression in which the derivation accuracy and the length of the region are used as the independent variables and the error is used as the dependent variable.

In step 262, the output unit 100B1 displays the image, the length of the region, the error, and the left-right arrow on the display unit 86. Thereafter, the process proceeds to step 224.

The image displayed on the display unit 86 by performing the process of step 262 is the actual image or the projection conversion image. That is, the projection conversion image is displayed only when the process of step 250 is performed, and the actual image acquired through the actual imaging in step 214 is displayed on the display unit 86 in other cases.

The length of the region displayed on the display unit 86 by performing the process of step 262 is the length of the region derived by performing the process of step 258.

The error displayed on the display unit 86 by performing the process of step 262 is the error derived by performing the process of step 260.

The left-right arrow displayed on the display unit 86 by performing the process of step 262 is an arrow for specifying the two pixels designated by the user through the touch panel 88.

For example, in a case where the projection conversion image 123 (see FIGS. 21 and 22) is used as the region-length deriving target image, the image, the length of the region, the error, and the left-right arrow 125 are displayed on the display unit 86 as shown in FIG. 22 in a case where the process of step 262 is performed.

In this case, the image displayed on the display unit 86 by performing the process of step 262 is the actual image or the projection conversion image 123. That is, the projection conversion image 123 is displayed only when the process of step 250 is performed, and the actual image acquired through the actual imaging in step 214 is displayed on the display unit 86 in other cases.

In the example shown in FIG. 22, a value of "63" corresponds to the length of the region, and a unit is millimeters. In the example shown in FIG. 22, a value of "±1" corresponds to the error, and a unit is millimeters. The left-right arrow 125 displayed on the display unit 86 by performing the process of step 262 is an arrow for specifying the two pixels designated by the user through the touch panel 88.

As described above, in the distance measurement device 10A, the length of the region corresponding to the interval between the two pixels associated with the region-length deriving target image is derived based on the distance measured by utilizing the distance measurement system function, the interval between the designated two pixels, and the focal length in the imaging device 14. The output unit 100B1 derives the derivation accuracy corresponding to the assumption factor as the irradiation position influence factor which is actually present in the distance measurement device 10A based on the position and distance correspondence information, and derives the error of the length of the region based on the derived derivation accuracy (step 260). The output unit 100B1 displays the derived error on the display unit 86 (step 262). Therefore, according to the distance measurement device 10A, the user can easily ascertain the error of the length of the region compared to a case where the error of the length of the region is not displayed even though the irradiation position influence factor is actually present.

In the distance measurement device 10A, the deriving unit 100A2 derives the in-actual-image irradiation position based on the distance measured by utilizing the distance measurement system function (step 218). The output unit 100B2 derives the derivation accuracy corresponding to the assumption factor as the irradiation position influence factor which is actually present in the distance measurement device 10A based on the position and distance correspondence information, and derives the error of the in-actual-image irradiation position based on the derived derivation accuracy (step 220). The output unit 100B2 displays the derived error on the display unit 86 (step 222). Therefore, according to the distance measurement device 10A, the user can easily ascertain the error of the in-actual-image irradiation position compared to a case where the error of the in-actual-image irradiation position is not displayed even though the irradiation position influence factor is actually present.

In the distance measurement device 10A, the deriving unit 100A generates the position and distance correspondence information, and updates the position and distance table 109 (step 318). The deriving unit 100A derives the in-actual-image irradiation position based on the position and distance correspondence information stored in the position and distance table 109 (steps 216, 218, 238, and 240). Therefore, according to the distance measurement device 10A, it is possible to derive the in-actual-image irradiation position with high accuracy compared to a case where the in-actual-image irradiation position is not derived based on the position and distance correspondence information.

In the distance measurement device 10A, the factor and accuracy correspondence information items acquired by associating different derivation accuracy with different assumption factors are stored in the factor and accuracy table 111. The output unit 100B derives the derivation accuracy associated with the assumption factor corresponding to the irradiation position influence factor which is actually present in the distance measurement device 10A from the factor and accuracy correspondence information (steps 220 and 260). Therefore, according to the distance measurement device 10A, it is possible to accurately derive the derivation accuracy compared to a case where the derivation accuracy is associated with only a single assumption factor.

In the distance measurement device 10A, in a case where a plurality of irradiation position influence factors is actually present, the derivation accuracy associated with the assumption factors corresponding to the plurality of irradiation position influence factors which is actually present in the distance measurement device 10A are integrated, and the integrated derivation accuracy is derived (steps 220 and 260). Therefore, according to the distance measurement device 10A, it is possible to achieve easy handling of the derivation accuracy compared to a case where the derivation accuracy associated with the assumption factors corresponding to the plurality of irradiation position influence factors which is actually present in the distance measurement device 10A are individually derived.

In the distance measurement device 10A, the derivation accuracy are integrated by Expression (6) which is a polynomial. Therefore, according to the distance measurement device 10A, it is possible to easily integrate the derivation accuracy compared to a case where a monomial is used.

In the distance measurement device 10A, the irradiation position influence factor includes the replacement of the lens, the replacement of the distance measurement unit, the change in the angle of view, the change in the emission direction, and the manufacturing variation. Therefore, according to the distance measurement device 10A, it is possible to derive the derivation accuracy with consideration for the influence of the applied factor compared to a case where any of the replacement of the lens, the replacement of the distance measurement unit, the change in the angle of view, the change in the emission direction, and the manufacturing variation is not used as the irradiation position influence factor.

In the distance measurement device 10A, the factor and accuracy correspondence information is stored in the factor and accuracy table 111 before the shipment of the distance measurement device 10A is performed. Therefore, according to the distance measurement device 10A, it is possible to rapidly derive the derivation accuracy compared to a case where the factor and accuracy correspondence information is generated after the shipment of the distance measurement device 10A is performed and the generated factor and accuracy correspondence information is stored in the factor and accuracy table 111.

In the distance measurement device 10A, a warning is issued by displaying the irradiation position adjustment recommendation screen 110 on the display unit 86 in a case where the error derived by the output unit 100B exceeds the threshold value (steps 224 and 226). Therefore, according to the distance measurement device 10A, the user can easily recognize that the error exceeds the threshold value compared to a case where the warning is not issued even though the error exceeds the threshold value.

Although it has been described in the first embodiment that the derivation accuracy is derived by the output unit 100B based on the factor and accuracy correspondence information, the technology of the present disclosure is not limited thereto. For example, the derivation accuracy may be derived based on a calculation expression in which the assumption factor is used as the independent variable and the derivation accuracy is used as the dependent variable. As stated above, the derivation accuracy may be output by the output unit 100B based on the calculation expression or the factor and accuracy correspondence information acquired by prescribing the correspondence relation between the assumption factors and the derivation accuracy.

Although it has been described in the first embodiment that the error is derived as an example of the "information based on the derivation accuracy" according to the technology of the present disclosure based on the derivation accuracy derived by the output unit 100B and the derived error is displayed on the display unit 86, the technology of the present disclosure is not limited thereto. For example, the derivation accuracy itself derived as an example of the information based on the derivation accuracy" according to the technology of the present disclosure by the output unit 100B may be displayed on the display unit 86. For example, both the error and the derivation accuracy derived as the example of the "information based on the derivation accuracy" according to the technology of the present disclosure may be displayed on the display unit 86.

Although it has been described in the first embodiment that the factor and accuracy table 111 is previously stored in the secondary storage unit 104 before the shipment of the distance measurement device 10A is performed, the technology of the present disclosure is not limited thereto. That is, the factor and accuracy table 111 may be stored in the secondary storage unit 104 until the output unit 100B is activated for the first time. For example, the factor and accuracy table 111 may be downloaded until the output unit 100B is activated for the first time after the shipment of the distance measurement device 10A is performed.

Although it has been described in the first embodiment that the factor and accuracy correspondence information stored in the factor and accuracy table 111 is fixed, the technology of the present disclosure is not limited thereto. For example, the factor and accuracy correspondence information may be rewritten according to an instruction received through the touch panel 88 after the shipment of the distance measurement device 10A is performed.

Although it has been described in the first embodiment that the output unit 100B integrates the multiple derivation accuracy by using the polynomial, the technology of the present disclosure is not limited thereto, and the multiple derivation accuracy may be integrated by using an integration table (not shown) from which the same output as that of the polynomial is acquired by the output unit 100B.

Although it has been described in the first embodiment that the length of the region is derived, the technology of the present disclosure is not limited thereto. For example, an area of the real-space region corresponding to an image region defined by a plurality of pixels designated by the user may be derived by utilizing the dimension deriving function. For example, the "image region defined by the plurality of designated pixels" is an image region surrounded by three or more designated pixels.

Although it has been described in the first embodiment on the assumption that the external wall portion of the office building is captured by the distance measurement device 10A in a state in which the external wall portion of the office building does not face the imaging lens 50 in front view, the technology of the present disclosure is not limited thereto. That is, the external wall portion of the office building may be captured by the distance measurement device 10A in a state in which the external wall portion of the office building faces the imaging lens 50 in front view. In this case, the processes of steps 250 and 252 included in the measurement process may be omitted.

Although it has been described in the first embodiment that the error based on the manufacturing variation is displayed on the display unit 86, the technology of the present disclosure is not limited thereto, and the error of the manufacturing variation may be displayed on the display unit 86.

Although it has been described in the first embodiment that the change in the angle of view, the replacement of the lens, the replacement of the distance measurement unit, the change in the emission direction, and the manufacturing variation are included in the factor and accuracy correspondence information, the technology of the present disclosure is not limited thereto. For example, the manufacturing variation may be included in the factor and accuracy correspondence information. As stated above, at least one of the change in the angle of view, the replacement of the lens, the replacement of the distance measurement unit, the change in the emission direction, or the manufacturing variation may be removed from the factor and accuracy correspondence information.

Although it has been described in the first embodiment that the irradiation position mark 116 is displayed, the technology of the present disclosure is not limited thereto. The parameters derived by performing the processes of steps 216 and 238 may also be displayed.

Although it has been described in the first embodiment that since it is assumed that three parameters such as the half angle of view α, the emission angle β, and the inter-reference-point distance d are uncertain parameters, the provisional measurement and the provisional imaging are performed three times, the technology of the present disclosure is not limited thereto. Even though three parameters such as the half angle of view α, the emission angle β, and the inter-reference-point distance d are the uncertain parameters, the provisional measurement and the provisional imaging may be performed four or more times. The greater the number of times the provisional measurement and the provisional imaging are performed, the higher the accuracy. In a case where the uncertain parameters are two, the provisional measurement and the provisional imaging may be performed at least two times, and in a case where the uncertain parameter is one, the provisional measurement and the provisional imaging may be performed at least one time.

Although it has been described in the first embodiment that the replacement of the lens, the replacement of the distance measurement unit, the change in the angle of view, the change in the emission direction, and the manufacturing variation are used as the irradiation position influence factor, the technology of the present disclosure is not limited thereto. At least one thereof may be used as the irradiation position influence factor. For example, an event that a predetermined period (for example, 30 days) elapses after the parameter is derived in the previous stage may be used as the irradiation position influence factor. An event that an absolute value of a change amount of at least one of temperature or humidity exceeds a reference value may be used as the irradiation position influence factor. An event that a specific constituent member of the distance measurement unit 12 or the imaging device 14 is replaced or an event that the specific constituent member is removed may be used as the irradiation position influence factor.

A detection unit that detects that the irradiation position influence factor occurs may be provided in the distance measurement device 10A, or information indicating that the irradiation position influence factor occurs may be input by the user through the touch panel 88. A detection unit that detects that the plurality of irradiation position influence factors occurs may be provided in the distance measurement device 10A, or information indicating that the plurality of irradiation position influence factors occurs may be input by the user through the touch panel 88.

Although it has been described in the first embodiment that the distance measurement control unit 68 is built in the imaging device main body 18, the distance measurement control unit 68 may be provided in not the imaging device main body 18 but the distance measurement unit 12. In this case, the entire distance measurement unit 12 may be controlled by the distance measurement control unit 68 built in the distance measurement unit 12 under the control of the main control unit 62.

Second Embodiment

Although it has been described in the first embodiment that the parameter is derived and the in-actual-image irradiation position is derived based on the derived parameter, it will be described in a second embodiment that the in-actual-image irradiation position is derived without deriving the parameter. In the second embodiment, since the same constituent elements as the constituent elements described in the first embodiment will be assigned the same references, the description thereof will be omitted, and only portions different from those of the first embodiment will be described.

A distance measurement device 10B according to the second embodiment is different from the distance measurement device 10A in that a measurement program 130 instead of the measurement program 106 is stored in the secondary storage unit 104.

Next, a measurement process which is realized as the action of the distance measurement device 10B by performing the measurement program 130 in the CPU 100 in a case where a power switch of the distance measurement device 10B is turned on will be described with reference to FIGS. 23 and 24. The same steps as those of the flowcharts shown in FIGS. 12 and 13 will be assigned the same step numbers, and thus, the description thereof will be omitted.

Figure 23:
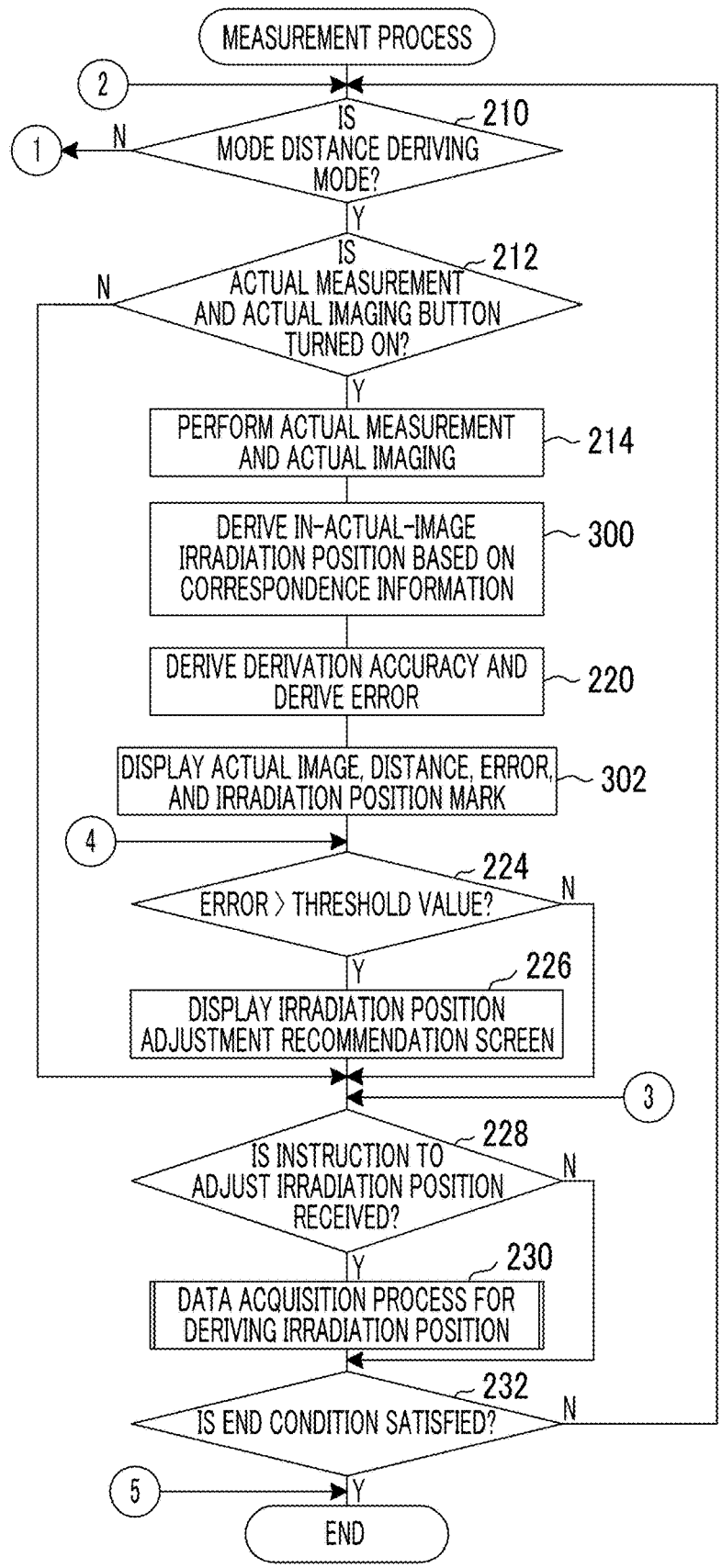
FIG. 23 is a flowchart showing an example of a flow of a measurement process according to the second embodiment.

The flowchart shown in FIG. 23 is different from the flowchart shown in FIG. 12 in that step 300 is provided instead of steps 216 and 218. The flowchart shown in FIG. 23 is different from the flowchart shown in FIG. 12 in that step 302 is provided instead of step 222.

In step 300 shown in FIG. 23, the deriving unit 100A2 derives the in-actual-image irradiation position based on the position and distance correspondence information. Thereafter, the process proceeds to step 220.

Figure 25:
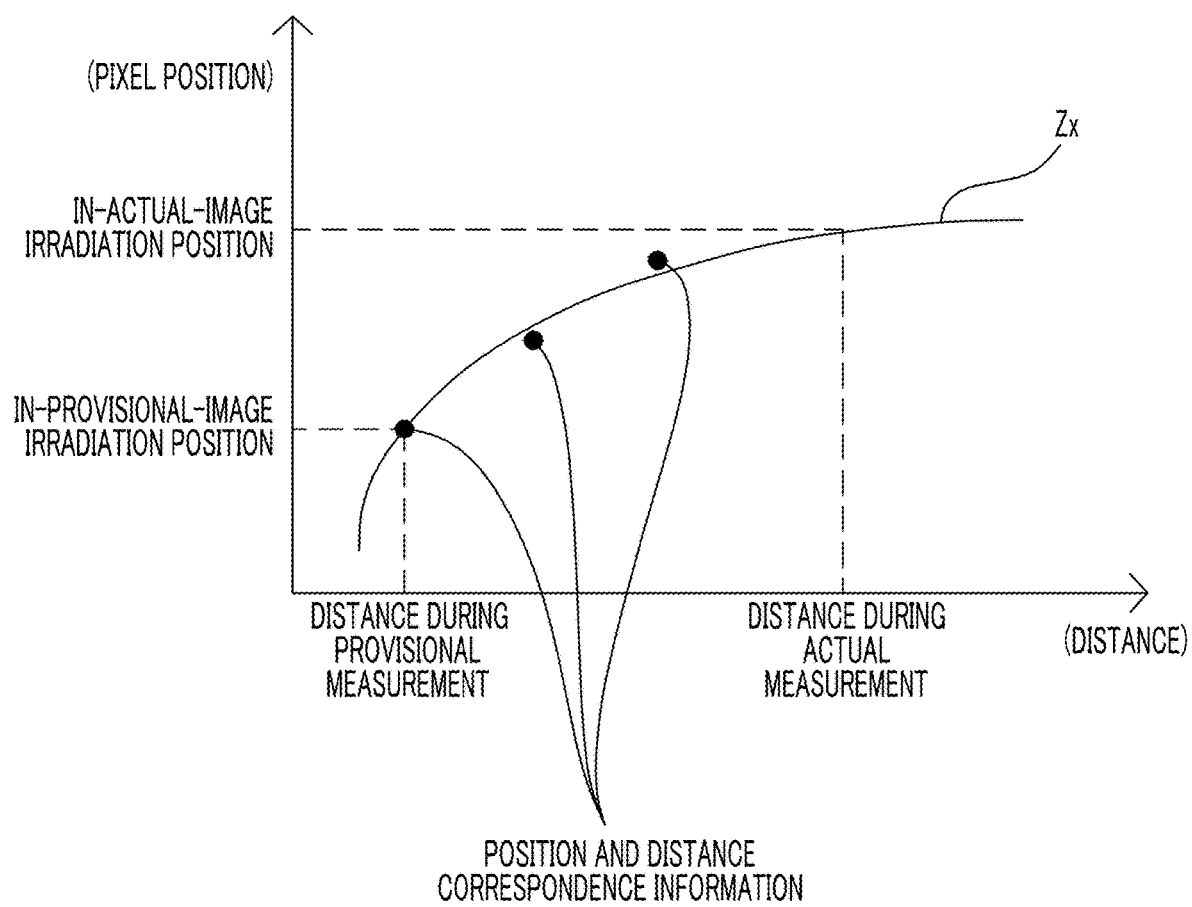
FIG. 25 is a graph showing an example of an approximate curve related to the latest position and distance correspondence information.

For example, in step 300, an approximate curve $Z_X$ is created based on the position and distance correspondence information, as shown in FIG. 25. The in-actual-image irradiation position corresponding to the distance acquired by performing the actual measurement in step 214 is derived from the approximate curve $Z_X$. That is, in step 300, the in-actual-image irradiation position is derived from the relation between the approximate curve $Z_X$ prescribed by the position and distance correspondence information which is an example of the information indicating the second correspondence relation according to the technology of the present disclosure and the distance acquired by performing the actual measurement.

For example, in step 302, the deriving unit 100A2 displays the actual image, the distance, the error, and the irradiation position mark 116 on the display unit 86 as shown in FIG. 16. Thereafter, the process proceeds to step 224.

The irradiation position mark 116 displayed on the display unit 86 by performing the process of step 302 is a mark indicating the in-actual-image irradiation position derived by performing the process of step 300.

Figure 24:
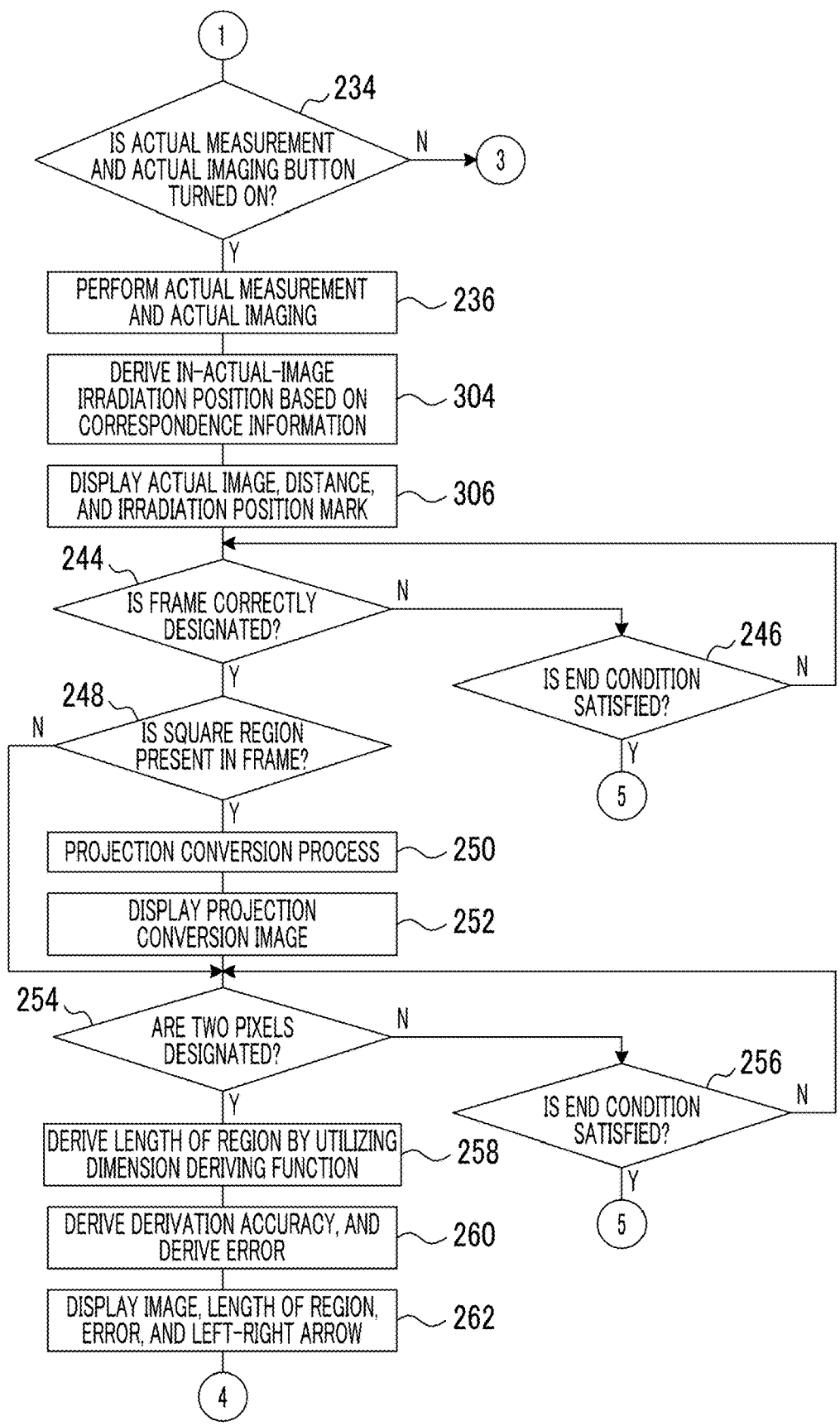
FIG. 24 is a flowchart subsequent to the flowchart shown in FIG. 23.

In step 304 shown in FIG. 24, the deriving unit 100A1 derives the in-actual-image irradiation position based on the position and distance correspondence information. Thereafter, the process proceeds to step 306.

For example, in step 304, an approximate curve $Z_X$ is created based on the position and distance correspondence information, as shown in FIG. 25. The in-actual-image irradiation position corresponding to the distance acquired by performing the actual measurement in step 236 is derived from the approximate curve $Z_X$. That is, in step 304, the in-actual-image irradiation position is derived from the relation between the approximate curve $Z_X$ prescribed by the position and distance correspondence information which is an example of the information indicating the second correspondence relation according to the technology of the present disclosure and the distance acquired by performing the actual measurement.

For example, in step 306, the deriving unit 100A1 displays the actual image, the distance, and the irradiation position mark 116 on the display unit 86 as shown in FIG. 20. Thereafter, the process proceeds to step 244.

The irradiation position mark 116 displayed on the display unit 86 by performing the process of step 306 is a mark indicating the in-actual-image irradiation position derived by performing the process of step 304.

As described above, in the distance measurement device 10B, the in-actual-image irradiation position is derived from the relation between the approximate curve prescribed by the position and distance correspondence information and the distance acquired through the actual measurement. Therefore, according to the distance measurement device 10B, it is possible to derive the in-actual-image irradiation position with a simple configuration compared to a case where the in-actual-image irradiation position is derived without using the approximate curve prescribed by the position and distance correspondence information.

Third Embodiment

Although it has been described in the second embodiment that the distance measurement device 10B is realized by the distance measurement unit 12 and the imaging device 14, a distance measurement device 10C (FIG. 26) realized by the distance measurement unit 12, an imaging device 140, and a smart device 142 will be described in a third embodiment. In the third embodiment, since the same constituent elements as those of the above-described embodiments will be assigned the same references, the description thereof will be omitted, and only portions different from those of the above-described embodiments will be described.

Hereinafter, the measurement programs are referred to as the "distance measurement program" without being assigned the reference for the sake of convenience in description in a case where it is not necessary to distinguish between the measurement programs 106 and 130.

Figure 26:
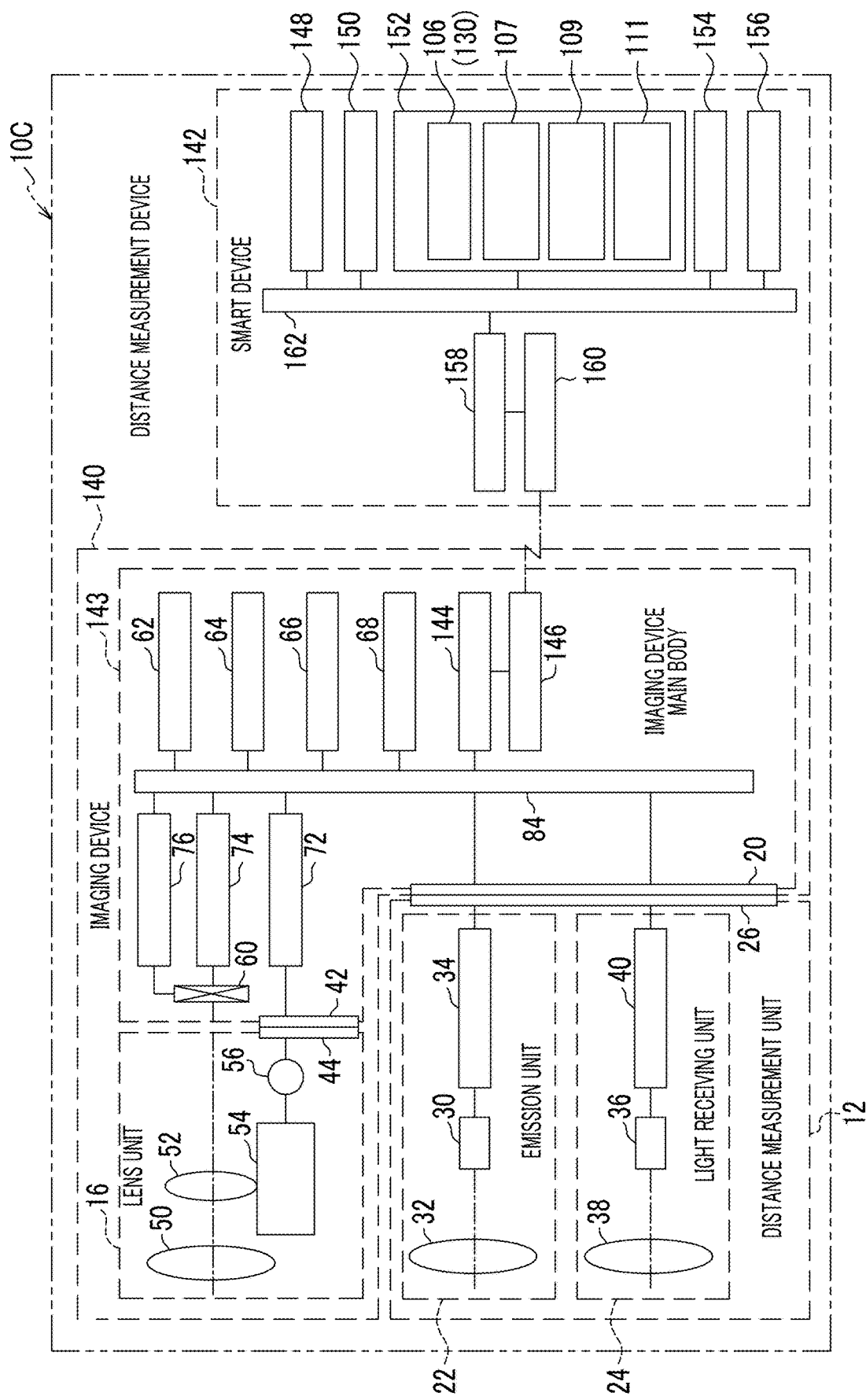
FIG. 26 is a block diagram showing an example of a hardware configuration of main parts of the distance measurement device according to the third embodiment.

For example, as shown in FIG. 26, the distance measurement device 10C according to the third embodiment is different from the distance measurement device 10A according to the first embodiment in that an imaging device 140 is provided instead of the imaging device 14. The distance measurement device 10C is different from the distance measurement device 10A in that the smart device 142 is provided.

The imaging device 140 is different from the imaging device 14 in that an imaging device main body 143 instead of the imaging device main body 18 is provided.

The imaging device main body 143 is different from the imaging device main body 18 in that a wireless communication unit 144 and a wireless communication antenna 146 are provided.

The wireless communication unit 144 is connected to the busline 84 and the wireless communication antenna 146. The main control unit 62 outputs transmission target information which is information of a target transmitted to the smart device 142 to the wireless communication unit 144.

The wireless communication unit 144 transmits, as a radio wave, the transmission target information input from the main control unit 62 to the smart device 142 through the wireless communication antenna 146. In a case where a radio wave from the smart device 142 is received by the wireless communication antenna 146, the wireless communication unit 144 acquires a signal corresponding to the received radio wave, and outputs the acquired signal to the main control unit 62.

The smart device 142 includes a CPU 148, a primary storage unit 150, and a secondary storage unit 152. The CPU 148, the primary storage unit 150, and the secondary storage unit 152 are connected to a busline 162.

The CPU 148 controls the entire distance measurement device 10C including the smart device 142. The primary storage unit 150 is a volatile memory used as a work area in a case where various programs are executed. A RAM is used as an example of the primary storage unit 150. The secondary storage unit 152 is a non-volatile memory that stores various parameters and/or control programs for controlling the entire operation of the distance measurement device 10C including the smart device 142. A flash memory and/or an EEPROM are used as an example of the secondary storage unit 152.

The smart device 142 includes a display unit 154, a touch panel 156, a wireless communication unit 158, and a wireless communication antenna 160.

The display unit 154 is connected to the busline 162 through a display control unit (not shown), and displays various information items under the control of the display control unit. For example, the display unit 154 is realized by a LCD.

The touch panel 156 is layered on a display screen of the display unit 154, and senses touch using a pointer. The touch panel 156 is connected to the busline 162 through a touch panel I/F (not shown), and outputs positional information indicating a position touched by the pointer. The touch panel I/F activates the touch panel according to an instruction of the CPU 148, and the touch panel I/F outputs the positional information input from the touch panel 156 to the CPU 148.

The soft keys corresponding to the actual measurement and actual imaging button 90A, the provisional measurement and provisional imaging button 90B, the imaging system operation mode switching button 90C, the wide angle instruction button 90D, and the telephoto instruction button 90E described in the first embodiment are displayed on the display unit 154. The soft keys corresponding to the measurement system operation mode switching button 90F and the irradiation position adjustment button 90G described in the first embodiment are displayed on the display unit 154.

Figure 27:
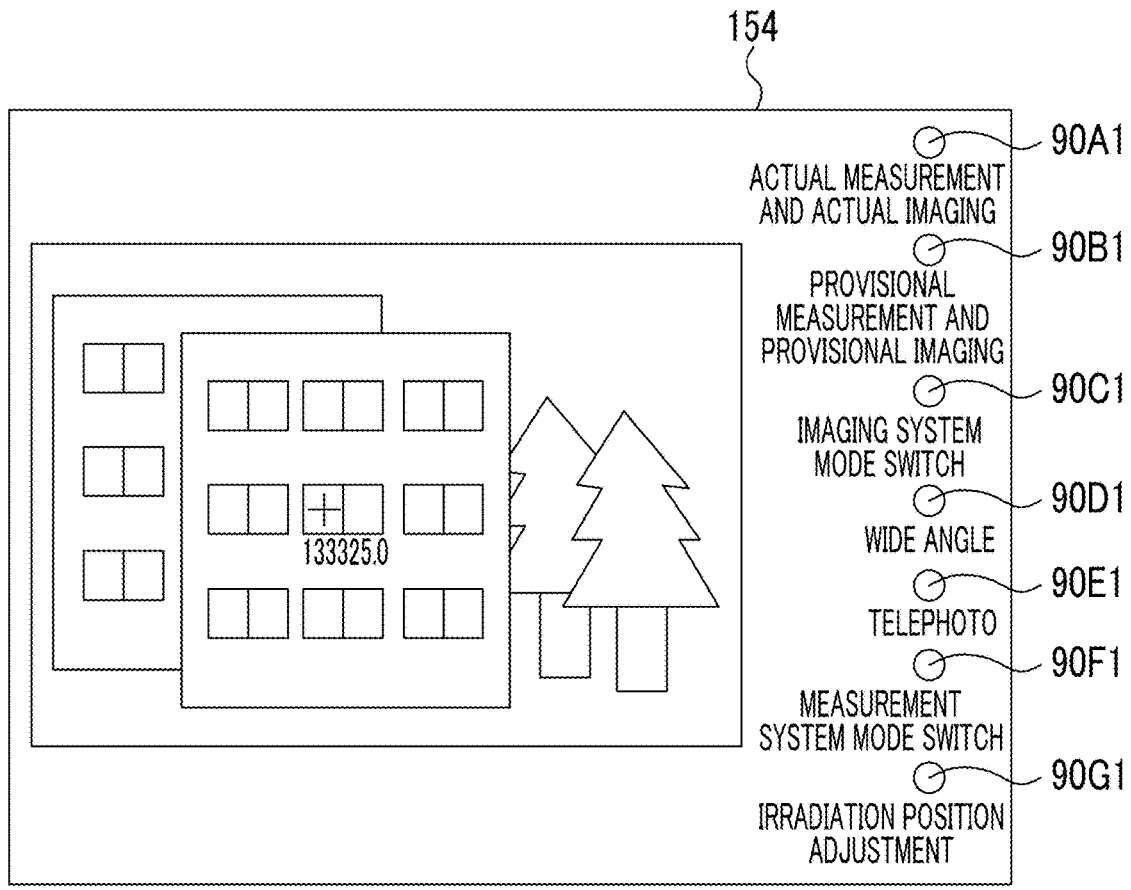
FIG. 27 is a screen diagram showing an example of a screen including examples of an actual measurement and actual imaging button, a provisional measurement and provisional imaging button, an imaging system operation mode switching button, a wide angle instruction button, a telephoto instruction button, a measurement system operation mode switching button, and an irradiation position adjustment button displayed as soft keys on a display unit of a smart device according to the third embodiment.

For example, as shown in FIG. 27, an actual measurement and actual imaging button 90A1 functioning as the actual measurement and actual imaging button 90A is displayed as a soft key on the display unit 154, and is pressed by the user through the touch panel 156. For example, a provisional measurement and provisional imaging button 90B1 functioning as the provisional measurement and provisional imaging button 90B is displayed as a soft key on the display unit 154, and is pressed by the user through the touch panel 156. For example, an imaging system operation mode switching button 90C1 functioning as the imaging system operation mode switching button 90C is displayed as a soft key on the display unit 154, and is pressed by the user through the touch panel 156. For example, a wide angle instruction button 90D1 functioning as the wide angle instruction button 90D is displayed as a soft key on the display unit 154, and is pressed by the user through the touch panel 156. For example, a telephoto instruction button 90E1 functioning as the telephoto instruction button 90E is displayed as a soft key on the display unit 154, and is pressed by the user through the touch panel 156.

For example, a measurement system operation mode switching button 90F1 functioning as the measurement system operation mode switching button 90F is displayed as a soft key on the display unit 154, and is pressed by the user through the touch panel 156. For example, an irradiation position adjustment button 90G1 functioning as the irradiation position adjustment button 90G is displayed as a soft key on the display unit 154, and is pressed by the user through the touch panel 156.

The wireless communication unit 158 is connected to the busline 162 and the wireless communication antenna 160. The wireless communication unit 158 transmits, as a radio wave, a signal input from the CPU 148 to the imaging device main body 143 through the wireless communication antenna 160. In a case where a radio wave from the imaging device main body 143 is received by the wireless communication antenna 160, the wireless communication unit 158 acquires a signal corresponding to the received radio wave, and outputs the acquired signal to the CPU 148. Accordingly, the imaging device main body 143 is controlled by the smart device 142 by performing wireless communication with the smart device 142.

The secondary storage unit 152 stores the measurement program and the factor storing program 107. The CPU 148 is operated as the deriving unit 100A and the output unit 100B according to the technology of the present disclosure by reading the measurement program and the factor storing program 107 out of the secondary storage unit 152, loading the readout programs into the primary storage unit 150, and executing the measurement program and the factor storing program 107. For example, the CPU 148 executes the measurement program, and thus, the measurement process described in the first embodiment is realized. The CPU 148 executes the factor storing program 107, and thus, the factor storing process described in the first embodiment is realized.

As described above, in the distance measurement device 10C, the position and distance correspondence information acquired by associating the in-provisional-image irradiation position with the distance which corresponds to the in-provisional-image irradiation position and is provisionally measured by using the laser beam is acquired by the CPU 148 whenever each of the plurality of distances is provisionally measured. The in-actual-image irradiation position is derived based on the acquired position and distance correspondence information by the CPU 148 of the smart device 142. Therefore, according to the distance measurement device 10C, it is possible to derive the in-actual-image irradiation position with high accuracy compared to a case where the actual measurement and the actual imaging are performed without performing the provisional measurement and the provisional imaging.

According to the distance measurement device 10C, it is possible to reduce a load applied to the imaging device 140 in acquiring the effects described in the above-described embodiments compared to a case where the distance measurement process and the irradiation position adjustment process are performed by the imaging device 140.

Figure 28:
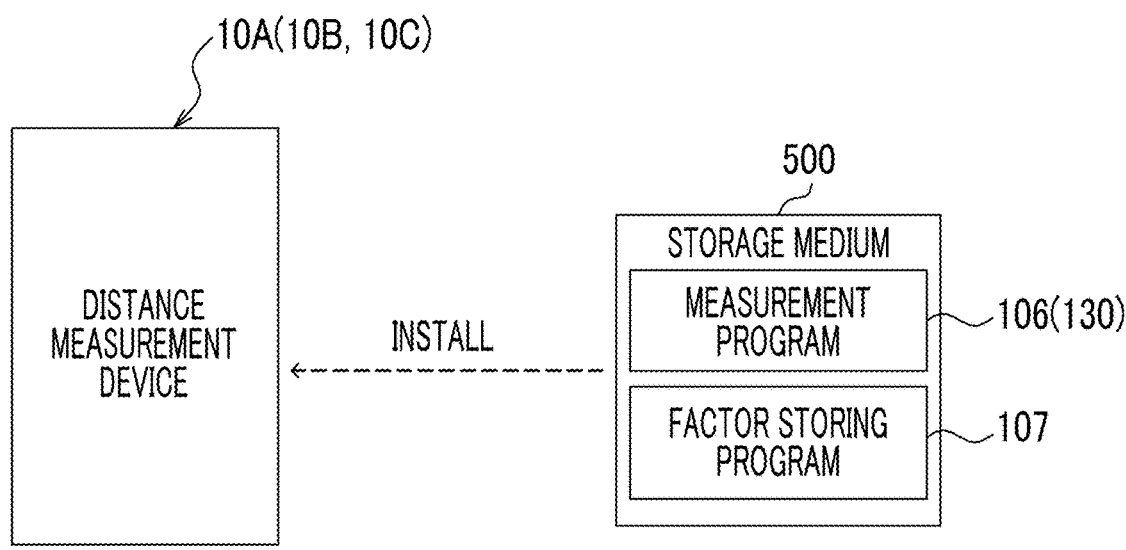
FIG. 28 is a conceptual diagram showing an example of an aspect in which a program is installed in the distance measurement device from a storage medium that stores a program according to the first to third embodiments.

Although it has been described in the above-described embodiments that the program is read out of the secondary storage unit 104 (152), it is not necessary to store the program in the secondary storage unit 104 (152) from the beginning. For example, as shown in FIG. 28, the program may be stored in an arbitrary portable storage medium 500 such as a solid state drive (SSD) or a universal serial bus (USB) memory. In this case, the program stored in the storage medium 500 is installed on the distance measurement device 10A (10B or 10C), and the installed program is executed by the CPU 100 (148).

The program may be stored in a storage unit of another computer or a server device connected to the distance measurement device 10A (10B or 10C) through a communication network (not shown), or the program may be downloaded according to a request of the distance measurement device 10A (10B or 10C). In this case, the downloaded program is executed by the CPU 100 (148).

Although it has been described in the above-described embodiments that various information items such as the actual image, the provisional image, the distance, the length of the region, the error, the in-actual-image irradiation position, and the provisional measurement and provisional imaging guide screen 112 are displayed on the display unit 86 (154), the technology of the present disclosure is not limited thereto. For example, various information items may be displayed on a display unit of an external device used while being connected to the distance measurement device 10A (10B or 10C). A personal computer or an eyeglass type or wristwatch type wearable terminal device is used as an example of the external device.

Although it has been described in the above-described embodiments that various information items are visually displayed by the display unit 86 (154), the technology of the present disclosure is not limited thereto. For example, audible indication of an output of sound from a sound playback device may be audibly displayed or a permanent visual display of an output of a printed article from a printer may be performed instead of the visual display. Alternatively, at least two of the visual display, the audible indication, or the permanent visual display may be performed.

Although it has been described in the above-described embodiments that the distance, the irradiation position mark 116, the length of the region, and the error in addition to various screens such as the irradiation position adjustment recommendation screen 110 and the provisional measurement and provisional imaging guide screen 112 are displayed on the display unit 86 (154), the technology of the present disclosure is not limited thereto. For example, various screens may be displayed on a display unit (not shown) different from the display unit 86 (154), and the distance, the length of the region, the error, and the irradiation position mark 116 may be displayed on the display unit 86 (154). Various screens such as the irradiation position adjustment recommendation screen 110 and the provisional measurement and provisional imaging guide screen 112 may be individually displayed on a plurality of display units including the display unit 86 (154).

Although it has been described in the above-described embodiments that the laser beam is used as the light for distance measurement, the technology of the present disclosure is not limited thereto. Directional light which is light having directivity may be used. For example, the measurement light may be directional light acquired by light emitting diode (LED) or a super luminescent diode (SLD). It is preferable that the directivity of the directional light is directivity having the same degree as that of the directivity of the laser beam. For example, it is preferable that the directivity of the directional light is directivity capable of being used in the distance measurement in a range of several meters to several kilometers.

The factor storing process (FIG. 11) and the measurement process (see, for example, FIGS. 12 to 14) described in the above-described embodiments are merely examples. Accordingly, an unnecessary step may be removed, a new step may be added, or a process procedure may be switched without departing from the gist. The processes included in the factor storing process and the measurement process may be realized by only the hardware configuration such as ASIC, or may be realized by the combination of the software configuration and the hardware configuration using the computer.

Although it has been described in the first embodiments that the information indicating that the distance measured through the actual measurement is out of the range of the distance specified from the position and distance correspondence information in a measurable range according to the distance measurement system function is not displayed, the technology of the present disclosure is not limited. For example, as shown in FIG. 29, the CPU 100 may determine whether or not the measurable range is in a correspondence information distance range (an example of the range of the distance specified from the second correspondence relation according to the technology of the present disclosure), and the determination result may be displayed on the display unit 86.

Figure 29:
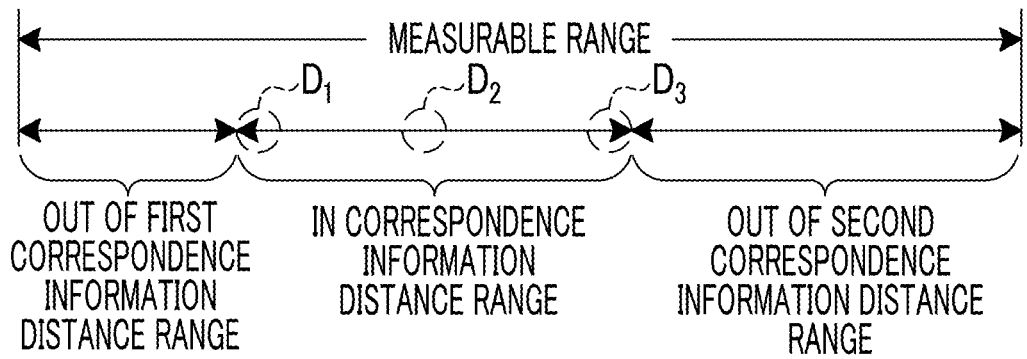
FIG. 29 is a conceptual diagram showing an example in which a distance is in a correspondence information distance range, is out of a first correspondence information distance range, and is out of a second correspondence information distance range according to the first embodiment.

For example, in this example, the measurable range is distinguished between a case where the distance is in the correspondence information distance range and a case where the distance is out of the correspondence information distance range, as shown in FIG. 29. The case where the distance is in the correspondence information distance range means that the information is in the range of the distance specified from the latest position and distance correspondence information generated by performing the process of step 318. In contrast, the case where the distance is out of the correspondence information distance range means that the information is out of the range of the distance specified from the latest position and distance correspondence information generated by performing the process of step 318.

The case where the distance is out of the correspondence information distance range is distinguished between a case where the distance is out of a first correspondence information distance range and a case where the distance is out of a second correspondence information distance range. In a case where a magnitude relation between the distances $D_1$, $D_2$, and $D_3$ specified from the latest position and distance correspondence information items is "$D_1<D_2<D_3$", the case where the distance is in the correspondence information distance range and the case where the distance is out of the correspondence information distance range are defined as follows.

That is, in the example shown in FIG. 29, the case where the distance is in the correspondence information distance range corresponds to a range of the distance $D_1$ or more and the distance $D_3$ or less. The case where the distance is out of the first correspondence information distance range corresponds to a range of less than the distance $D_1$. The case where the distance is out of the second correspondence information distance range corresponds to a range of more than the distance $D_3$. The case where the distance is out of the correspondence information distance range is an example of a "case where the distance is out of a range of a distance specified by the second correspondence relation" according to the technology of the present disclosure.

Figure 30:
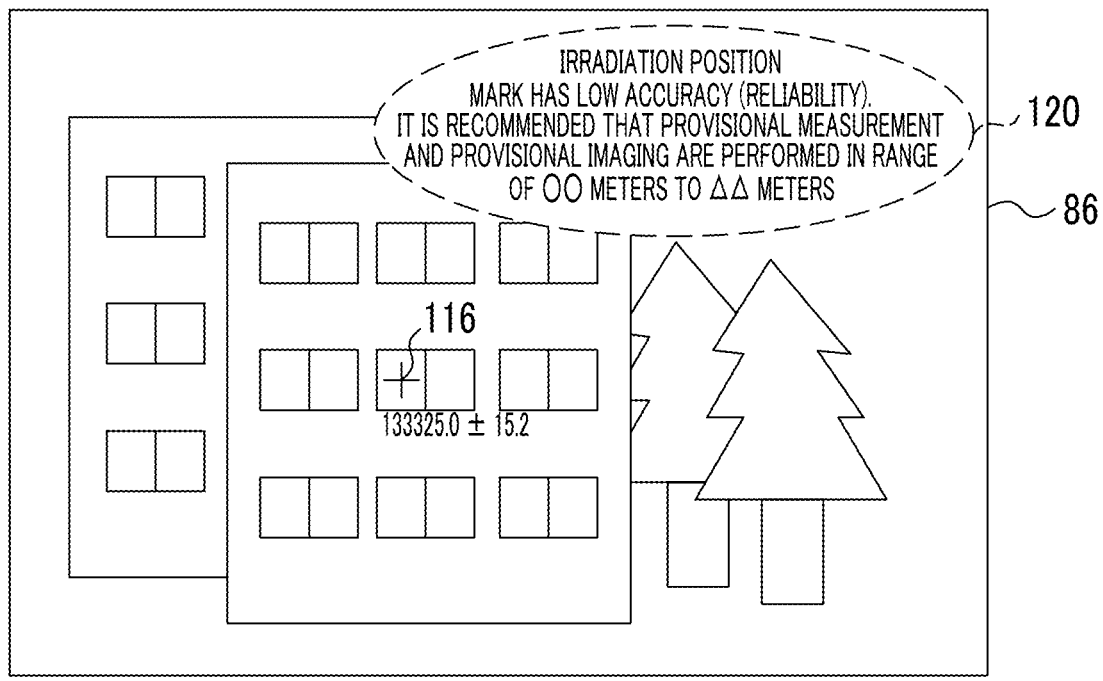
FIG. 30 is a screen diagram showing an example of a screen in which an actual image, a distance, an error, an irradiation position mark, and a warning and recommendation message are displayed on the display unit according to the first embodiment.

For example, in a case where the distance acquired by performing the actual measurement in step 214 or step 236 is out of the correspondence information distance range, the CPU 100 may display a warning and recommendation message 120 on the display unit 86 such that this message is superimposed on the actual image as shown in FIG. 30. Therefore, according to the distance measurement device 10A, it is possible to increase the accuracy of the in-actual-image irradiation position compared to a case where the process of suppressing the decrease in accuracy of the in-actual-image irradiation position is not performed.

The CPU 100 is an example of a performing unit according to the technology of the present disclosure. In a case where the distance acquired through the actual measurement is out of the range of the distance specified by the position and distance correspondence information which is an example of the information indicating the second correspondence relation according to the technology of the present disclosure, the performing unit according to the technology of the present disclosure performs a predetermined process as a process of suppressing a decrease in accuracy of the in-actual-image irradiation position.

The warning and recommendation message 120 is a message for warning the user that there is a high possibility that the laser beam will not be applied to a position in the real space which corresponds to the position of the irradiation position mark 116 and recommending the performing of the data acquisition process for deriving the irradiation position to the user. The warning and recommendation message 120 is an example of a "predetermined process as a process of suppressing a decrease in accuracy of the in-image irradiation position" according to the technology of the present disclosure.

In the example shown in FIG. 30, a warning message of "the irradiation position mark has low accuracy (reliability)" is included in the warning and recommendation message 120. In the example shown in FIG. 19, a recommendation message of "it is recommended that the provisional measurement and the provisional imaging are performed in a range of ∞ meters to ΔΔ meters" is included in the warning and recommendation message 120.

The "range of ∞ meters to ΔΔ meters" included in the recommendation message is a range out of the first correspondence information distance range or a range out of the second correspondence information distance range. That is, in a case where the distance acquired by performing the actual measurement in step 214 or step 236 is out of the first correspondence information distance range, a default range out of the first correspondence information distance range is employed. In a case where the distance acquired by performing the actual measurement in step 214 or step 236 is out of the second correspondence information distance range, a default range out of the second correspondence information distance range is employed.

The default range means a range of the distance recommended in the provisional measurement based on the relation between the distance acquired by performing the actual measurement in step 214 or step 236 and the correspondence information distance range. For example, the default range is a range which is uniquely determined from a predetermined table or calculation expression depending on a degree of deviation of the distance acquired by performing the actual measurement in step 214 or step 236 from a specific value in the correspondence information distance range. The specific value in the correspondence information distance range may be a center value or an average value in the correspondence information distance range. For example, the default range out of the first correspondence information distance range may be a range which is uniquely determined depending on a difference between the distance $D_2$ shown in FIG. 29 and the distance acquired by performing the actual measurement in step 214 or step 236. For example, the default range out of the second correspondence information distance range may be a range which is uniquely determined depending on a difference between the distance $D_2$ shown in FIG. 29 and the distance acquired by performing the actual measurement in step 214 or step 236. Instead of the "default range", a "plurality of default distances" may be used. For example, three or more distances separated from each other at equal spaces within the default range acquired as described above may be used as the plurality of default distances, and a plurality of distances recommended in the provisional measurement may be used.

Although the warning and recommendation message 120 is presented to the user in step 246 by being visually displayed on the display unit 86, the technology of the present disclosure is not limited thereto. For example, the message may be presented to the user by being output as sound by a sound playback device (not shown) provided at the distance measurement device 10A, or may be displayed through visual display and audible indication.

Although it has been described in the second embodiment that the information indicating that the distance measured through the actual measurement is out of the range of the distance specified from the position and distance correspondence information in a measurable range according to the distance measurement system function is not displayed, the technology of the present disclosure is not limited. Similarly to FIG. 29, in this case, the measurable range is distinguished between a case where the distance is in the correspondence information distance range and a case where the distance is out of the correspondence information distance range, as shown in FIG. 31.

Figure 31:
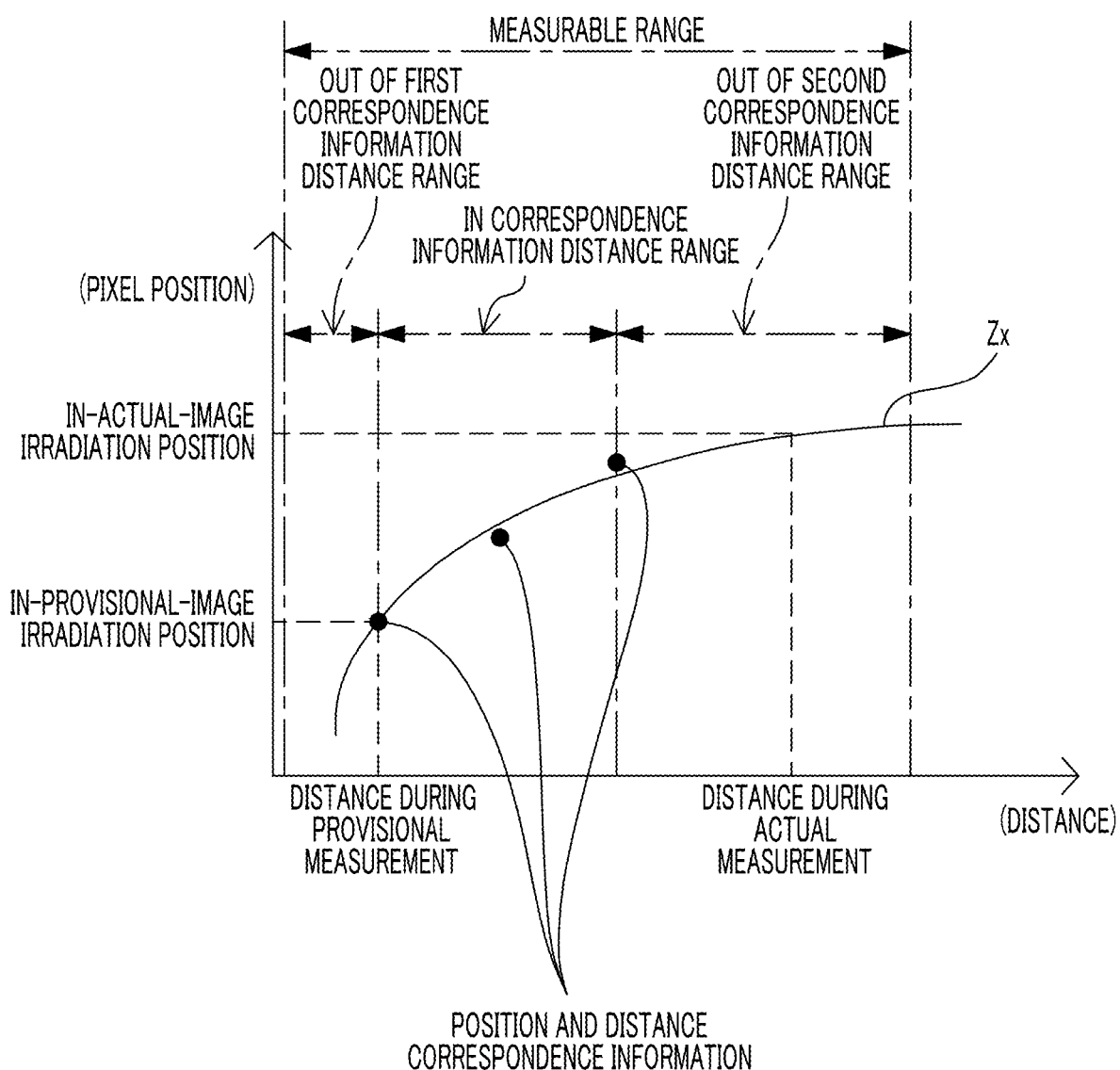
FIG. 31 is a graph showing a correspondence relation between the position and distance correspondence information, an approximate curve, a case where a distance is in a correspondence information distance range, a case where a distance is out of a first correspondence information distance range, and a case where a distance is out of a second correspondence information distance range according to the second embodiment.

In the example shown in FIG. 31, the case where the distance is in the correspondence information distance range means that the distance is a range of the distance specified by the latest position and distance correspondence information. In contrast, the case where the distance is out of the correspondence information distance range means that the distance is out of the range of the distance specified by the latest position and distance correspondence information. The case where the distance is out of the correspondence information distance range is distinguished between a case where the distance is out of a first correspondence information distance range and a case where the distance is out of a second correspondence information distance range.

For example, in the example shown in FIG. 31, the case where the distance is out of the first correspondence information distance range means that the distance is a range of which is less than a minimum value of the distance specified by the latest position and distance correspondence information. For example, in the example shown in FIG. 31, the case where the distance is out of the second correspondence information distance range means that the distance exceeds a maximum value of the distance specified by the latest position and distance correspondence information.

In the example shown in FIG. 31, a case where the distance acquired by performing the actual measurement in step 214 or step 236 is out of the second correspondence information distance range is illustrated. Accordingly, as shown in FIG. 31, in a case where the distance acquired by performing the actual measurement in step 214 or step 236 is out of the second correspondence information distance range, the warning and recommendation message 120 is displayed on the display unit 86 as shown in FIG. 30. Therefore, according to the distance measurement device 10B, it is possible to increase the accuracy of the in-actual-image irradiation position compared to a case where the process of suppressing the decrease in accuracy of the in-actual-image irradiation position is not performed.

In a case where the distance acquired by performing the actual measurement in step 214 or step 236 is in the correspondence information distance range, the warning and recommendation message 120 is not displayed on the display unit 86.

Although it has been described in the example shown in FIG. 30 that both the warning message and the recommendation message are displayed, the technology of the present disclosure is not limited thereto. For example, only the warning message of the warning message and the recommendation message may be displayed.

Although it has been described in the example shown in FIG. 30 that the irradiation position mark 116 is displayed even though the distance acquired by performing the actual measurement is out of the correspondence information distance range, the technology of the present disclosure is not limited thereto. For example, in a case where the distance acquired by performing the actual measurement is the distance out of the first correspondence information distance range and a difference between the distance acquired by performing the actual measurement and a minimum distance included in the correspondence information distance range is equal to or greater than a threshold value, the irradiation position mark 116 may not be displayed. For example, in a case where the distance acquired by performing the actual measurement is the distance out of the second correspondence information distance range and a difference between the distance acquired by performing the actual measurement and a maximum distance included in the correspondence information distance range is equal to or greater than the threshold value, the irradiation position mark 116 may not be displayed. In the present configuration, it is possible to prevent the irradiation position mark 116 having low accuracy from being referred to by the user compared to a case where the irradiation position mark 116 is displayed even though the difference between the distance acquired by performing the actual measurement and the distance included in the correspondence information distance range is equal to or greater than the threshold value.

Although it has been described in the above-described embodiments that the in-actual-image irradiation position and the length of the region are derived by the CPU 100 (148), the technology of the present disclosure is not limited thereto. For example, one of the in-actual-image irradiation position and the length of the region is derived by the CPU 100, and the other may be derived by another CPU (not shown). For example, the processes of steps 240 and 258 of the measurement process shown in FIG. 13 are performed by the same CPU 100, but the process of step 240 may be a CPU other than the CPU 100, and the process of step 258 may be performed by the CPU 100.

The disclosures of Japanese Patent Application No. 2015-190354 filed on Sep. 28, 2015 are hereby incorporated by reference in their entireties.

All documents, patent applications, and technical standards described in the present specification are herein incorporated by reference to the same extent as if such individual document, patent application, and technical standard were specifically and individually indicated to be herein incorporated by reference.

The above-described embodiments are further disclosed in the following appendices.

APPENDIX 1

A distance measurement device comprises an imaging unit that images a subject image indicating a subject, a measurement unit that measures a distance to the subject by emitting directional light rays which are light rays each having directivity to the subject and receiving reflection light rays of the directional light rays, a deriving unit that derives a dimension of a real-space region corresponding to an interval between a plurality of pixels associated with in-image irradiation positions derived as positions, which correspond to irradiation positions of the directional light rays onto the subject, within a captured image acquired by imaging the subject by the imaging unit based on a distance measured by the measurement unit, the interval, and a focal length of the imaging unit, and an output unit that derives derivation accuracy corresponding to an actually present factor based on a first correspondence relation between assumption factors assumed as factors influencing the in-image irradiation positions and derivation accuracy derived by the deriving unit, and outputs information based on the derived derivation accuracy.

APPENDIX 2

A distance measurement device comprises an imaging unit that images a subject image indicating a subject, a measurement unit that measures a distance to the subject by emitting directional light rays which are light rays each having directivity to the subject and receiving reflection light rays of the directional light rays, a deriving unit that derives in-image irradiation positions, which correspond to irradiation positions of the directional light rays onto the subject, within a captured image acquired by imaging the subject by the imaging unit based on the distance measured by the measurement unit, and an output unit that derives derivation accuracy corresponding to an actually present factor based on a first correspondence relation between assumption factors assumed as factors influencing the in-image irradiation positions and derivation accuracy derived by the deriving unit, and outputs information based on the derivation accuracy.

What is claimed is:

1. A distance measurement device comprising:
an imaging unit that images a subject;
a measurement unit that measures a distance to the subject by emitting directional light rays which are light rays each having directivity to the subject and receiving reflection light rays of the directional light rays;
a deriving unit that (i) acquires a position-distance correspondence relation between in-provisional-image irradiation positions corresponding to irradiation positions of directional light rays onto the subject within a provisional image acquired by provisionally imaging the subject by the imaging unit whenever each of a plurality of distances is provisionally measured by the measurement unit and distances which are provisionally measured by the measurement unit by using the directional light rays corresponding to the in-provisional-image irradiation positions, (ii) derives factors which influence the irradiation positions based on the acquired position-distance correspondence relation, (iii) derives in-actual-image irradiation positions corresponding to the irradiation positions of the directional light rays used in an actual measurement by the measurement unit within an actual image acquired at an actual imaging by the imaging unit, based on the derived factors and distances obtained at the actual measurement by the imaging unit, and (iv) derives a dimension of a real-space region corresponding to an interval between a plurality of pixels associated with the in-actual-image irradiation positions, within a captured image acquired by imaging the subject by the imaging unit, based on a distance actually measured by the measurement unit, the interval, and a focal length of the imaging unit; and
an output unit that derives derivation accuracy corresponding to an actually present factor based on a factor-accuracy correspondence relation between assumption factors assumed as factors influencing the in-image irradiation positions and derivation accuracy derived by the deriving unit, and outputs information based on the derived derivation accuracy.

2. A distance measurement device comprising:
an imaging unit that images a subject;
a measurement unit that measures a distance to the subject by emitting directional light rays which are light rays each having directivity to the subject and receiving reflection light rays of the directional light rays;
a deriving unit that (i) acquires a position-distance correspondence relation between in-provisional-image irradiation positions corresponding to irradiation positions of directional light rays onto the subject within a provisional image acquired by provisionally imaging the subject by the imaging unit whenever each of a plurality of distances is provisionally measured by the measurement unit and distances which are provisionally measured by the measurement unit by using the directional light rays corresponding to the in-provisional-image irradiation positions, (ii) derives factors which influence the irradiation positions based on the acquired position-distance correspondence relation, and (iii) derives in-actual-image irradiation positions, which correspond to irradiation positions of the directional light rays used in an actual measurement by the measurement unit, within an actual image acquired at an actual imaging by the imaging unit, based on the derived factors and distances obtained at the actual measurement by the imaging unit; and
an output unit that derives derivation accuracy corresponding to an actually present factor based on a factor-accuracy correspondence relation between assumption factors assumed as factors influencing the in-image irradiation positions and derivation accuracy derived by the deriving unit, and outputs information based on the derivation accuracy.

3. The distance measurement device according to claim 1, further comprising:
a performing unit that performs a predetermined process as a process of suppressing a decrease in accuracy of the in-image irradiation position in a case where a distance which is actually measured by the measurement unit is out of a range of a distance specified by the position-distance correspondence relation.

4. The distance measurement device according to claim 1, wherein different derivation accuracy are associated with different assumption factors in the factor-accuracy correspondence relation, and
the output unit derives the derivation accuracy associated with the assumption factor corresponding to the actually present factor.

5. The distance measurement device according to claim 4, wherein, in a case where the actually present factor is in plural, the output unit derives the derivation accuracy by integrating the derivation accuracy associated with the assumption factors corresponding to the plurality of actually present factors.

6. The distance measurement device according to claim 5, wherein the output unit derives information based on a dependent variable integrated by using a polynomial including the derivation accuracy associated with the assumption factors corresponding to the plurality of actually present factors as independent variables.

7. The distance measurement device according to claim 1, wherein the factor is at least one of replacement of a lens of the imaging unit, replacement of the measurement unit, a change in an angle of view on the subject captured by the imaging unit, a change in a direction in which the directional light ray is emitted, or a manufacturing variation.

8. The distance measurement device according to claim 1, wherein the factor-accuracy correspondence relation is stored in a storage unit until the output unit is activated for the first time, and
the output unit derives the derivation accuracy corresponding to the actually present factor based on the factor-accuracy correspondence relation stored in the storage unit.

9. The distance measurement device according to claim 1, further comprising:
a warning unit that issues a warning in a case where the derivation accuracy output by the output unit is less than predetermined derivation accuracy.

10. A distance measurement method comprising:
acquiring a position-distance correspondence relation between in-provisional-image irradiation positions corresponding to irradiation positions of directional light rays onto a subject within a provisional image acquired by provisionally imaging the subject by an imaging unit whenever each of a plurality of distances is provisionally measured by a measurement unit and distances which are provisionally measured by the measurement unit by using the directional light rays corresponding to the in-provisional-image irradiation positions, the imaging unit imaging the subject, the measurement unit measuring the distance to the subject by emitting the directional light rays which are light rays each having directivity to the subject and receiving reflection light rays of the directional light rays, the imaging unit and the measurement unit being included in a distance measurement device;
deriving factors which influence the irradiation positions based on the acquired position-distance correspondence relation;
deriving in-actual-image irradiation positions corresponding to the irradiation positions of the directional light rays used in an actual measurement by the measurement unit within an actual image acquired at an actual imaging by the imaging unit, based on the derived factors and distances obtained at the actual measurement by the imaging unit;
deriving a dimension of a real-space region corresponding to an interval between a plurality of pixels associated with the in-actual-image irradiation positions, within a captured image acquired by imaging the subject by the imaging unit, based on a distance actually measured by the measurement unit, the interval, and a focal length of the imaging unit; and
deriving derivation accuracy corresponding to an actually present factor based on a factor-accuracy correspondence relation between assumption factors assumed as factors influencing the in-image irradiation positions and derivation accuracy of the dimension of the real-space region, and outputting information based on the derived derivation accuracy.

11. A distance measurement method comprising:
acquiring a position-distance correspondence relation between in-provisional-image irradiation positions corresponding to irradiation positions of directional light rays onto a subject within a provisional image acquired by provisionally imaging the subject by an imaging unit whenever each of a plurality of distances is provisionally measured by a measurement unit and distances which are provisionally measured by the measurement unit by using the directional light rays corresponding to the in-provisional-image irradiation positions, the imaging unit imaging the subject, the measurement unit measuring the distance to the subject by emitting the directional light rays which are light rays each having directivity to the subject and receiving reflection light rays of the directional light rays, the imaging unit and the measurement unit being included in a distance measurement device;
deriving factors which influence the irradiation positions based on the acquired position-distance correspondence relation;
deriving in-actual-image irradiation positions, which correspond to irradiation positions of directional light rays used in an actual measurement by the measurement unit, within an actual image acquired at an actual imaging by the imaging unit, based on the derived factors and distances obtained at the actual measurement by the imaging unit; and
deriving derivation accuracy corresponding to an actually present factor based on a factor-accuracy correspondence relation between assumption factors assumed as factors influencing the in-image irradiation positions and derivation accuracy of the in-image irradiation positions, and outputting information based on the derived derivation accuracy.

12. A non-transitory computer readable medium storing a program that causes a computer to execute a process for a distance measurement, the process comprising:
acquiring a position-distance correspondence relation between in-provisional-image irradiation positions corresponding to irradiation positions of directional light rays onto a subject within a provisional image acquired by provisionally imaging the subject by an imaging unit whenever each of a plurality of distances is provisionally measured by a measurement unit and distances which are provisionally measured by the measurement unit by using the directional light rays corresponding to the in-provisional-image irradiation positions, the imaging unit imaging the subject, the measurement unit measuring the distance to the subject by emitting the directional light rays which are light rays each having directivity to the subject and receiving reflection light rays of the directional light rays, the imaging unit and the measurement unit being included in a distance measurement device;
deriving factors which influence the irradiation positions based on the acquired position-distance correspondence relation;
deriving in-actual-image irradiation positions corresponding to the irradiation positions of the directional light rays used in an actual measurement by the measurement unit within an actual image acquired at an actual imaging by the imaging unit, based on the derived factors and distances obtained at the actual measurement by the imaging unit;
deriving a dimension of a real-space region corresponding to an interval between a plurality of pixels associated with the in-actual-image irradiation positions, within a captured image acquired by imaging the subject by the imaging unit, based on a distance actually measured by the measurement unit, the interval, and a focal length of the imaging unit; and deriving derivation accuracy corresponding to an actually present factor based on a factor-accuracy correspondence relation between assumption factors assumed as factors influencing the in-image irradiation positions and derivation accuracy of the dimension of the real-space region, and outputting information based on the derived derivation accuracy.

13. A non-transitory computer readable medium storing a program that causes a computer to execute a process for a distance measurement, the process comprising:

acquiring a position-distance correspondence relation between in-provisional-image irradiation positions corresponding to irradiation positions of directional light rays onto a subject within a provisional image acquired by provisionally imaging the subject by an imaging unit whenever each of a plurality of distances is provisionally measured by a measurement unit and distances which are provisionally measured by the measurement unit by using the directional light rays corresponding to the in-provisional-image irradiation positions, the imaging unit imaging the subject, the measurement unit measuring the distance to the subject by emitting the directional light rays which are light rays each having directivity to the subject and receiving reflection light rays of the directional light rays, the imaging unit and the measurement unit being included in a distance measurement device;

deriving factors which influence the irradiation positions based on the acquired position-distance correspondence relation;

deriving in-actual-image irradiation positions, which correspond to irradiation positions of directional light rays used in an actual measurement by the measurement unit, within an actual image acquired at an actual imaging by the imaging unit, based on the derived factors and distances obtained at the actual measurement by the imaging unit; and deriving derivation accuracy corresponding to an actually present factor based on a factor-accuracy correspondence relation between assumption factors assumed as factors influencing the in-image irradiation positions and derivation accuracy of the in-image irradiation positions, and outputting information based on the derived derivation accuracy.

* * * * *